US011639157B2

(12) United States Patent
Chu et al.

(10) Patent No.: US 11,639,157 B2
(45) Date of Patent: May 2, 2023

(54) BRUSHLESS CAR WASH SYSTEM INCLUDING A TELESCOPING UNIT FOR WASHING TOP AND REAR SURFACES OF VEHICLES

(71) Applicant: NTI CO., LTD, Gyeongsangbuk-do (KR)

(72) Inventors: William Yoon S Chu, Torrance, CA (US); Jinchul Cho, Daegu (KR); Hyuntae Kim, Daegu (KR); Heon Sagong, Daegu (KR); Hyeonseop Shim, Daegu (KR)

(73) Assignee: NTI CO., LTD, Gyeongsangbuk-do (KR)

( * ) Notice: Subject to any disclaimer, the term of this patent is extended or adjusted under 35 U.S.C. 154(b) by 312 days.

(21) Appl. No.: 17/001,386

(22) Filed: Aug. 24, 2020

(65) Prior Publication Data

US 2022/0055576 A1    Feb. 24, 2022

(51) Int. Cl.
*B60S 3/04*  (2006.01)
*B05B 12/12* (2006.01)
*B05B 15/68* (2018.01)
*B08B 3/02*  (2006.01)

(52) U.S. Cl.
CPC .............. *B60S 3/04* (2013.01); *B05B 12/122* (2013.01); *B05B 15/68* (2018.02); *B08B 3/022* (2013.01); *B08B 3/024* (2013.01)

(58) Field of Classification Search
CPC ....... B05B 15/68; B05B 12/122; B08B 3/022; B08B 3/024; B60S 3/04

USPC ......................................................... 134/144
See application file for complete search history.

(56) References Cited

U.S. PATENT DOCUMENTS

| 4,715,391 | A |   | 12/1987 | Scheller |
| 4,850,379 | A |   | 7/1989  | Petit |
| 4,865,058 | A |   | 9/1989  | Crotts et al. |
| 5,076,304 | A | * | 12/1991 | Mathews ............ F16L 27/093 134/123 |
| 5,367,736 | A |   | 11/1994 | Kaady et al. |
| 2011/0277797 | A1 | | 11/2011 | Turner et al. |
| 2013/0291909 | A1 | | 11/2013 | Belanger et al. |
| 2015/0273531 | A1 | | 10/2015 | Oliver |

FOREIGN PATENT DOCUMENTS

| CN | 201133809 Y  | 10/2008 |
| CN | 105253114 A  | 1/2016 |
| CN | 105966363 A  | 9/2016 |
| CN | 209051398 U  | 7/2019 |
| EP |   0363579 A2 * | 4/1990 |
| EP |   0832715 A2 | 4/1998 |

(Continued)

OTHER PUBLICATIONS

PCT International Search Report and Written Opinion, PCT Application No. PCT/IB2020/000755, dated May 14, 2021, 13 pages.

(Continued)

*Primary Examiner* — Tinsae B Ayalew
(74) *Attorney, Agent, or Firm* — Fenwick & West LLP

(57) ABSTRACT

A brushless car wash system includes a wash unit that washes upper surfaces of the vehicle. The height of the wash unit is adjusted based on the contour of the upper surfaces of the vehicle. Adjusting the height of the wash unit results in increased wash performance of the brushless car wash system.

24 Claims, 47 Drawing Sheets

(56) References Cited

FOREIGN PATENT DOCUMENTS

| EP | 2500219 A2 | 9/2012 |
|---|---|---|
| JP | 2553703 Y2 | 11/1997 |
| JP | H 10-239484 A | 9/1998 |
| JP | 3053107 U | 10/1998 |
| JP | H147454 A | 6/1999 |
| JP | 2004-050960 A | 2/2004 |
| KR | 10-2005-0092290 A | 9/2005 |
| KR | 10-0845580 B1 | 7/2008 |
| KR | 10-1706039 B1 | 2/2017 |
| KR | 10-1825526 B1 | 2/2018 |
| KR | 10-2006429 B1 | 8/2019 |
| KR | 10-2032176 B1 | 10/2019 |
| KR | 10-2093843 B1 | 4/2020 |
| WO | WO 2005/120913 A2 | 12/2005 |

OTHER PUBLICATIONS

Korean Intellectual Property Office, Office Action, Korean Patent Application No. 10-2020-0124891, dated Nov. 19, 2021, 17 pages.
Korean Intellectual Property Office, Office Action, Korean Patent Application No. 10-2020-0124972, dated Nov. 19, 2021, 14 pages.
Korean Intellectual Property Office, Office Action, Korean Patent Application No. 10-2020-0124902, dated Nov. 19, 2021, six pages.
Belanger, Inc., "Kondor Touchless In-Bay Automatic Wash System," undated, four pages, [Online] [Retrieved on Oct. 14, 2020], Retrieved from the Internet <URL: https://www.opwglobal.com/belanger/products/complete-svstems/touchless-in-bay-automatic/kondor/>.
Belanger, Inc., "SpinLite Slow-Spin Vehicle Wash System," undated, four pages, [Online] [Retrieved on Oct. 14, 2020], Retrieved from the Internet <URL: https://www.opwglobal.com/belanger/products/complete-systems/conveyorized-tunnel-systems/spinlite/>.
Christ Wash Systems, "Main wash zone," undated, 30 pages, [Online] [Retrieved on Oct. 14, 2020], Retrieved from the Internet <URL: https://www.christ-ag.com/wash-systems/index.php?id-150&L=3/>.
Christ Wash Systems, "Soaking Zone," undated, 15 pages, [Online] [Retrieved on Oct. 14, 2020], Retrieved from the Internet <URL: htps://www.christ-ag.com/wash-systems/index.php?id-22&L=3/>.
Colman Hanna Carwash Systems, "Fastrak Touch Free," undated, five pages, [Online] [Retrieved on Oct. 14, 2020], Retrieved from the Internet <URL: https://colemanhanna.com/equipment/in-bay-automatics/fastrak-touch-free/>.
Colman Hanna Carwash Systems, "Touchless Conveyor Tunnel Systems," undated, five pages, [Online] [Retrieved on Oct. 14, 2020], Retrieved from the Internet <URL: https://colemanhanna.com/equipment/conveyor-equipment/systems/touchless-system/>.
Daifuku, "Car Wash Machines," undated, two pages, [Online] [Retrieved on Oct. 14, 2020], Retrieved from the Internet <URL: https://www.daifuku.com/solution/carwash/>.
Kinnek, "Istobal Tracer,", undated, five pages, [Online] [Retrieved on Oct. 14, 2020], Retrieved from the Internet <URL: https://www.kinnek.com/product/istobal-sa-istobal-tracer/>.
Motor City Wash Works, "Tunnel Systems that Lead to Success," undated, five pages, [Online] [Retrieved on Oct. 14, 2020], Retrieved from the Internet <URL: https://www.motorcitywashworks.com/systems/car-wash-tunnel-systems/>.
N/S Corporation, "Recent Car Wash Installations, Jerzy Boys San Pedro Car Wash" undated, four pages, [Online] [Retrieved on Oct. 14, 2020], Retrieved from the Internet <URL: https://nswash.com/recent-car-wash-installations/>.
PECO Car Wash Systems, "Hybrid Systems," undated, seven pages, [Online] [Retrieved on Oct. 14, 2020], Retrieved from the Internet <URL: https://www.pecocarwash.com/Systems/hybrid/>.
PECO Car Wash Systems, "TBA963g Tire Brite Applicator W/Retract Galvanize," undated, two pages, [Online] [Retrieved on Oct. 14, 2020], Retrieved from the Internet <URL: https://www.pecocarwash.com/Product/997965/>.
PECO Car Wash Systems, "Touch-Free Systems," undated, seven pages, [Online] [Retrieved on Oct. 14, 2020], Retrieved from the Internet <URL: https://www.pecocarash.com/Systems/Touch-Free/>.
Ryko, "RADIUS," undated, two pages, [Online] [Retrieved on Oct. 14, 2020], Retrieved from the Internet <URL: https://www.ryko.com/systems/radiusht/>.
Sonny's, OMNI 300 High Pressure System undated, eight pages, [Online] [Retrieved on Oct. 14, 2020], Retrieved from the Internet <URL: https://www.sonnysdirect.com/sonnysdirect/en/Tunnel-Equipment/High-Pressure-Wash-Equipment/OMNI-300-High-Pressure-System/p/OMNI 300/>.
Sonny's, "Pendulum Side to Side 807 Combo," undated, 11 pages, [Online] [Retrieved on Oct. 14, 2020], Retrieved from the Internet <URL: https://www.sonnysdirect.com/sonnysdirect/en/Tunnel-Equipment/High-Pressure-Wash-Equipment/Pendulum-Side-to-Side-807-Combo/p/PENDULUM_807_COMBO/.
Sonny's, "Sonny's 160-EDT Exterior Detail Hybrid Tunnel System," undated, nine pages, [Online] [Retrieved on Oct. 14, 2020], Retrieved from the Internet <URL: https://www.sonnysdirect.com/prd_car_wash_equipment_tunnel_systems_160EDT/>.
WashTec, "Conveyor tunnel system," undated, six pages, [Online] [Retrieved on Oct. 14, 2020], Retrieved from the Internet <URL: https://www.washtec-uk.com/conveyor-tunnel-system/>.
YouTube Video: PECO Car Wash Systems, "Hybrid 150' System," Aug. 29, 2019, two pages, [Online] [Retrieved on Oct. 14, 2020], Retrieved from the Internet <URL: https://www.youtube.com/watch?v=hVcBxkYWPds/>.
Zhumei Car Washing Equipment (Shanghai) Co., Ltd., "Tunnel car washing machine TC700," undated, five pages, [Online] [Retrieved on Oct. 14, 2020], Retrieved from the Internet <URL: https://takeuchttechno.com/productinfo/297462.html/>.
United States Office Action, U.S. Appl. No. 17/001,404, filed Sep. 20, 2022, 11 pages.

* cited by examiner

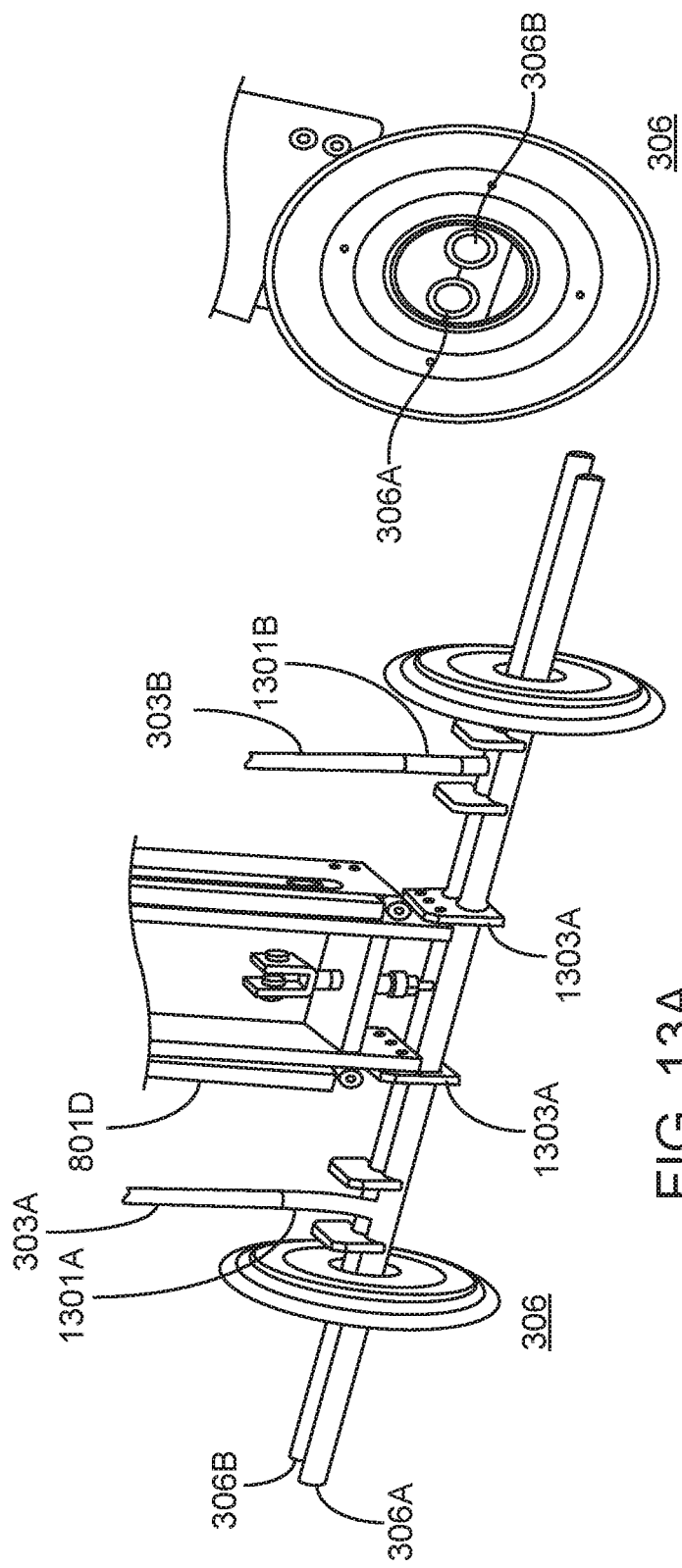

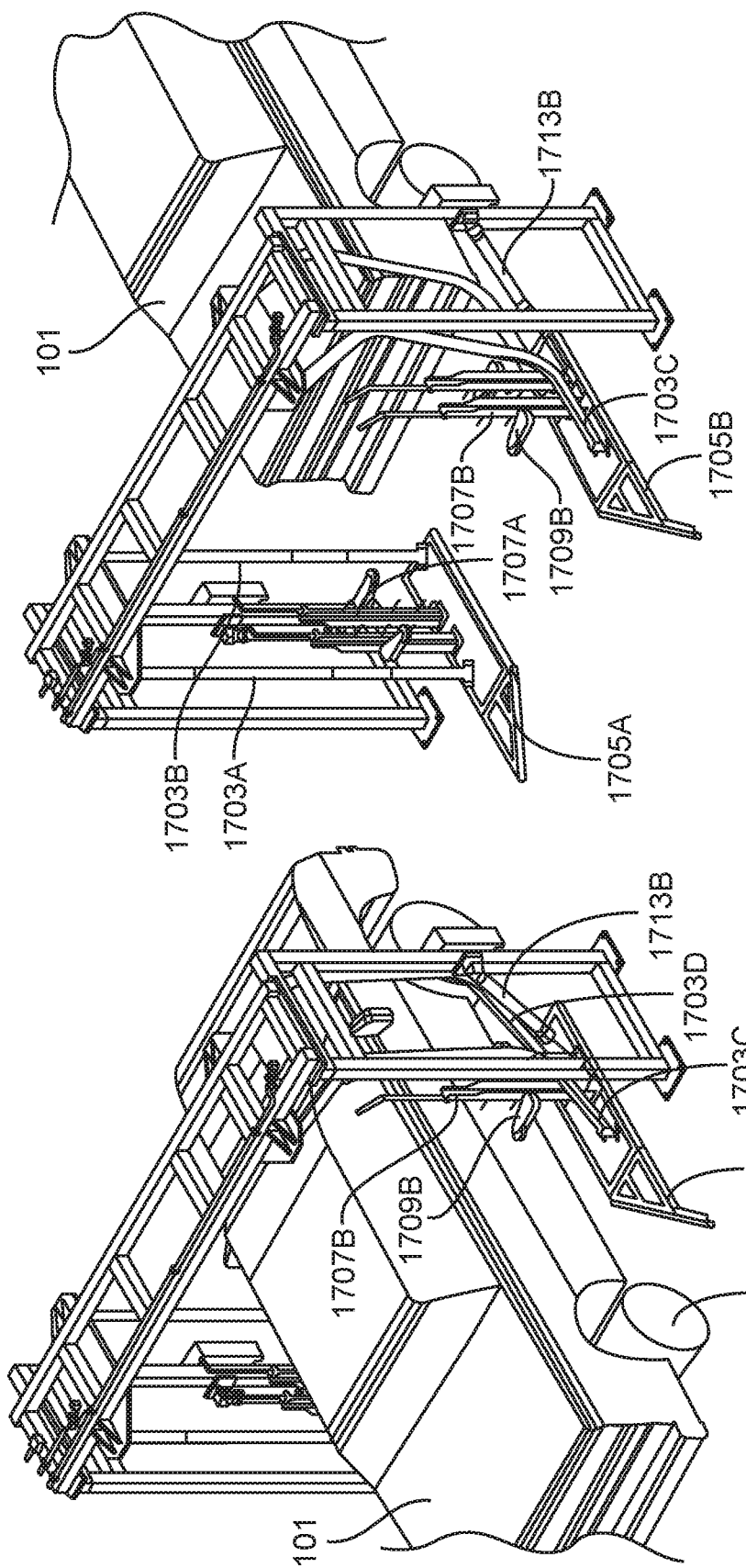

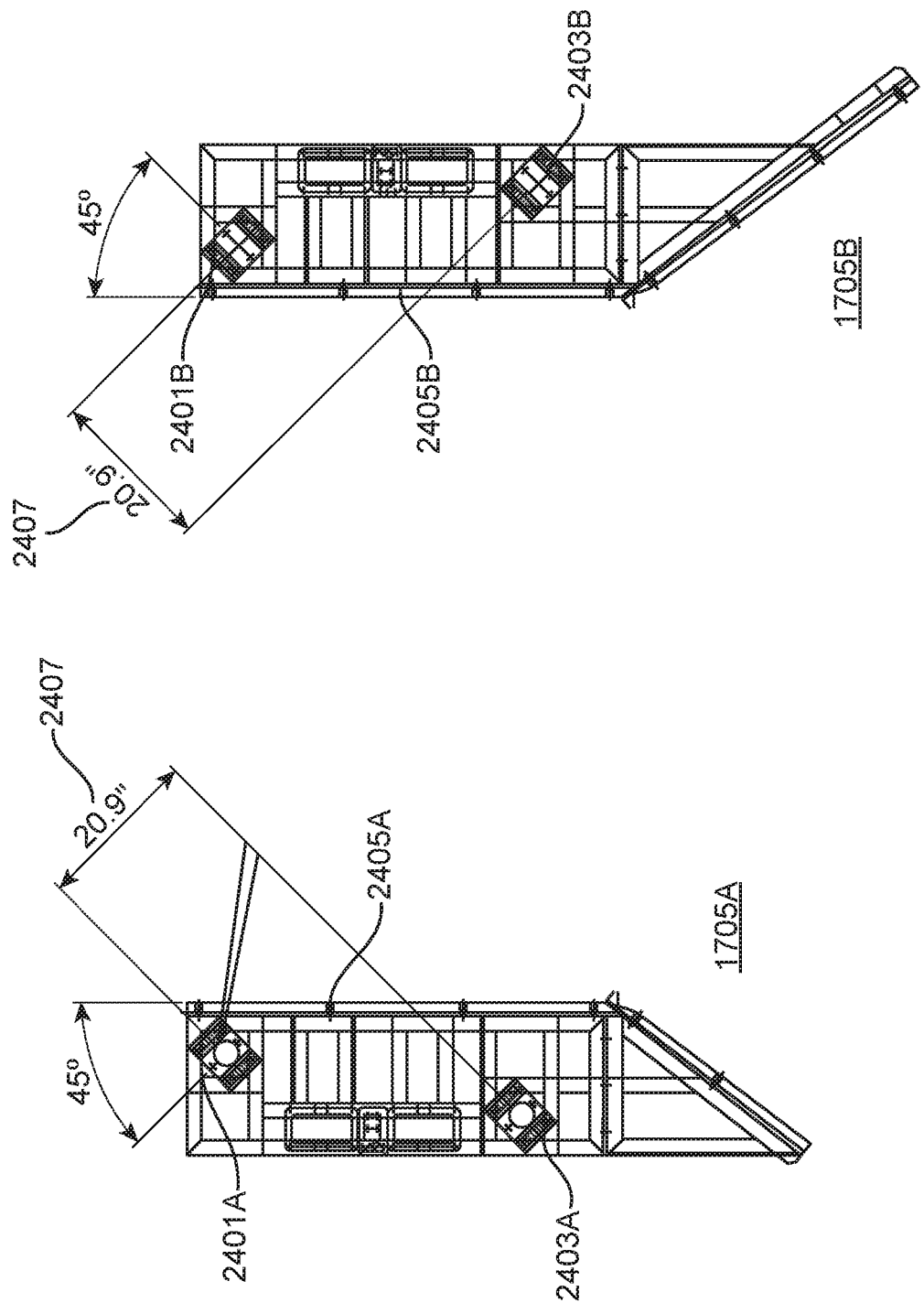

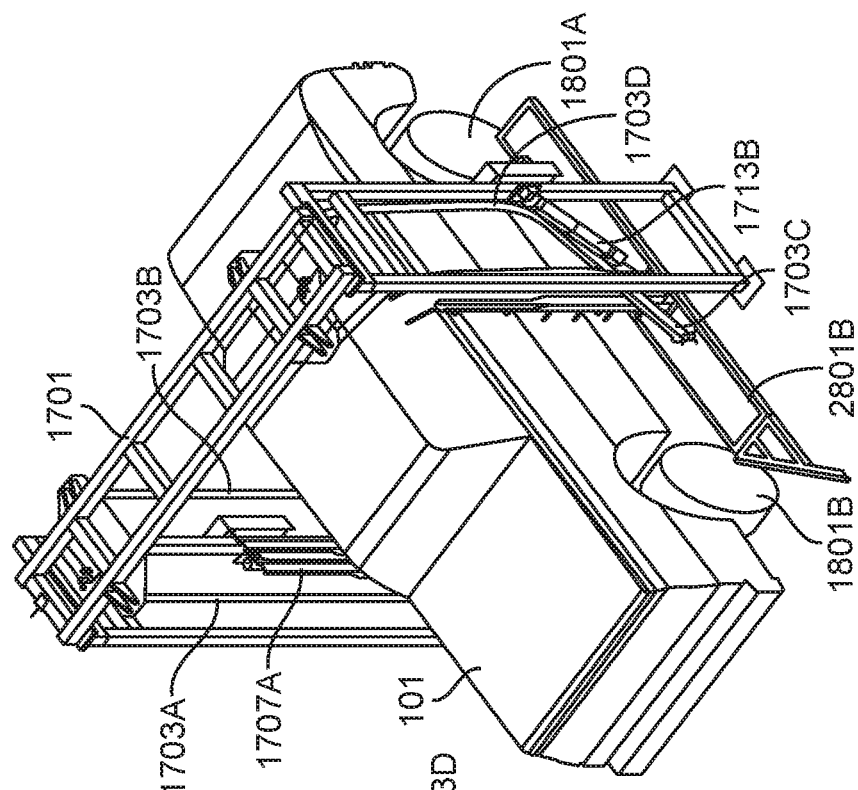
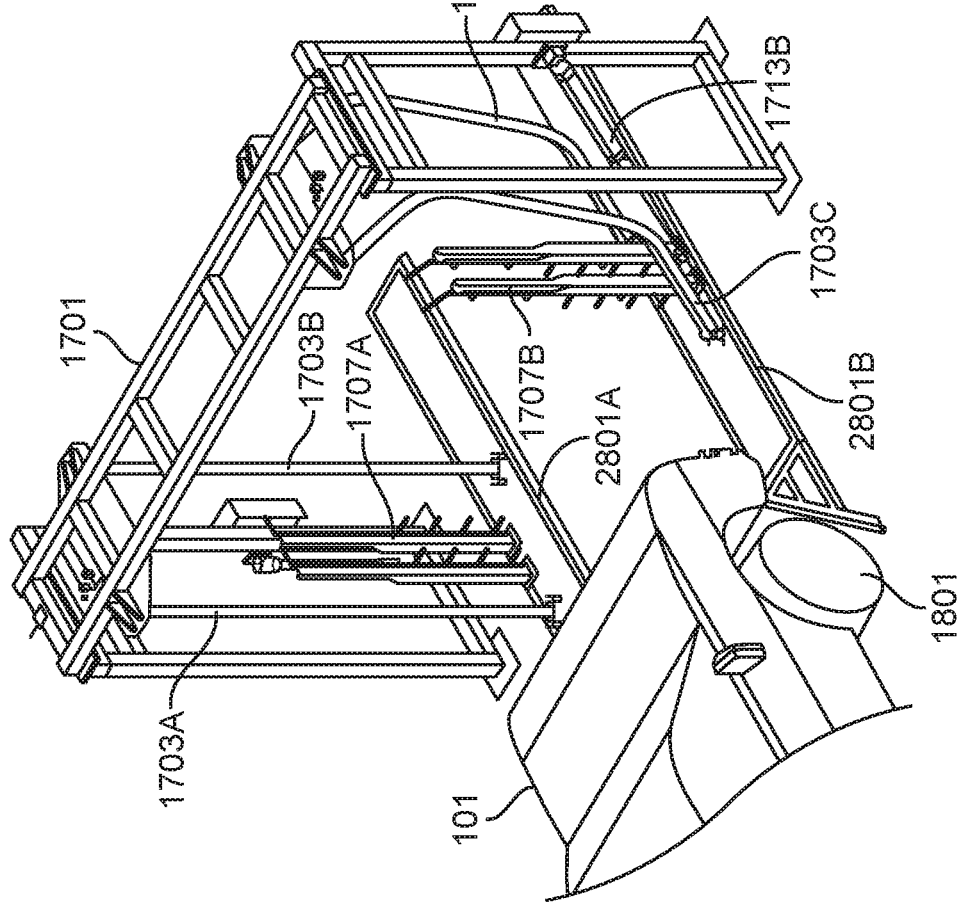
FIG. 29A
FIG. 29B

BRUSHLESS CAR WASH SYSTEM INCLUDING A TELESCOPING UNIT FOR WASHING TOP AND REAR SURFACES OF VEHICLES

BACKGROUND

1. Field of Art

The present disclosure generally relates to car wash systems for vehicles, and more specifically to automated brushless car wash systems.

2. Background of the Invention

Car wash systems are used to clean the exterior of vehicles using at least water and soap. One type of automated car wash systems is a tunnel car wash system (e.g., conveyor system). In a tunnel car wash system, a vehicle is driven onto a conveyor of the tunnel car wash system. The conveyer moves the vehicle through the tunnel of the tunnel car wash system where the different steps for washing the vehicle are performed from the initial step of pre-soaking of the vehicle with water to the final step of drying the vehicle.

Tunnel car wash systems typically use brushes, water, or a combination of brushes and water to wash vehicles. Using brushes to wash vehicles may damage the surface of the vehicle as the brushes contact the paint of the vehicles to remove any dirt, debris, and/or road film on the surface of the vehicles. The damage may include undesired scratches or swirl marks on the paint of the vehicles to broken parts on the vehicle as the brushes are caught on the parts during washing.

While certain conventional tunnel car wash systems may use high-pressure water (e.g., brushless) to wash vehicles to avoid damage on the paint of the vehicles, conventional brushless tunnel car wash systems typically are not capable of thoroughly cleaning the vehicles to remove road film on the vehicles. Thus, conventional tunnel car wash systems are unable to sufficiently clean vehicles.

SUMMARY

A two-stage brushless car wash system is disclosed. The two-stage brushless car wash system includes a first wash stage apparatus and a second wash stage apparatus that are independently controlled to wash an exterior of a vehicle. Both the first wash stage apparatus and the second wash stage apparatus account for the contour of the vehicle to enhance washing performance.

In one embodiment, the first wash stage apparatus is brushless and uses high-pressure water to wash upper surfaces of the vehicle including the front, top, and rear surfaces of the vehicle while accounting for the contour of the upper surfaces of the vehicle such that the first wash stage apparatus is in a constant proximity (e.g., within a distance range) to the upper surfaces of the vehicle during washing. The second wash stage apparatus is also brushless, and uses high-pressure water to wash the side surfaces of the vehicle after the first wash stage apparatus has completed washing the upper surfaces of the vehicle. Similar to the first wash stage apparatus, the second wash stage apparatus also accounts for the contours of the side surfaces of the vehicle during washing such that the second wash stage apparatus is in a constant proximity (e.g., within a distance range) to the side surfaces of the vehicle during washing.

In one embodiment, the first wash stage apparatus includes a wash unit that washes the upper surfaces of the vehicle. The height of the wash unit is adjusted based on the contour of the upper surfaces of the vehicle. By adjusting the height of the wash unit as the wash unit sprays the upper surfaces of the vehicle with water, the wash unit of the first wash stage apparatus is able to stay within a distance range from the upper surfaces of the vehicle thereby increasing the wash performance of the first wash stage.

In one embodiment, the height of the wash unit included in the first wash stage apparatus is adjusted using a telescoping unit (e.g., a height adjusting unit). The telescoping unit maybe be expanded or contracted according to the contour of the upper surfaces of the vehicle. In one embodiment, the telescoping unit is tilted at an angle. By tilting the telescoping unit, the telescoping wash unit is capable of adjusting the height of the wash unit so as to maintain a predetermined distance range to the rear surface of the vehicle as the vehicle moves away from the first wash stage. Thus, rear wash performance of the vehicle is enhanced.

In one embodiment, the second wash stage apparatus has a variable width. By having a variable width, the second wash stage may adjust its width according to the width of the vehicle being washed. By adjusting the width of the second wash stage, a wash unit included in the second wash stage may stay within a distance range from the side surfaces of the vehicle thereby enhancing wash performance. In one embodiment, the width of the second wash stage is adjusted due to physical contact between the second wash stage and the tires of the vehicle. The contact between the second wash stage and the tires sets the width of the second wash stage according to the width of the vehicle.

In one embodiment, a two-stage brushless car wash system comprises: a first brushless wash stage apparatus configured to wash a plurality of upper surfaces of an exterior of a vehicle, the first brushless wash stage apparatus including a plurality of nozzles whose height is adjusted a plurality of times as the plurality of nozzles spray the plurality of upper surfaces of the vehicle with water, the height of the plurality of nozzles adjusted according to a contour profile of the plurality of upper surfaces of the vehicle; and a second brushless wash stage apparatus configured to wash a plurality of side surfaces of the exterior of the vehicle independently from the first brushless wash stage apparatus, the second brushless wash stage including a plurality of nozzles that spray the plurality of side surfaces of the vehicle with water according to contours of the plurality of side surfaces of the exterior of the vehicle.

In one embodiment, a two-stage brushless car wash system comprises: a first brushless wash stage apparatus configured to wash a plurality of upper surfaces of a vehicle, the first brushless wash stage apparatus including a plurality of first nozzles that are controlled to follow along a contour of the plurality of upper surfaces of the vehicle as the plurality of first nozzles spray the plurality of upper surfaces of the vehicle with water; and a second brushless wash stage apparatus configured to wash a plurality of side surfaces of the vehicle that are distinct from the plurality of upper surfaces of the vehicle, the second brushless wash stage including a plurality of second nozzles that are independently controlled from the plurality of first nozzles of the first brushless wash stage to spray the plurality of side surfaces of the vehicle with water according to a contour of the plurality of side surfaces.

In one embodiment, a two-stage brushless car wash system comprises: a conveyor configured to transport a vehicle through the two-stage brushless car wash system; a first brushless wash stage apparatus configured to wash a rear surface of the vehicle using a plurality of first nozzles included in the first brushless wash stage, the plurality of first nozzles configured to spray water as the plurality of first nozzles follow a contour of the rear surface of the vehicle while the vehicle moves through and away from the first brushless wash stage apparatus; and a second brushless wash stage apparatus configured to wash a plurality of side surfaces of the vehicle using a plurality of second nozzles that spray the plurality of side surfaces of the vehicle with water.

In one embodiment, a brushless car wash system for washing a vehicle comprises: a wash unit configured to spray water on a plurality of upper surfaces of an exterior of the vehicle to wash the vehicle; and a height adjustment unit coupled to the wash unit at a first end of the height adjustment unit and configured to adjust a height of the wash unit as the plurality of upper surfaces of the exterior of the vehicle is washed, the height adjustment unit tilted at a fixed angle away from a front of the vehicle, the fixed angle measured with respect to a reference that is perpendicular to ground.

In one embodiment, a brushless car wash system for washing a vehicle comprises: a light curtain sensor configured to sense a plurality of height points of a plurality of upper surfaces of an exterior of the vehicle along a length of the vehicle, the light curtain sensor tilted at an angle toward a front of the vehicle, the angle measured with respect to a reference that is perpendicular to ground; a wash unit configured to spray water on the plurality of upper surfaces of the vehicle to wash the vehicle; and a height adjustment unit coupled to the wash unit at one end of the height adjustment unit and configured to adjust a height of the wash unit according to the plurality of height points as the vehicle is moved, the height adjustment unit tilted at an angle that corresponds to the angle of the light curtain sensor, the angle of the height adjustment unit measured with respect to the reference that is perpendicular to ground.

In one embodiment, a brushless car wash system for washing a vehicle comprises: a wash unit configured to spray water on an exterior of the vehicle to wash the vehicle; and a telescoping rail structure coupled to the wash unit at one end of the telescoping rail structure and configured to adjust a height of the wash unit by expanding or retracting a plurality of rail stages included in the telescoping rail structure as the vehicle is moved, the telescoping rail structure tilted at a fixed angle away from a front of the vehicle, the fixed angle measured with respect to a reference that is perpendicular to ground.

In one embodiment, a brushless car wash system for washing a vehicle comprises: a frame structure; a width adjustment unit configured to adjust a width of the brushless car wash system according to a width of the vehicle, the width adjustment unit including a plurality of base assemblies that hang from the frame structure, the plurality of base assemblies configured to physically contact the vehicle to adjust the width of the brushless car wash system according to the width of the vehicle; and a wash unit mounted on the plurality of plurality of base assemblies, the wash unit configured to spray water on a plurality of side surfaces of an exterior of the vehicle to wash the vehicle while the brushless car wash system is at the adjusted width.

In one embodiment, a brushless car wash system for washing a vehicle comprises: a width adjustment unit configured to adjust a width of the brushless car wash system according to a width of the vehicle, the width adjustment unit including a plurality of base assemblies that float off a ground surface and are configured to physically contact the vehicle to adjust the width of the brushless car wash system according to the width of the vehicle; and a wash unit mounted on the plurality of plurality of base assemblies, the wash unit configured to spray water on a plurality of side surfaces of an exterior of the vehicle to wash the vehicle while the brushless car wash system is at the adjusted width.

In one embodiment, a brushless car wash system for washing a vehicle comprises: a frame structure; a width adjustment unit configured to adjust a width of the brushless car wash system according to a width of the vehicle, the width adjustment unit including a plurality of arms and a plurality of base assemblies that hang from the frame structure via the plurality of arms, wherein each of the plurality of arms includes at least one bend; and a wash unit mounted on the plurality of plurality of base assemblies, the wash unit configured to spray water on a plurality of side surfaces of an exterior of the vehicle to wash the vehicle while the brushless car wash system is at the adjusted width.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 13A-13D illustrate various views of a wash unit of the first wash stage according to one embodiment.

FIGS. 18A-18D illustrate operation of the second wash stage according to the first embodiment.

FIGS. 24A to 24B illustrate plan views of the base assemblies according to the first embodiment.

FIGS. 29A-29C illustrate operation of the second wash stage according to the second embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
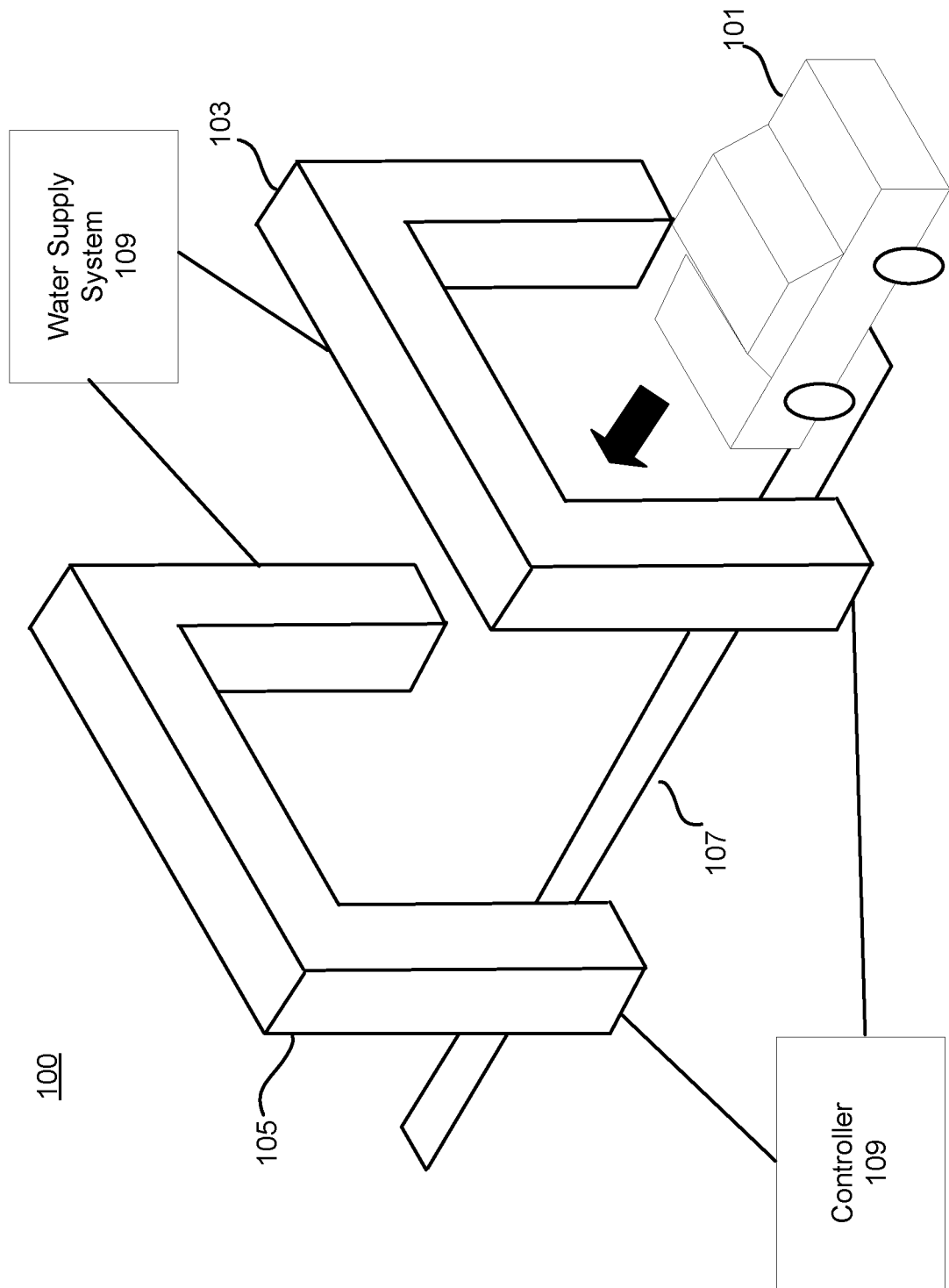
FIG. 1 is a high-level block diagram of the two-stage brushless car wash system according to one embodiment.

FIG. 1 is a high-level block diagram of the two-stage brushless car wash system 100 (hereinafter "car wash system 100") according to one embodiment. The car wash system 100 is a tunnel-based car wash system that washes an exterior of a vehicle 101 in multiple, separate stages, in one example. The car wash system 100 includes a first wash stage 103, a second wash stage 105, a conveyer 107, a controller 109, and a water supply system 109 in one embodiment. The first wash stage 103 washes the upper (e.g., top) surfaces of the vehicle 101 whereas the second wash stage 105 washes the side surfaces of the vehicle 101 in one embodiment. The first wash stage 103 and the second wash stage 105 are physically separated and independently controlled by the controller 109 to wash the exterior of the vehicle 101.

Figure 2:
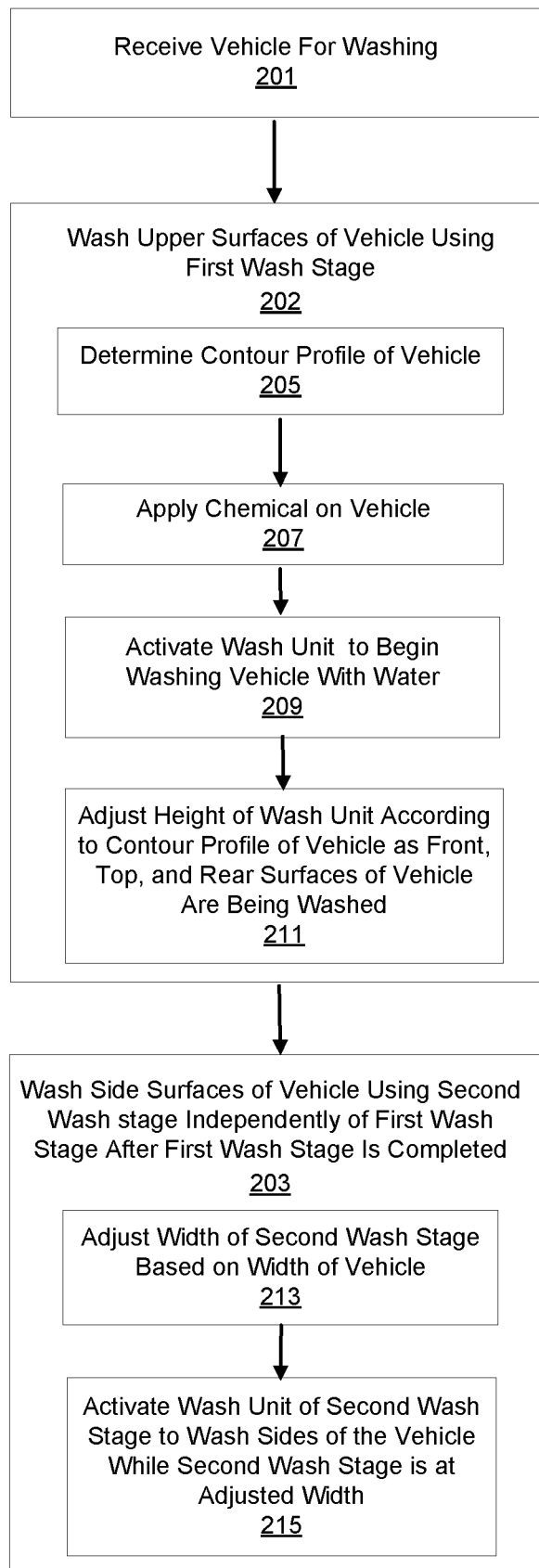
FIG. 2 is a method flow diagram illustrating the independently performed steps of the first wash stage and the second wash stage of the two-stage brushless car wash system according to one embodiment.

FIG. 2 is a method flow diagram illustrating the independently performed steps of the first wash stage 103 and the second wash stage 105 of the car wash system 100 to wash vehicle 101 according to one embodiment. The car wash system 100 receives 201 the vehicle 101 for washing. In one embodiment, the vehicle 101 is received when the vehicle 101 is driven onto the conveyer 107 included in the car wash system 100. The conveyor 107 transports the vehicle 101 along the car wash system 100 at a predetermined speed such that the vehicle 101 passes through the first wash stage 103 followed by the second wash stage 105 to wash the exterior surfaces of the vehicle 101. In one embodiment, the conveyor 107 transports the vehicle 101 through the car wash system 100 at a speed of 200 to 380 mm/s (7.8 to 14.9 inch/s) resulting in roughly 120-180 cars washed per hour. The conveyor 107 may transport the vehicle 101 at other speeds in different examples.

The car wash system 100 washes 202 upper surfaces of the vehicle 101 such as the front surface, top surface, and rear surface of the vehicle 101 using the first wash stage 103. In one embodiment, examples of the front surface of the vehicle 101 include the front bumper, examples of the top surface of the vehicle 101 include the hood, front windshield, roof, rear windshield, a truck bed, and top portion of the rear decklid of the vehicle 101, and examples of the rear surface of the vehicle 101 include the rear portion of the rear decklid and the rear bumper.

As will be described in further detail below, the first wash stage 103 is brushless. That is, the first wash stage 103 includes a wash unit (e.g., nozzles) that cleans the upper surfaces of the vehicle 101 without the use of brushes. The first wash stage 103 does not clean the side surfaces of the vehicle 101 as the second wash stage 105 washes the side surfaces of the vehicle 101 as will be further described below.

To wash the upper surfaces of the vehicle 101, the first wash stage 103 determines 205 the contour profile of the vehicle 201. The contour profile of the vehicle 101 describes various height points of the vehicle 101 along the length of the vehicle 101 according to one embodiment. The height points of the vehicle 101 included in the contour profile collectively describe the vertical shape of the front, top, and rear surface of the vehicle 101.

The first wash stage 103 applies 207 chemical to the vehicle 101. The first wash stage 103 applies the chemical to upper surfaces of the vehicle 101. In one embodiment, the first wash stage 103 may also apply chemical to the side surfaces of the vehicle 101. The chemical applied to upper surfaces of the vehicle 101 are used by the front wash stage 103 to wash the upper surfaces of the vehicle 101. The chemical applied to the side surfaces may be used by the second wash stage 105 to wash the side surfaces of the vehicle 101. The chemical may include for example soap or any other type of chemicals used during a car wash. In one embodiment, the first wash stage 103 may apply different soaps each with a different pH level to the vehicle 101.

After the chemical is applied to the vehicle 101, the first wash stage 103 activates 209 the wash unit of the first wash stage 103 to begin cleaning the vehicle 101 with water. The water sprayed by the wash unit of the first wash stage 103 is used to clean the upper surfaces of the vehicle 101. As the vehicle 101 is moved along the first wash stage 103 by the conveyor 107, the first wash stage 101 adjusts 211 the height of the wash unit according to the vertical contour profile of the vehicle 101 as the upper surfaces of the vehicle 101 are washed. Thus, the wash unit moves in accordance with the contour of the vehicle 101 to improve cleaning performance of the first wash stage 103 since the wash unit stays within a constant proximity to the upper surfaces of the vehicle (e.g., within a distance range).

As will be described in further detail below, adjusting the height of the wash unit of the first wash stage 103 allows the wash unit to maintain a predetermined distance range (e.g., the constant proximity) from the upper surfaces of the vehicle 101 to better clean the vehicle 101. By maintaining the predetermined distance range between the wash unit and the upper surfaces of the vehicle 101, the first wash stage 103 is capable of removing more dirt, grime, and/or road film from the upper surfaces of the vehicle 101 while reducing the amount of water used during the wash process compared to conventional brushless tunnel car wash systems. Also, damage to the paint of the vehicle 101 is at the very least reduced, since the first wash stage 103 is brushless.

After the first wash stage 103 has completed washing the upper surfaces of the vehicle 101, the vehicle 101 exits the first wash stage 103 and the conveyer 107 transports the vehicle 101 to the second wash stage 105. As mentioned previously, the second wash stage 105 washes 203 the side surfaces of the vehicle 101 independently from the first wash stage 103 after the first wash stage 103 is completed. Examples of the side surfaces of the vehicle include the front and rear fenders, the doors, side mirror, driver and/or passenger windows, wheels, and the sides of the front and rear bumpers.

In one embodiment, to wash the side surfaces of the vehicle 101 during the second wash stage 105, the width of the second wash stage 213 is adjusted 213 based on the width of the vehicle 101. After the width of the second wash stage 213 is adjusted, the wash unit of the second wash stage is activated 215 to wash the side surfaces of the vehicle 101. Adjusting the width of the second wash stage 105 allows for the wash unit of the second wash stage 105 to maintain a predetermined distance range from the side surfaces of the vehicle 101 to better clean the side surfaces of the vehicle 101. Thus, the wash unit of the second wash stage 105 is able to account for the contour of the side surface of the vehicle 101. By maintaining the predetermined distance range between the wash unit and the side surfaces of the vehicle 101, the second wash stage 105 is capable of removing more dirt, grime, and/or road film from the side surfaces of the vehicle 101 while reducing the amount of water used during the wash process compared to conventional brushless tunnel car wash systems.

In one embodiment, the water supply system 109 supplies water to the first wash stage 103 and the second wash stage 105. The water supplied by the water supply system 109 is pressurized at a predetermined pressure and is also heated to a predetermined temperature. In one embodiment, the water supply system 109 includes at least a boiler for heating and maintaining the water supplied to the first wash stage 103 and the second wash stage 105 at the predetermined temperature. The water supply system 109 may also include a pressure pump system for supplying the water to the first wash stage 103 and the second wash stage 105 at the predetermined pressure (e.g., 1000 PSI). The water supply system 109 may be housed in a machine room separate from the first wash stage 103 and second wash stage 105 or is in the same room as the first wash stage 103 and the second wash stage 105.

Overview of First Wash Stage 103

Figure 3A:
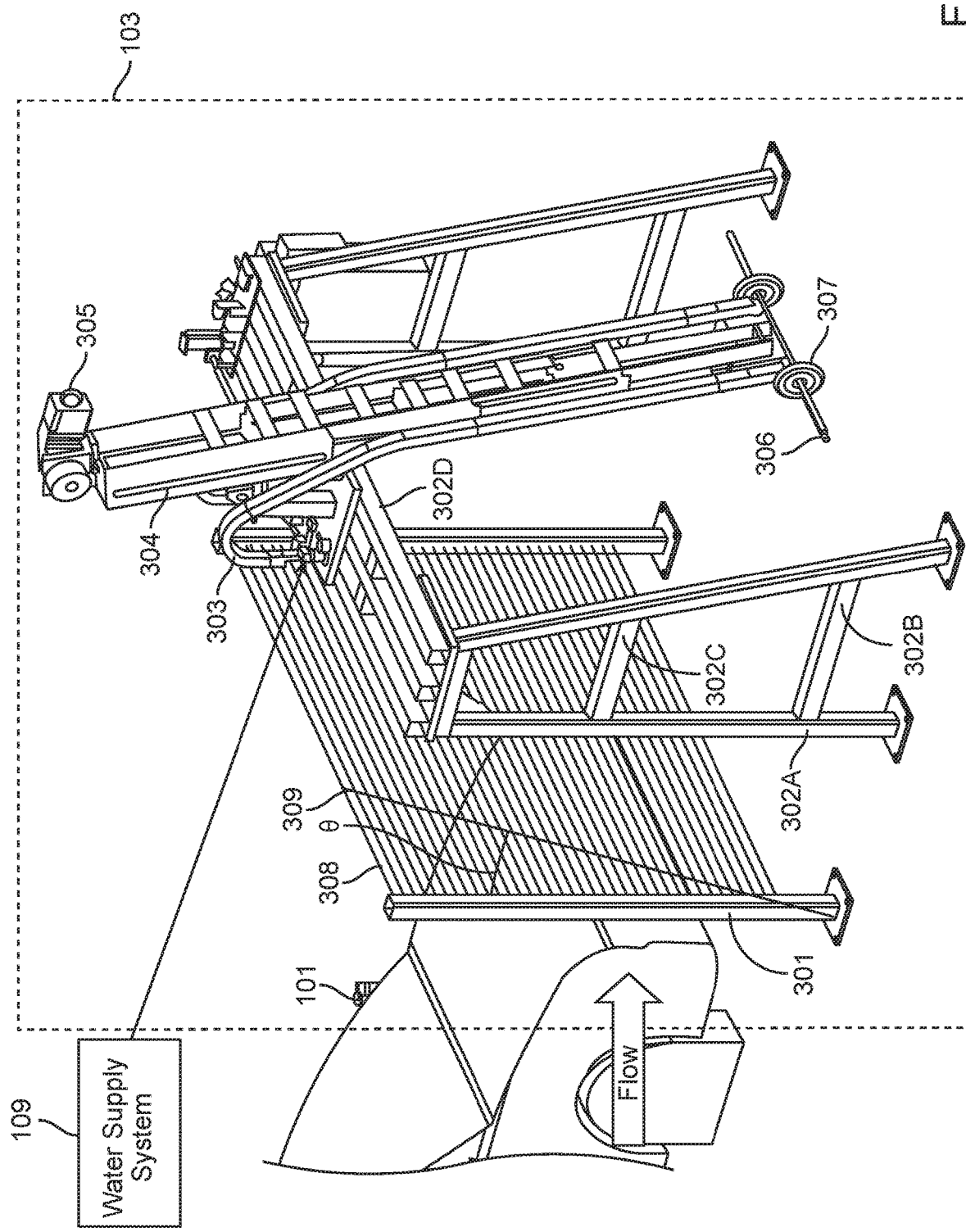
FIGS. 3A, 3B, and 3C respectively illustrate perspective, front, and side views, respectively, of the first wash stage of the two-stage brushless car wash system according to one embodiment.
Figure 3C:
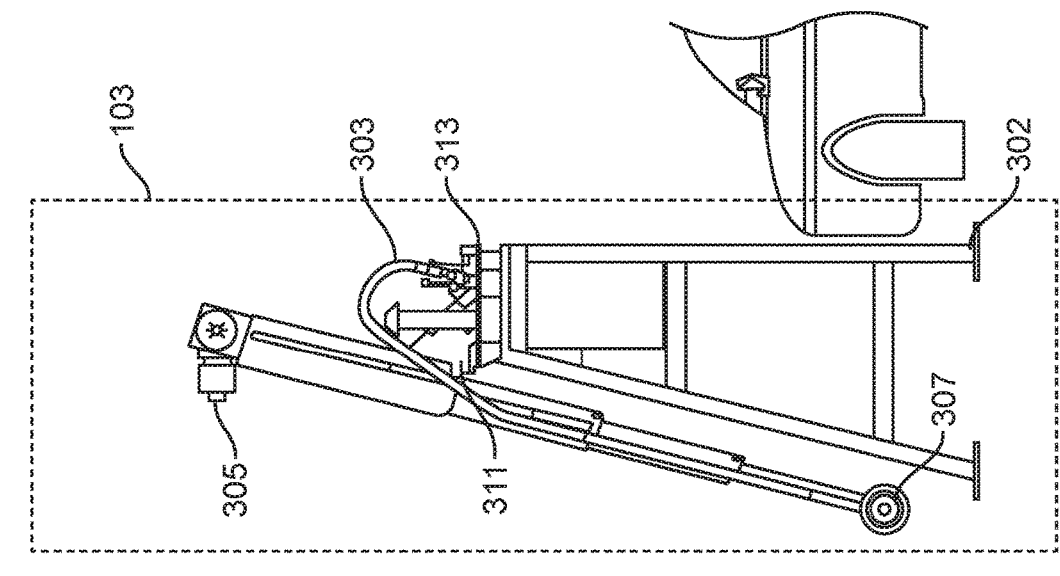
Figure 3B:
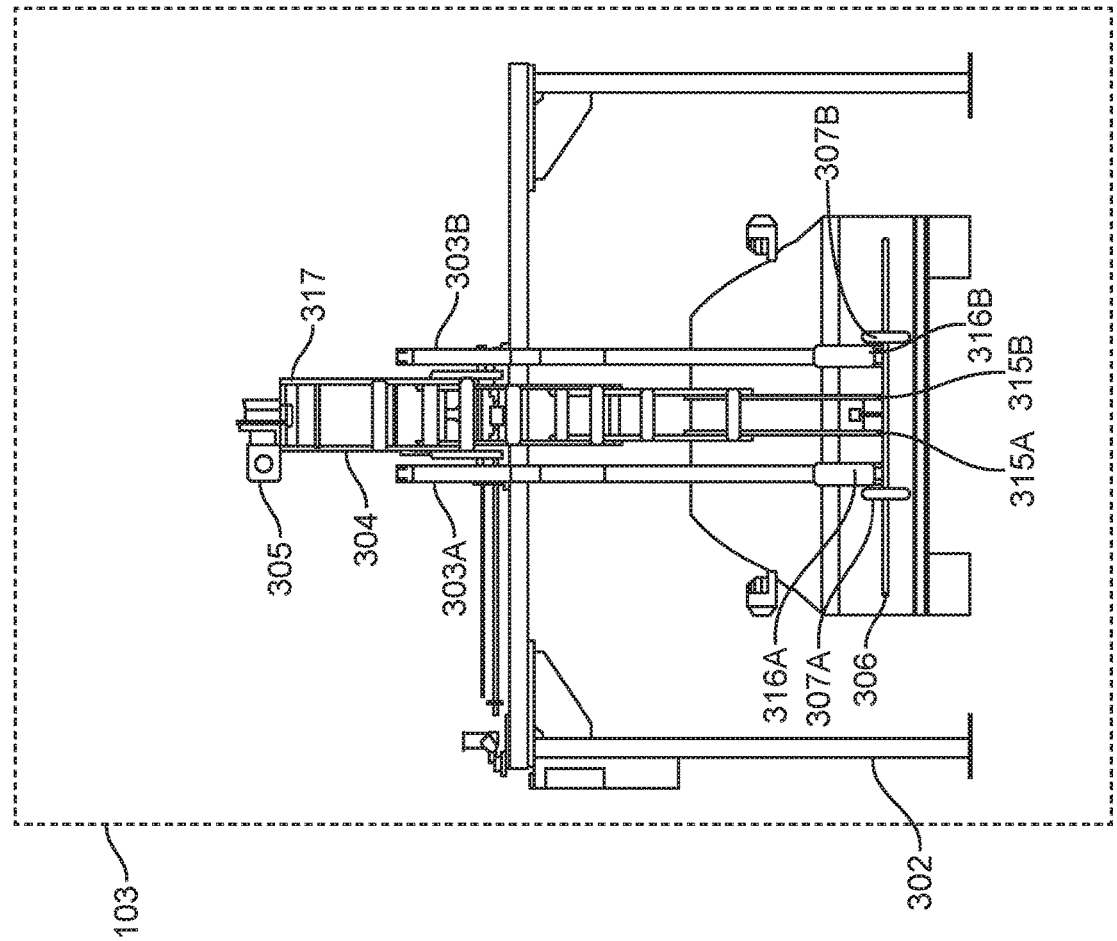

Referring to FIGS. 3A, 3B, and 3C, perspective, front, and side views, respectively, of the first wash stage 103 of the car wash system 100 are shown according to one embodiment. The first wash stage 103 includes an optical sensor 301, a frame 302, a water supply line 303, a telescoping unit 304, a motor 305, a wash unit 306, and a safety device 307 that are each described in further detail below. The first wash stage 103 may have additional or fewer components than described herein in other examples.

In one embodiment, the optical sensor 301 is used in conjunction with the controller 109 to identify the contour profile of the vehicle 101. As mentioned previously, the contour profile of the vehicle 101 includes a plurality of height points of the vehicle 101 that are measured along the length of the vehicle 101. Each height point represents a height of a part of the vehicle. The height points included in the contour profile of the vehicle 101 are arranged in an order of sensing from the optical sensor 301 to correctly describe the shape of the front, top, and rear surfaces of the vehicle 101.

In one embodiment, the optical sensor 301 may be positioned normal to ground (e.g., straight up ground). Alternatively, the optical sensor 301 may be tilted at a fixed angle Θ toward the front of the vehicle 101 where the angle Θ is measured from a reference 309 that is normal to the ground. For example, the optical sensor 301 may be positioned at a predetermined angle Θ range between 13-17 degrees from the reference 309. The optical sensor 301 may be angled in order to reduce the measured distance between the adjacent height points sensed by the optical sensor 103, as will be further described below.

In one embodiment, the optical sensor 301 is a light curtain sensor. The light curtain sensor includes a plurality of photoelectric beams. Each photoelectric beam emits light shown as an individual line of light 308 in FIG. 3A. Each individual line of light 308 represents a particular height. As the vehicle 101 passes through the light curtain sensor, the array of photoelectric beams sense intrusions into the plane of detection of the light curtain sensor and the various height points of the vehicle 101 are sensed based on which of the photoelectric beams are intruded. Based on the sensed points of intrusions communicated back to the controller 109, the controller 109 may determine the various height points of the front, top, and rear surfaces of the vehicle 101 to generate the contour profile of the vehicle 101.

In another embodiment, the optical sensor 301 is a three-dimension (3D) sensor. The 3D sensor is used to measure the dimensions of the vehicle 101 in three dimensions (e.g., x, y, and z dimensions) to generate the contour profile of the vehicle 101. The measured dimensions of the vehicle 101 include the heights of the upper surfaces of the vehicle 101.

In one embodiment, the 3D sensor includes at least two sensors (e.g., projected-light sensors) positioned towards the front of the vehicle 101. One sensor may be positioned at a driver side of the vehicle 101 and a second sensor may be positioned at a passenger side of the vehicle 101. As the vehicle 101 passes the sensors, each sensor illuminates the vehicle 101 with light (e.g., a laser) and measures the backscattered light to determine the dimensions (e.g., heights and/or widths) of the vehicle 101.

The frame 302 is a structure used to support the other components of the first wash stage such as the water supply line 303, the telescoping unit 304, the motor 305, the wash unit 306, and a safety device 307. The frame 302 includes a plurality of frame rails 302A-302D that collectively form the frame 302D and mechanically support the water supply line 303, telescoping unit 304, and motor 305. The frame 302 may be made of metal such as steel or aluminum or other metals.

In one embodiment, the frame 302 has a height greater than 90 inches and a width of 134 inches in one embodiment to accommodate vehicles 101 with a maximum height of 90 inches and a maximum width of 90 inches. However, the frame 302 may have different dimensions depending on the size of the vehicles being washed.

The telescoping unit 304 may be considered a height adjustment unit since the telescoping unit 304 adjusts a height of the wash unit 306. The telescoping unit 304 is a telescoping rail, in one embodiment. The telescoping unit 304 is configured to retract or expand in accordance with the contour profile of the vehicle 101, so as to maintain the predetermined distance range between the wash unit 306 and the upper surfaces of the vehicle 101 during the first wash stage 103. As shown in FIG. 3C, a portion 311 of the telescoping unit 304 is mounted to the frame 302 using a mounting plate 313. As shown in FIGS. 3A and 3C, the mounting plate 313 is mounted to frame rail 302D. The mounting plate 313 may be mounted to the frame rail 302D using fasteners such as nuts and bolts, or the mounting plate 313 may be welded to the frame rail 302D.

The wash unit 306 may be a water manifold with a plurality of nozzles attached to the water manifold as will be further described in detail below. The wash unit 306 is used to spray pressurized water on the upper surfaces of the vehicle 101 to clean the vehicle 101. The wash unit 306 is attached to ends 315A, 315B of the telescoping unit 304 as shown in FIG. 3B. As mentioned above, the wash unit 306 is maintained within a predetermined distance range between the upper surfaces of the vehicle 101 during the first wash stage to enhance wash performance.

The water supply lines 303 supply water provided by the water supply system 109 to the wash unit 306. The water supply lines 303 may include water supply line 303A and water supply line 303B that are each disposed at one side of the telescoping unit 304 as shown in FIG. 3B. An end of each water supply line is attached to the wash unit 306. For example, the end 316A of water supply line 303A is attached to the wash unit 306 and the end 316B of water supply line 303B is attached to the wash unit 306.

The motor 305 is configured to spin to retract or expand the telescoping unit 304 while the vehicle 101 is being washed during the first wash stage 103. The motor 305 is controlled by the controller 109 to retract or expand the telescoping unit 304 in accordance with the contour profile of the vehicle 101 so that the wash unit 306 is maintained at the predetermined distance range of the surface of the front, top, and rear surfaces of the vehicle 101. In one embodiment, the motor 305 is attached to the upper most end 317 of the telescoping unit 304.

The safety device 307 is configured to reduce damage to the vehicle 101 upon impact between the vehicle 101 and the safety device 307. The safety device 307 includes shock absorbent material that absorbs shock so as to reduce damage to the vehicle 101 upon impact. Impact may occur if the telescoping unit 304 is not properly retracted in accordance with the contour profile of the vehicle 101.

In one embodiment, the safety device 307 includes a plurality of safety devices 307A and 307B. As will be further described below, the plurality of safety devices are attached to the wash unit 306 such that each safety device surrounds a portion of the wash unit 306. Safety device 307A is positioned on the wash unit 306 such that it is at one side of the water supply line 303A (e.g., left of the water supply line 303A) and safety device 307B is positioned on the wash unit 306 such that it is to another side of the water supply line 303B (e.g., right of the water supply line 303B). Although the safety device 307 shown herein includes two safety devices, any number of safety devices may be used.

Figure 4:
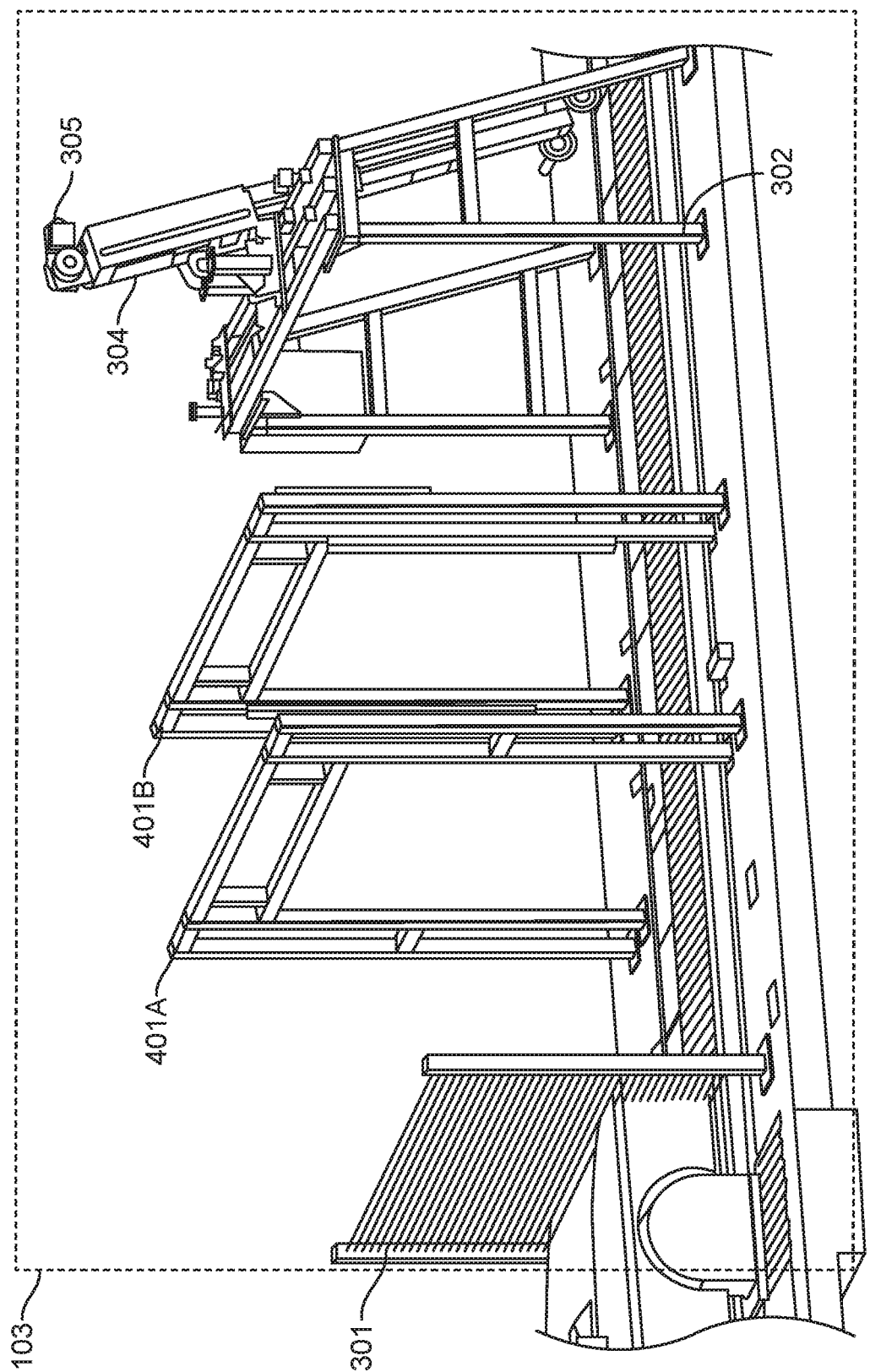
FIG. 4 illustrates chemical arches included in the first wash stage of the two-stage brushless car wash system according to one embodiment.

Referring to FIG. 4, the first wash stage 103 may also include a plurality of chemical arches 401. Generally, chemical arches 401 are structures that spray chemicals on the vehicle 101 during the wash process of the car wash system 100. The chemicals include soap for example.

In one embodiment, the chemical arches 401 apply detergent to the upper surfaces of the vehicle 101. The chemical arches 401 may also apply detergent to the side surfaces of the vehicle 101. In one embodiment, each of the chemical arches 401A and 401B simultaneously spray the upper surfaces and the side surfaces of the vehicle 101 with detergent. The detergent applied to the upper surfaces of the vehicle 101 are used by the first wash stage 103 to wash the upper surfaces vehicle. In some embodiments, the detergent applied to the side surfaces may be used by the second wash stage 105 to wash the side surfaces of the vehicle 101. In some embodiments, the detergent sprayed by the first chemical arch 401A and the detergent sprayed by the second chemical arch 401B are the same. Alternatively, the detergent sprayed by the first chemical arch 401A is different from the detergent sprayed by the second chemical arch 401B. An example of detergent is soap.

In one embodiment, chemical arch 401A applies detergent with a first pH level to the vehicle 101 and chemical arch 401B applies detergent with a second pH level to the vehicle 101. The first and second pH levels are different from each other in one embodiment, but may be the same in other embodiments.

As shown in FIG. 4, the chemical arches 401 are positioned between the optical sensor 301 and the frame 302. In one embodiment, the first chemical arch 401A is positioned at least 157 inches to a maximum of 236 inches from the optical sensor 301. In one embodiment, the distance between chemical arch 401A and 401B may be different from car wash to car wash. The distance between the chemical arches 401 may be based upon different actors such as dwell time between the different detergents applied by the chemical arches 401 and speed of the conveyor 107, for example. In one embodiment, a different optical sensor from the optical sensor 301 may be used to activate the chemical arches 401.

Optical Sensor 301

Figure 5A:
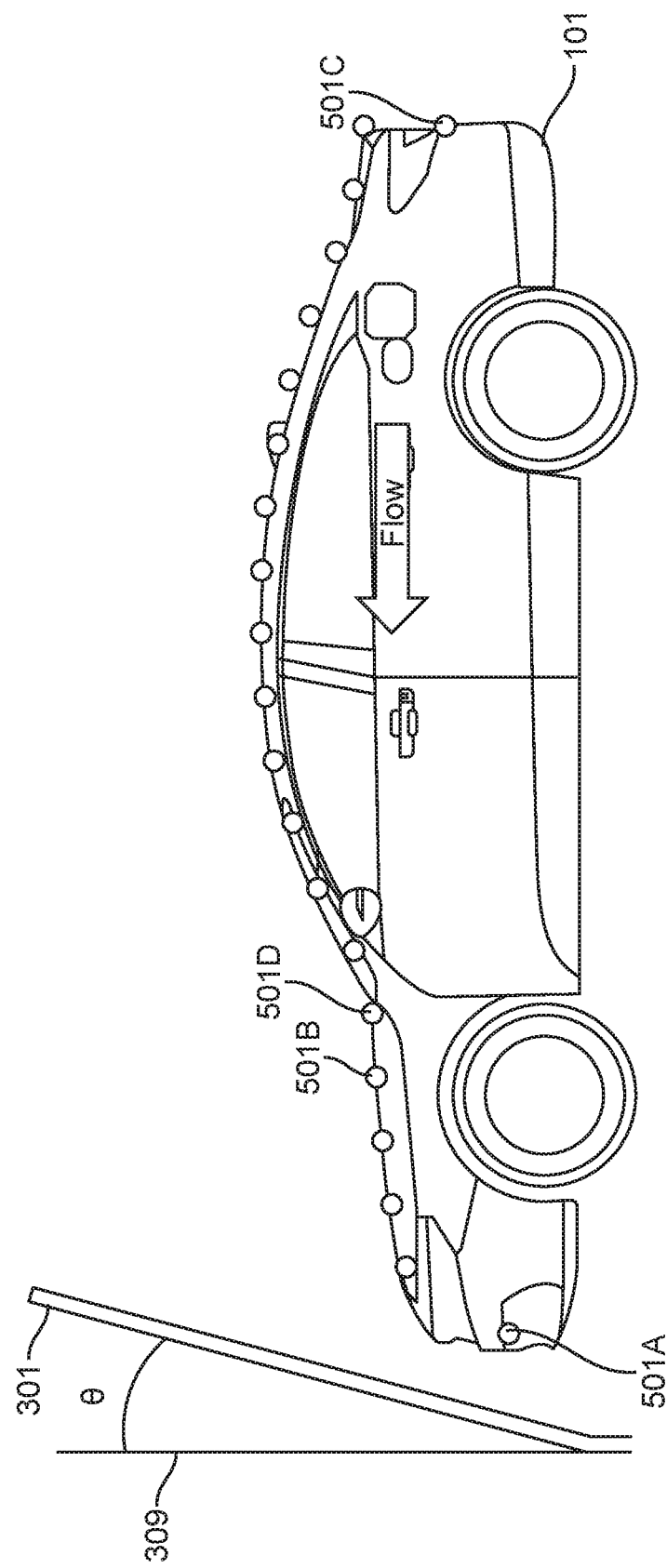
FIGS. 5A and 5B illustrate an optical sensor included in the first wash stage of the two-stage brushless car wash system and sensing data of a vehicle according to one embodiment.
Figure 5B:
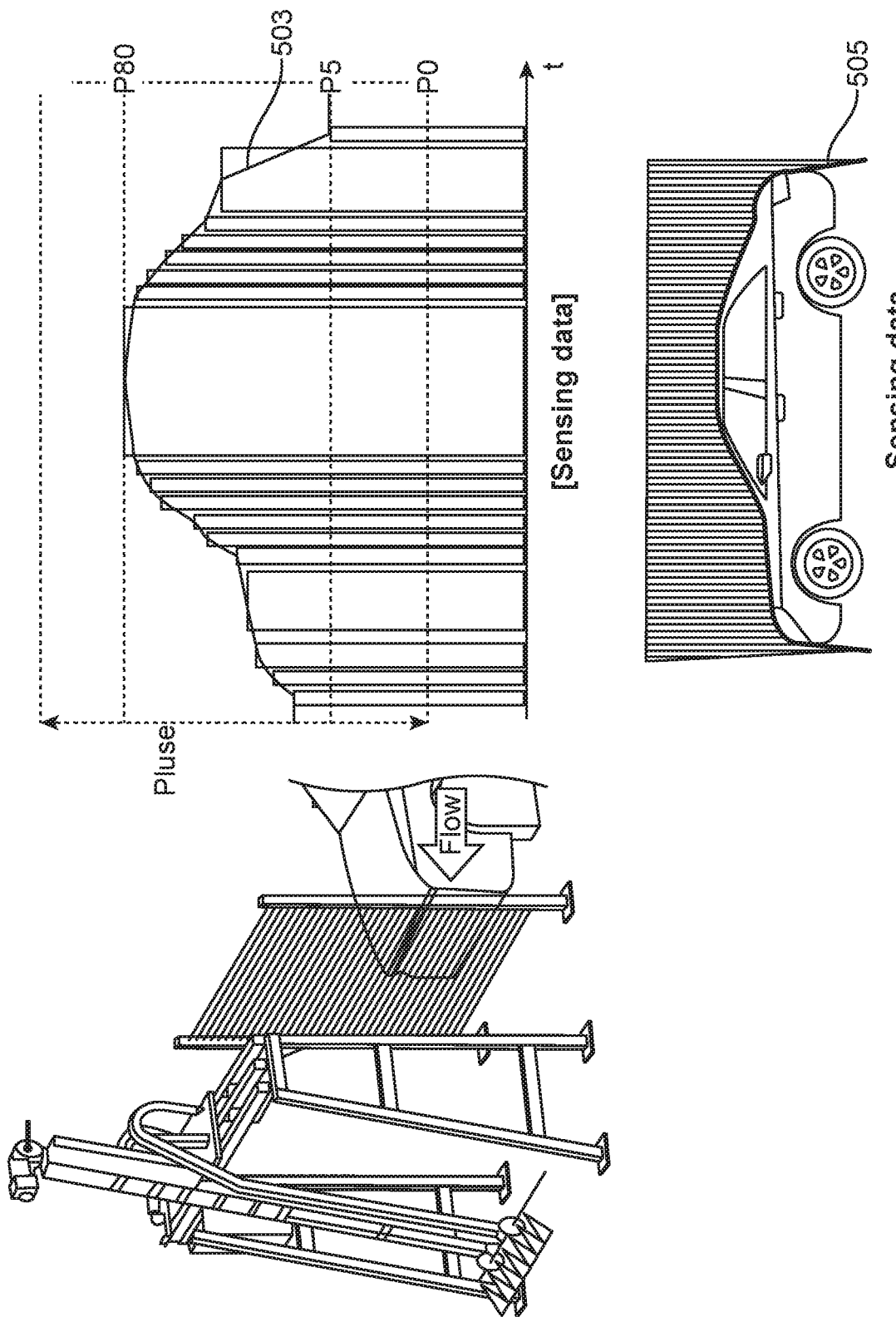

FIG. 5A illustrates a plurality of height points of the vehicle 101 according to one embodiment. As mentioned previously, the optical sensor 301 is used in conduction with the controller 109 to identify the contour profile of the vehicle 101 that describes the different height points of the vehicle 101. In FIG. 5A, each dot 501 represents a height point along one of the upper surfaces of the vehicle 101. For example, dot 501A represents a height of a front surface of the vehicle (e.g., on the front bumper), dots 501B and 501D represent adjacent heights on the top surface of the vehicle 101 (e.g., on the hood), and dot 501C represents a height on the rear surface of the vehicle 101 (e.g., on the rear bumper). The optical sensor 301 and controller 109 may determine multiple height points along each of the front, top, and rear surfaces of the vehicle. FIG. 5B illustrates a graph 503 of the height points of the vehicle 101 sensed over time by the optical sensor 301 and controller 109. The different height points collectively represent the contour 505 of the upper surfaces of the vehicle 101, as shown in FIG. 5B.

As mentioned previously, in the embodiment where the optical sensor 301 is a light curtain sensor, the light curtain sensor may be positioned at an angle Θ toward the front of the vehicle 101 where the angle Θ is measured from a reference 309 that is normal to the ground as shown in FIG. 5A. The optical sensor 301 may be positioned at an angle range between 13-17 degrees from the reference 309 in order to reduce the measured distance between adjacent vehicle height points (e.g., heights 501B and 501D) measured using the optical sensor 301. In one embodiment, the angle range of the optical sensor 301 is based on factors including speed of the vehicle 101 though the car wash system 100 and speed in which the telescoping unit 304 can be expanded/retracted. In one embodiment, positioning the optical sensor 301 within the angle range of 13-17 degrees from the reference 309 is based on the assumption that the moving speed of the vehicle is in a speed range of 200 mm/s to 380 mm/s (e.g., 7.8 inches/s to 14.9 inches/s) and that the telescoping unit 304 can retract/expand at a maximum speed of 1 m/s.

Generally, the performance of the optical sensor 304 in measuring the height points of the vehicle 101 varies depending on the angle of the optical sensor 301 as shown in Table 1 below. The performance of the optical sensor 301 describes the distance between adjacent height points. In one embodiment, the optimum performance of the first wash stage 103 occurs when the distance measured between adjacent height points by the optical sensor 301 is 1 meter or less, given that the telescoping unit 304 may expand/retract at a maximum speed of 1 m/s.

Generally, the distance between adjacent height points measured using the optical sensor 301 vary depending on the angle of the optical sensor 301. For example, positioning the optical sensor 301 at an angle range of 13 to 17 degrees allows for adjacent height points measured using the optical sensor 301 to be within 1 meter of each other and can measure front and rear heights above 1 meter. Thus, the angle range of 13 to 17 degrees for the optical sensor 301 is optimal given that the maximum speed of the telescoping unit 304 is 1 m/s.

In contrast, positioning the optical sensor at an angle less than the angle range of 13 to 17 degrees such as between 0 to 12 degrees results in the distance between adjacent height points on the front, top, and rear surfaces of the vehicle 101 increasing compared to the distance between adjacent height points measured when the angle of the optical sensor 301 is in the angle range of 13-17 degrees. Furthermore, using an angle of 0 to 12 degrees is advantageous for recognizing the height of the front of the vehicle 101 as the optical sensor 301 can measure heights above 600 mm (23.6 in), but disadvantageous for measuring heights of the rear surface of the vehicle 101.

Also, positioning the optical sensor at an angle greater than the angle range of 13 to 17 degrees such as between 18 to 20 degrees results in the distance between adjacent height points on the front, top, and rear surfaces of the vehicle 101 decreasing compared to the distance between adjacent height points measured when the angle of the optical sensor 301 is in the angle range of 13-17 degrees. However, using an angle of 18 to 20 degrees is advantageous for recognizing the height of the rear of the vehicle 101 as the optical sensor 301 can measure heights above 800 mm (31.5 in), but is disadvantageous for measuring heights of the front of the vehicle 101. Thus, using an angle range of 13 to 17 degrees for the optical sensor 301 results in the best performance for measuring the heights of the front and rear surfaces of the vehicle 101 while reducing the distance between adjacent heights measured using the optical sensor 301.

Telescoping Unit Operation

FIGS. 6A-6H illustrate operation of the first wash stage 103 of the wash system 100 to wash front, top, and rear surfaces of a vehicle 101 according to one embodiment. In particular, FIGS. 6A-6H illustrate how the height of the wash unit 306 is adjusted in accordance with the vertical contour profile of the vehicle 101 by retracting or expanding the telescoping unit 304. Due to the height of the wash unit 306 being adjusted as the vehicle is moved under the wash unit 306, the wash unit 306 is kept within a predetermined distance range from the upper surfaces of the vehicle 101 to increase cleaning efficiency. In one embodiment, the wash

TABLE 1

| Sensor Angle | 0-12 degrees | 13-17 degrees | 18-20 degrees |
| --- | --- | --- | --- |
| Vehicle Moving Speed | 200 mm/s to 380 mm/s (e.g., 7.8 in/s to 14.9 in/s) | 200 mm/s to 380 mm/s (e.g., 7.8 in/s to 14.9 in/s) | 200 mm/s to 380 mm/s (e.g., 7.8 in/s to 14.9 in/s) |
| Performance | Distance between adjacent height points increases compared to angle range 13-17 degrees. Advantageous for measuring height of front of vehicle, but disadvantageous for measuring height of rear of vehicle. | Distance between adjacent height points within 1 m. Advantageous for measuring height of both front and rear surfaces of vehicle | Distance between adjacent height points decreases compared to angle range 13-17 degrees. Advantageous for measuring height of rear of vehicle, but disadvantageous for measuring height of front of vehicle. | unit 306 is kept within the predetermined distance range of 10 to 15 inches from the upper surfaces of the vehicle 100 during the first wash stage 103 as the vehicle is moved under the wash unit 306. By keeping the wash unit 306 within the predetermined distance range, the water temperature of the water output by the wash unit 306 may be in a predetermined temperature range (e.g., 110 to 140 degrees F.) when the water contacts the upper surfaces of the vehicle 101 thereby resulting in enhanced wash performance in one embodiment.

Figure 6A:
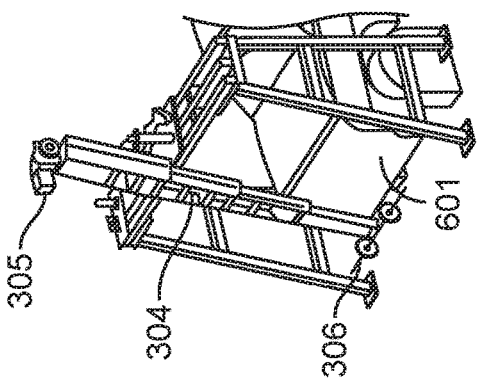
FIGS. 6A-6H illustrate operation of the first wash stage of the two-stage brushless car wash system according to one embodiment.
Figure 6B:
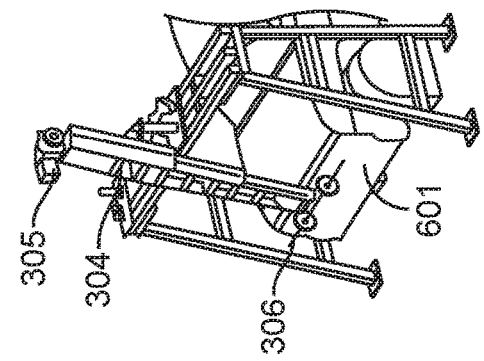
Figure 6C:
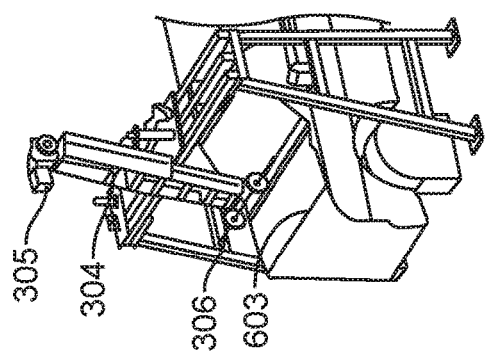
Figure 6D:
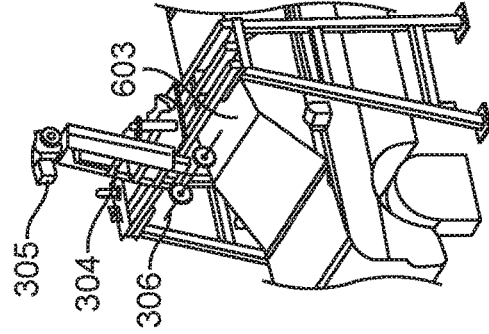
Figure 6E:
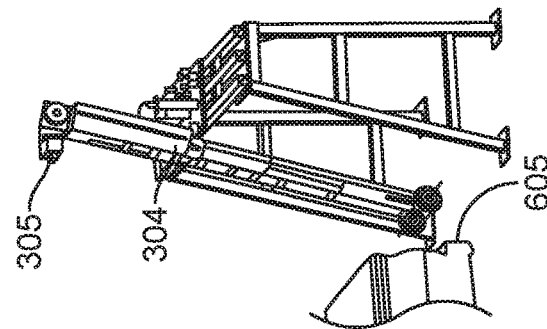
Figure 6F:
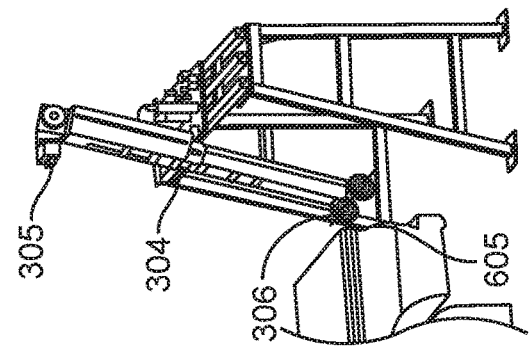
Figure 6G:
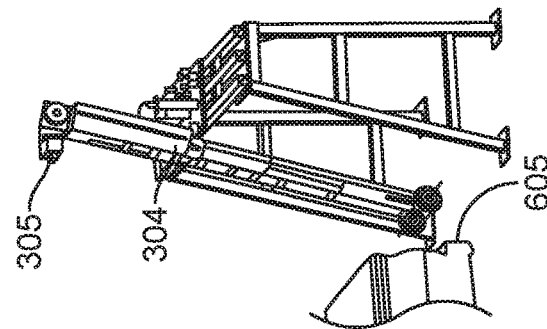
Figure 6H:
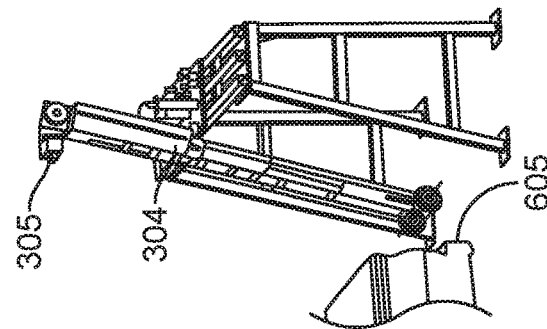

FIG. 6A illustrates the initial position of the wash unit 306. The motor 304 extends the telescoping unit 304 so as to position the wash unit 306 at a position associated with a first height included in the contour profile for the vehicle 101 to begin washing the front surface 601 of the vehicle 101. In FIG. 6B, the motor 305 retracts the telescoping unit 304 in accordance with the contour profile of the vehicle 101 to raise the wash unit 306 as the wash unit continues to spray water to clean the front surface 601 of the vehicle 101. In FIG. 6C, the motor 305 further retracts the telescoping unit 304 thereby raising the wash unit 306 to wash the top surface 603 (e.g., the hood) of the vehicle 101. In FIG. 6D, the motor 305 again retracts the telescoping unit 304 further thereby raising the wash unit 306 to wash the top surface (e.g., the roof) 603 of the vehicle 101, and the motor 305 maintains the height of the telescoping unit 304 across the roof of the vehicle 101 as shown in FIG. 6E. In FIG. 6F, the motor 305 expands the telescoping unit 304 thereby lowering the wash unit 306 to wash the top surface (e.g., the bed) 603 of the vehicle, and the motor 305 maintains the height of the telescoping unit 304 across the bed of the vehicle as shown in FIG. 6F. The motor 305 further expands the telescoping unit 304 in FIGS. 6G-6H to wash the rear surfaces 605 of the vehicle 601 as described with respect to FIG. 7.

Figure 7:
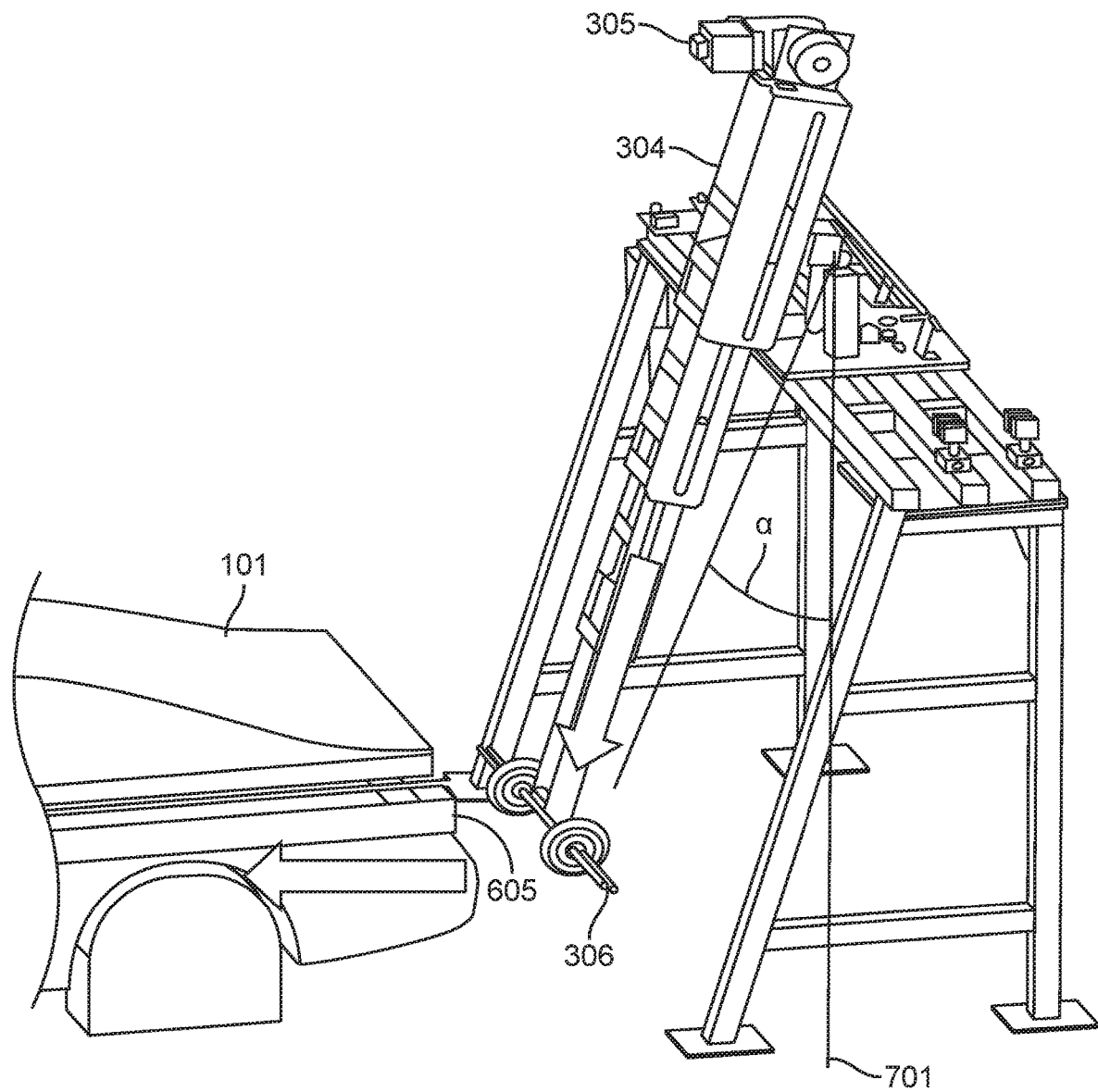
FIG. 7 illustrates operation of the first wash stage of the two-stage brushless car wash system to wash the rear surface of a vehicle according to one embodiment.

FIG. 7 illustrates a detailed view of the first wash stage 103 as the rear surface 605 of the vehicle 101 is washed. As shown in FIG. 7, the telescoping unit 304 is positioned at an angle within a predetermined angle range a with respect to reference line 701 that is positioned normal to ground. In one embodiment, the telescoping unit 304 is at the fixed angle within the angle range a while the telescoping unit 304 is not in contact with the vehicle 101. That is, the telescoping unit 304 remains at the angle during the duration of the first wash stage 103 unless there is contact between the telescoping unit 304 and the vehicle 101.

As shown in FIG. 7, the telescoping unit 304 is angled toward the rear surface 605 of the vehicle 101 as the vehicle moves away from the first wash stage 103. By angling the telescoping unit 304 toward the rear surface 605 at the angle α while washing the rear of the vehicle 101, the wash unit 306 is able to stay within a predetermined distance range from the rear surface 605 of the vehicle 101 for a duration of time as the vehicle 101 moves farther away from the first wash stage 103. If the telescoping unit 304 were not angled toward the rear of the vehicle 101 while washing the rear surface of the vehicle 101, the telescoping unit 304 would move only in the vertical direction (e.g., not in horizontal direction) and the wash unit 306 would be unable to maintain the predetermined distance range to the rear surface of the vehicle 101 as the vehicle 101 moves away from the first wash stage 103. This results in insufficient cleaning of the rear surface of the vehicle 101.

However, since the telescoping unit 304 is angled towards the rear surface of the vehicle 101 at the angle α while washing the rear surface, the wash unit 306 is able to stay within the predetermined distance range from the rear surface 605 as the vehicle 101 moves away for a duration of time until the vehicle 101 moves farther away from the first wash stage 103. While washing the rear surface of the vehicle 101, the angled telescoping unit 304 moves in both the horizontal and vertical directions as the telescoping unit 304 is expanded due to the telescoping unit 304 being tilted at the angle α. Since the telescoping unit 304 moves in both the horizontal and vertical direction as the telescoping unit 304 expands, the telescoping unit 304 allows for the wash unit 304 to stay within the predetermined distance range from the rear of the vehicle 101 for a duration of time as the vehicle 101 moves away from the first wash stage 101. That is, the first wash stage 103 follows a contour of the rear surface of the vehicle 101 as the vehicle 101 is moving away from the first wash stage 103. Since the first wash stage 103 is capable of following the contour of the rear surface of the vehicle 101 as the vehicle moves away from the first wash stage 103, the rear surface of the vehicle 101 is more thoroughly cleaned compared to if the telescoping unit 304 were to only move in the vertical direction while washing the rear surface of the vehicle 101.

The telescoping unit 304 may be positioned at an angle within an angle range that matches the angle range of the optical sensor 301 in one embodiment. That is, the telescoping unit 304 may be tilted at an angle within an angle range that is the same as the angle range of the optical sensor 301. For example, the telescoping unit 304 is positioned at an angle between the angle range of 13 to 17 degrees from the reference 701 and the angle range of the optical sensor 301 is also 13 to 17 degrees. In one embodiment, the telescoping unit 304 is tilted at the same angle as the optical sensor 301. For example, both the telescoping unit 304 and the optical sensor 301 are tilted at an angle of 15 degrees. However, in other embodiments the telescoping unit 304 is positioned at an angle that is different from the angle of the optical sensor 301. For example, the telescoping unit 304 is positioned at an angle between the angle range of 13 to 17 degrees from the reference line 701 whereas the optical sensor 301 is not tilted (e.g., positioned normal to ground).

In one embodiment, the angle range of the telescoping unit 304 is set based on various factors including the predetermined distance range from the wash unit 306 to the upper surfaces of the vehicle 301, the initial position (e.g., initial height) of the wash unit 306, and the size of the safety device 307. In one embodiment, positioning the telescoping unit 304 within the angle range of 13-17 degrees from the reference 701 is based on the assumption that the wash unit 306 is kept within the predetermined distance range of 10 to 15 inches from the upper surfaces of the vehicle 100, that the wash unit 306's initial position above ground level is in a range from 480 mm to 520 mm (e.g., 18.8 in to 20.5 in), and the diameter of the safety device 307 is in a range of 280 mm to 320 mm (e.g., 11 in to 12.6 in).

The performance of the telescoping unit 304 varies depending on the angle of the telescoping unit 304 as shown in Table 2 below.

TABLE 2

| Telescoping Unit Angle | 0-12 degrees | 13-17 degrees | 18-20 degrees |
|---|---|---|---|
| Distance from Water Nozzle to Vehicle Surface | 250 mm to 300 mm (e.g., 9.8 in to 11.8 in) | 250 mm to 300 mm (e.g., 9.8 in to 11.8 in) | 250 mm to 300 mm (e.g., 9.8 in to 11.8 in) |
| Water Nozzle Initial Position | 480 mm to 520 mm (e.g., 18.8 in to 20.5 in) | 480 mm to 520 mm (e.g., 18.8 in to 20.5 in) | 480 mm to 520 mm (e.g., 18.8 in to 20.5 in) |
| Safety Device Diameter | 280 mm to 320 mm (e.g., 11 in to 12.6 in) | 280 mm to 320 mm (e.g., 11 in to 12.6 in) | 280 mm to 320 mm (e.g., 11 in to 12.6 in) |
| Nozzle Distance Performance | Excellent | Good | Poor |
| Collision Performance | Good | Excellent | Poor |
| Front Cleaning Performance | Excellent | Good | Poor |
| Rear Cleaning Performance | Poor | Good | Excellent |

Table 2 above describes the performance of the telescoping unit 304 when positioned at the different angle ranges of 1) 0 to 12 degrees 2) 13 to 17 degrees and 3) 18 to 20 degrees. The performance of the telescoping unit 304 is described with respect to different types of performance criteria such as nozzle distance performance, collision performance, front cleaning performance, and rear cleaning performance. For each type of performance criteria, each angle range is assigned a score of "excellent," "good," or "poor" as will be further described below.

In one embodiment, nozzle distance performance describes how well ends of nozzles of the wash unit 306 are able to stay within the predetermined water nozzle distance range to the upper surfaces of the vehicle 101 (e.g., 250 mm to 300 mm) when the telescoping unit 304 is positioned at a given angle range. Note that the predetermined water nozzle distance range of 250 mm to 300 mm (e.g., 9.8 to 11.8 inches) is the range used for testing the various telescoping unit 304 angles. However, in one embodiment the optimum water nozzle distance range between the wash unit 306 and the upper surface of the vehicle 101 for wash performance is 10 to 15 inches.

Generally, the nozzles of the wash unit 306 are positioned as close as possible to the upper surfaces of the vehicle 101 without contacting the vehicle. A score of "excellent" indicates that the wash unit 306 is maintained at the lower end of the predetermined water nozzle distance range (e.g., 250 mm) whereas as score of "good" indicates that the wash unit 306 is maintained at a distance corresponding to the center of the range (e.g., 275 mm) in one embodiment. A score of "poor" indicates that the wash unit 306 is at a distance from the upper surfaces of the vehicle 101 that are outside of the predetermined water nozzle distance range. A nozzle distance performance score of "good" or "excellent" are considered acceptable performance whereas a score of "poor" is unacceptable performance in one embodiment.

As shown in Table 2, positioning the telescoping unit 304 at an angle range of 13-17 degrees resulted in "good" nozzle distance performance whereas positioning the telescoping unit 304 at the angle range of 0 to 12 degrees resulted in "excellent" nozzle distance performance. In contrast, positioning the telescoping unit 304 at the angle range of 18 to 20 degrees resulted in "poor" nozzle distance performance.

In one embodiment, collision performance describes the likelihood (e.g., risk) of collision between the telescoping unit 304 and the front, top, and rear surfaces of the vehicle 101. With respect to collision performance, a score of "excellent" indicates that it is unlikely that an impact will occur between the telescoping unit 304 and the vehicle 101, whereas a score of "good" indicates that there is a possibility of impact between the telescoping unit 304 and the vehicle 101. In contrast, a score of "poor" indicates that a collision between the telescoping unit 304 and the vehicle 101 is likely to occur. A collision performance score of "good" or "excellent" are considered acceptable performance whereas a score of "poor" is unacceptable performance in one embodiment.

As shown in Table 2, positioning the telescoping unit 304 at an angle range of 13-17 degrees resulted in "excellent" collision performance indicating that a collision between the telescoping unit 304 and the vehicle 101 is unlikely to occur, whereas positioning the telescoping unit 304 at the angle range of 0 to 12 degrees resulted in "good" collision performance. Since the angle range of 0 to 12 degrees resulted in "good" collision performance, there is still a danger of contact between the telescoping unit 304 and the vehicle 101. As shown in Table 2, positioning the telescoping unit 304 at the angle range of 18-20 degrees resulted in "poor" performance indicating that contact between the telescoping unit 304 and the vehicle 101 is likely.

In one embodiment, front cleaning performance describes the front cleaning efficiency of the front surface of the vehicle 101 using the first wash stage 103. Front cleaning efficiency relates to how much of the front surface of the vehicle is washed. With respect to front cleaning performance, a score of "excellent" indicates that almost all of the front surface of the vehicle is washed whereas a score of "good" indicates a majority of the front surface of the vehicle 101 is washed. In contrast, a score of "poor" indicates that the majority of the front surface of the vehicle is unwashed after washing is performed by the first wash stage 101. A front performance score of "good" or "excellent" are considered acceptable performance whereas a score of "poor" is unacceptable performance in one embodiment.

As shown in Table 2, positioning the telescoping unit 304 at an angle range of 13-17 degrees resulted in "good" front cleaning performance in that the majority of the front surface of the vehicle 101 is cleaned. Similarly, positioning the telescoping unit 304 at an angle range of 0 to 12 degrees resulted in "excellent" front cleaning performance in that almost all of the front surface of the vehicle 101 is cleaned. As shown in Table 2, positioning the telescoping unit 304 at the angle range of 18-20 degrees resulted in "poor" performance indicating that the majority of the front surface of the vehicle 101 is unwashed after washing is performed by the first wash stage 101.

In one embodiment, rear cleaning performance describes the rear cleaning efficiency of the rear surface of the vehicle 101 using the first wash stage 103. Rear cleaning efficiency relates to how much of the rear surface of the vehicle is washed. With respect to rear cleaning performance, a score of "excellent" indicates that almost all of the rear surface of the vehicle is washed whereas a score of "good" indicates a majority of the rear surface of the vehicle 101 is washed. In contrast, a score of "poor" indicates that the majority of the rear surface of the vehicle is unwashed after washing is performed by the first wash stage 101. A rear performance score of "good" or "excellent" are considered acceptable performance whereas a score of "poor" is unacceptable performance in one embodiment.

As shown in Table 2, positioning the telescoping unit 304 at the angle range of 13 to 17 degrees resulted in "good" cleaning performance in that the majority of the rear surface of the vehicle 101 is washed. Due to the angle range of 13 to 17 degrees of the telescoping unit 304, the wash unit 306 is able to wash the majority of the rear surface of the vehicle 101 as the vehicle 101 moves away from the front wash stage 101. In contrast, positioning the telescoping unit 304 at an angle range of 0-12 degrees resulted in "poor" rear cleaning performance in that the majority of the front surface of the vehicle 101 is unwashed. Due to the shallow angle of the telescoping unit 304 when positioned at the angle range of 0 to 12 degrees, the wash unit 306 cannot adequately clean the rear surface of the vehicle 101 as it moves away from the front wash stage 101 due the telescoping unit 304 moving in the vertical direction, but not the horizontal direction. Since the telescoping unit 304 moves mostly in the vertical direction, the wash unit 306 cannot stay within the predetermined distance range to the rear surface of the vehicle 101 as the vehicle 101 moves away from the first wash stage 103. Lastly, positioning the telescoping unit 304 at an angle range of 18 to 20 degrees resulted in "excellent" rear cleaning performance in that the majority of the rear surface of the vehicle 101 is cleaned during the first wash stage 101. Due to the large angle, the wash unit 306 is able wash almost all of the rear surface of the vehicle 101 as the vehicle 101 moves away from the first wash stage 101 since the telescoping unit 304 moves in both the horizontal and vertical direction as the telescoping unit 304 expands to wash the rear surface of the vehicle 101.

As shown in Table 2, in general as the angle range of the telescoping unit 304 decreases, the likelihood of collision decreases while also reducing overall cleaning performance (e.g., front and rear cleaning performance). In contrast, as the angle range of the telescoping unit 304 increases, the overall cleaning efficiency (e.g., front and rear cleaning performance) increases, but at the expense of decreased collision performance. The angle range of 13 to 17 degrees for the telescoping unit 304 results in the best balance of the different types of performance criteria such as nozzle distance performance, collision performance, front cleaning performance, and rear cleaning performance.

Telescoping Unit 304

FIGS. 8A-8D illustrates a detailed view of stages of the telescoping unit 304 according to one embodiment. Note that there are states of the telescoping unit 304 that are in between the different states of the telescoping unit 304 shown in FIGS. 8A-8D. In one embodiment, the telescoping unit 304 includes a plurality of rail stages 801A, 801B, 801C, and 801D. Rail stage 801A is the first rail stage, rail stage 801B is the second rail stage, rail stage 801C is the third rail stage, and rail stage 801D is the fourth rail stage, for example. In one embodiment, the telescoping unit 304 is collapsible such that rail stages 801B to 801D can be collapsed to fit within rail stage 801A as will be described. The rail stages 801 may be made of aluminum for example, but other materials may be used.

Figure 8D:
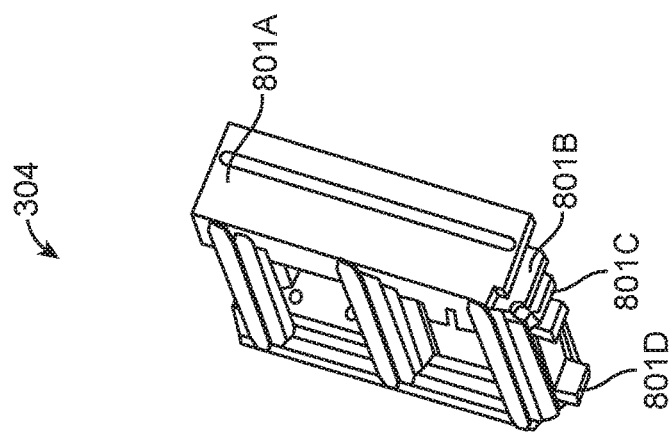
FIGS. 8A-8D show the retraction operation of a telescoping unit of the first wash stage according to one embodiment.
Figure 8C:
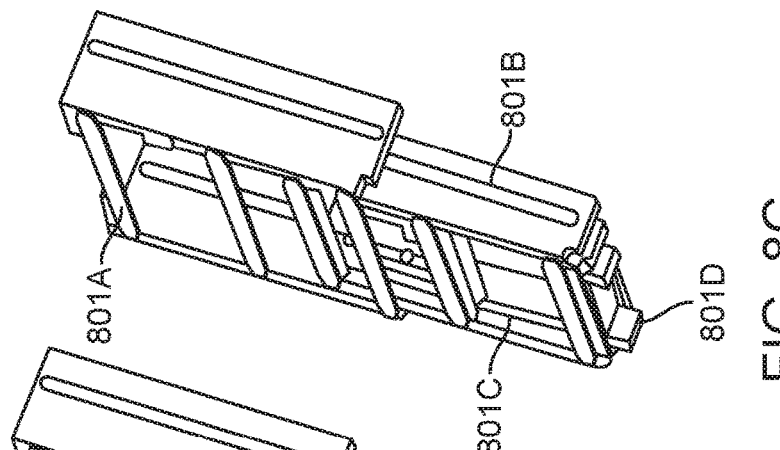
Figure 8B:
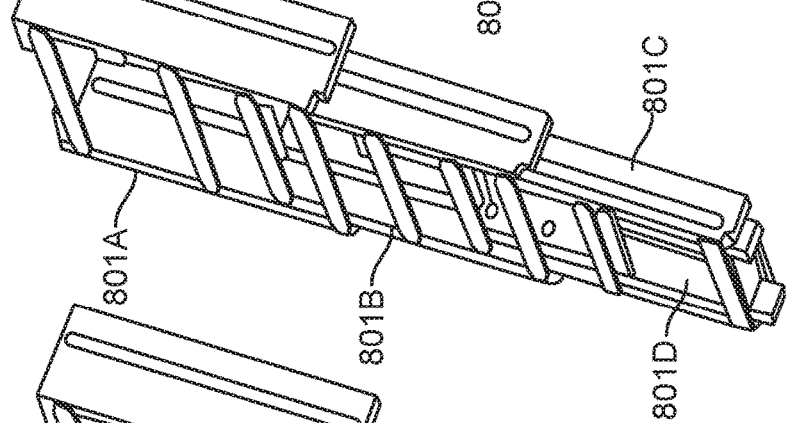
Figure 8A:
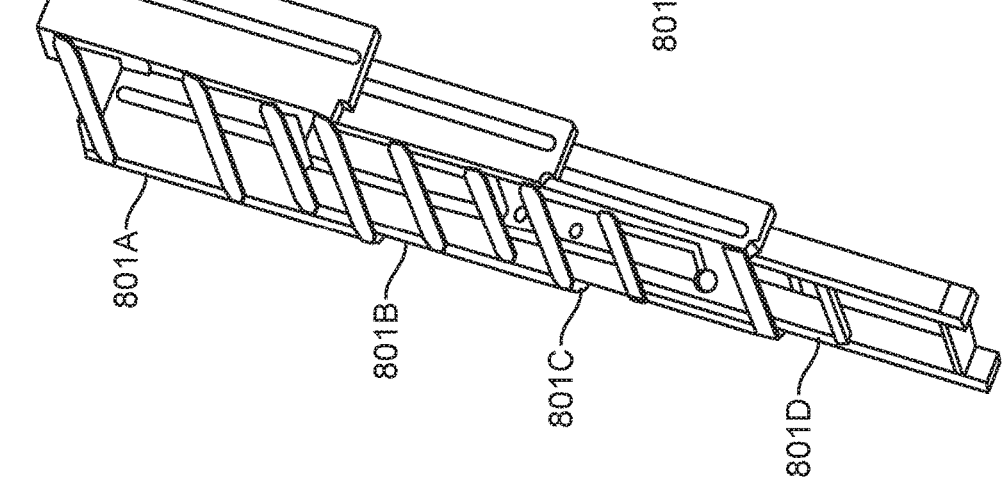

FIG. 8A illustrates the telescoping unit 304 in the fully expanded state. In the fully expanded state, each rail stage 801 is fully expanded such that it protrudes from its preceding rail stage as far as possible. In the fully expanded state, the telescoping unit 304 is at its longest possible length. In the fully expanded state of the telescoping unit 304, rail stage 801D is fully expanded from rail stage 801C, rail stage 801C is fully expanded from rail stage 801B, and rail stage 801B is fully expanded from rail stage 801A.

FIG. 8B illustrates the telescoping unit 304 in a first intermediate state. In the first intermediate state, the last rail stage 801D is collapsed within its preceding rail stage 801C. In the first intermediate state, rail stage 801D is housed within its preceding rail stage 801C while rail stage 801C and rail stage 801B are fully expanded from their respective preceding rail stage. For example, rail stage 801C is fully expanded from rail stage 801B and rail stage 801B is fully expanded from rail stage 801A.

FIG. 8C illustrates the telescoping unit 304 in a second intermediate state. In the second intermediate state, the last rail stage 801D is collapsed within its preceding rail stage 801C and the third rail stage 801C is collapsed within its preceding rail stage 801B. In the second intermediate state, rail stage 801C is housed within its preceding rail stage 801B while rail stage 801B is fully expanded from its respective preceding rail stage. For example, rail stage 801B is fully expanded from rail stage 801A. Since the last rail stage 801D is collapsed within rail stage 801C from the first intermediate stage, the last rail stage 801D is also collapsed within rail stage 801B while rail stage 801C is collapsed within rail stage 801B.

FIG. 8D illustrates the telescoping unit 304 in a fully collapsed state. In the fully collapsed state, the telescoping unit 304 is at its shortest possible length. As shown in FIG. 8D, in the fully collapsed state, the second rail stage 801B is collapsed within its preceding rail stage 801A (e.g., its first rail stage). Since rail stage 801D and rail stage 801C are both collapsed within rail stage 801B in the second intermediate state, in the fully collapsed state, rail stages 801D, 801C, and 801B are all housed within rail stage 801A.

Figure 8E:
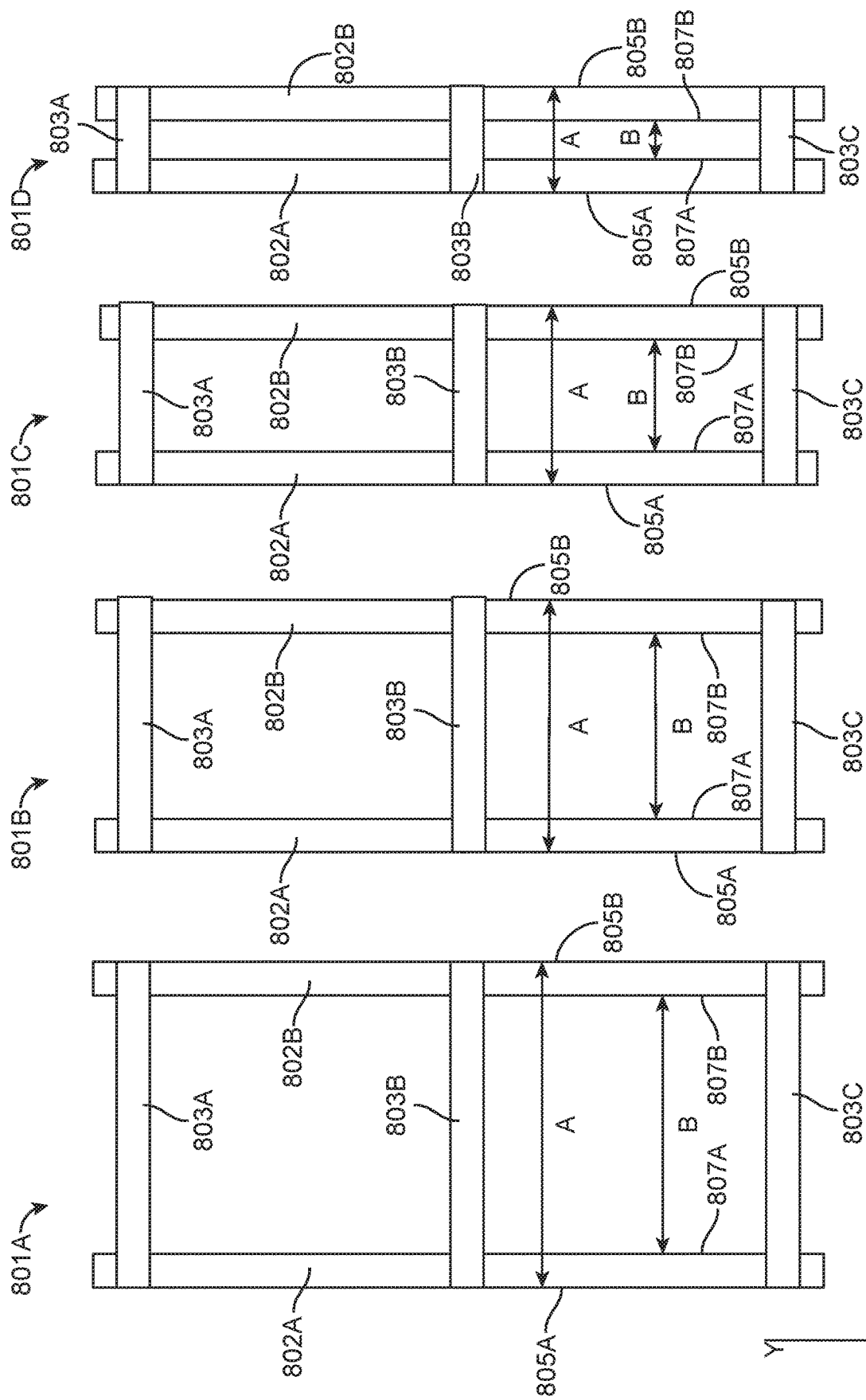
FIG. 8E illustrates a plan view of the telescoping unit according to one embodiment.

FIG. 8E illustrates a plan view of each of rail stages 801A to 801D according to one embodiment. As shown in FIG. 8E, each rail stage 801A-801D includes a plurality of vertical sides 802 arranged along a first direction (e.g., Y direction) and a plurality of horizontal sides 803 arranged along a second direction (e.g., X direction). For example, the plurality of vertical sides 802 of each rail stage 801A-801D include a vertical side 802A and a vertical side 802B opposite to the vertical side 802A. Furthermore, the plurality of horizontal sides 803 of each rail stage 801A-801D includes a horizontal side 803A, horizontal side 803B, and horizontal side 803B spaced apart from each other, for example.

Each rail stage 801A to 801D includes an outer width A measured from the outer edge 805A of the vertical side 802A to the outer edge 805B of vertical side 802B of the respective rail stage 801, and an inner width B measured from the inner edge 807A of the vertical side 802A to the inner edge 807B of vertical side 802B of the respective rail stage. As shown in Figure A, outer width A is greater than inner width B for each respective rail stage.

As shown in FIG. 8E, rail stage 801A is the widest rail stage amongst all the rail stages given that rail stages 801B to 801D are configured to be housed within rail stage 801A when the telescoping unit 304 is fully collapsed. That is, rail stage 801A has the widest width A from amongst all rail stages 801A to 801D. Each subsequent rail stage following rail stage 801A has a smaller width A than the rail stage that preceded it. For example, the outer width A of rail stage 801B is less than the outer width A of rail stage 801A, but is greater than the outer width A of rail stage 801C and rail stage 801D. The outer width A of rail stage 801C is wider than outer width A of rail stage 801D, but less than outer width A of rail stage 801B and outer width A of rail stage 801A. Lastly, outer width A of rail stage 801D is less than outer width A of each of rail stages 801A to 801C.

In one embodiment, the outer width A of each rail stage except for rail stage 801A is less than the inner width B of the rail stage immediately preceding the given rail stage. This allows for each rail stage except for rail stage 801A to fit within the preceding rail stage when the telescoping unit 304 is collapsed. For example, the outer width A of rail stage 801B is less than the inner width B of rail stage 801A so that rail stage 801B can fit within rail stage 801A when the telescoping unit 304 is collapsed. Similarly, the outer width A of rail stage 801C is less than the inner width B of rail stage 801B so that rail stage 801C can fit within rail stage 801B when the telescoping unit 304 is collapsed. Lastly, the outer width A of rail stage 801D is less than the inner width B of rail stage 801C so that rail stage 801D can fit within rail stage 801C when the telescoping unit 304 is collapsed.

Figure 8F:
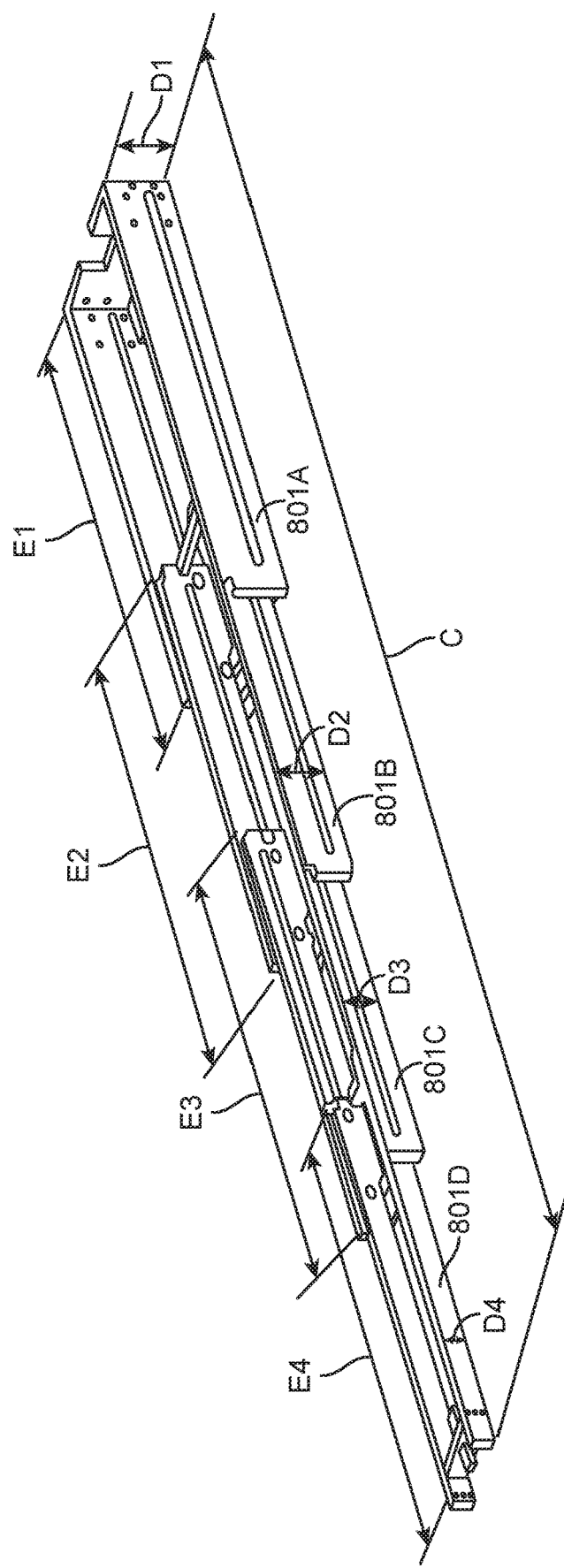
FIG. 8F illustrates a perspective view of the telescoping unit in the expanded state according to one embodiment.

FIG. 8F illustrates a perspective view of the telescoping unit 304 according to one embodiment. In the fully expanded state, the telescoping unit 304 has a length C of 266 to 267 inches according to one embodiment. However, other lengths may be used for length C. The plurality of rail stages each have a length E (e.g., lengths E1, E2, E3, and E4). In one embodiment, rail stage 801A is the longest rail stage with a length E1 of 89 inches. The remaining rail stages 801B to 801D have the same length E of 59 inches in one embodiment. In other embodiments, rail stages 801B to 801D have different lengths or the same length.

In one embodiment, each rail stage 801 has a thickness D. Rail stage 801A has the largest thickness D amongst all rail stages 801 (e.g., thicknesses D1, D2, D3, and D3). The thickness D4 of each rail stage 801 subsequent to rail stage 801A decreases such that the thickness D of a given rail stage is smaller than the preceding rail stage. For example, the thickness D2 of rail stage 801B is smaller than thickness D1 of rail stage 801A. Similarly, thickness D3 of rail stage 801C is smaller than thickness D2 of rail stage 801B. Lastly, thickness D4 of rail stage 801D is smaller than thickness D3 of rail stage 801C.

Figure 9A:
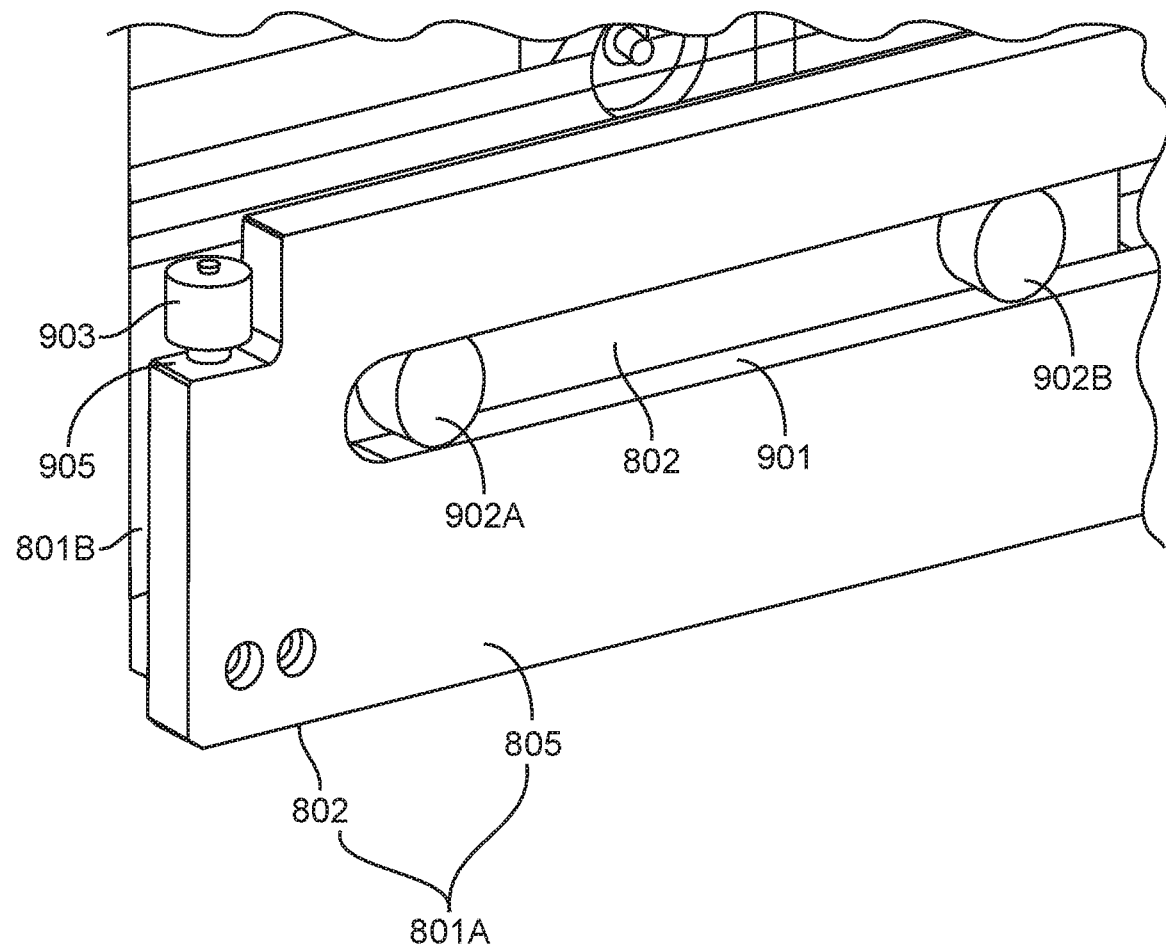
FIGS. 9A-9D illustrate detailed views of components of the telescoping unit of the first wash stage according to one embodiment.
Figure 9B:
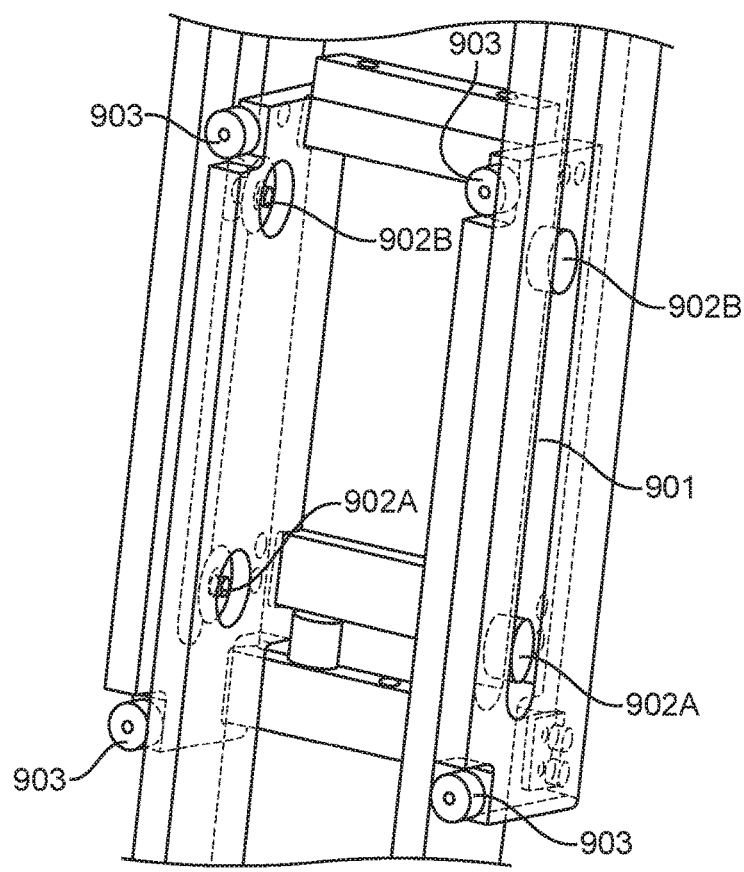
Figure 9C:
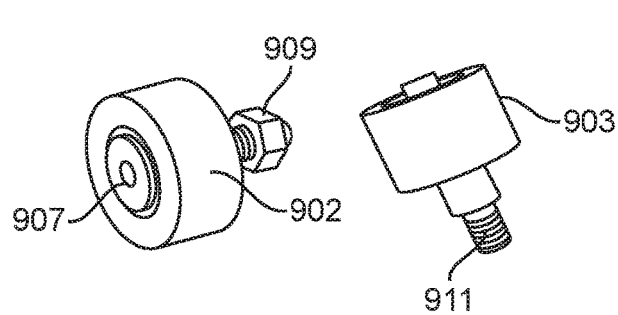
Figure 9D:
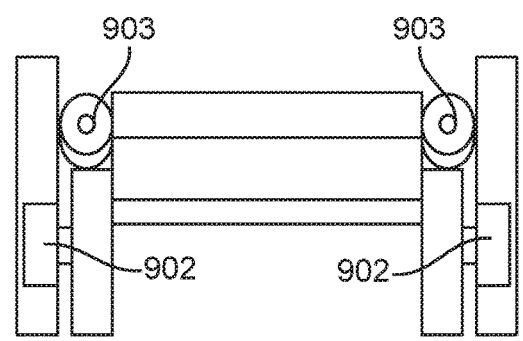

Referring to FIGS. 9A-9D, components of a rail stage 801 are shown according to one embodiment. The components of the rail stage 801 shown in FIGS. 9A-9D are applicable to all of the rail stages 801. In one embodiment, each vertical side 802 of each rail stage 801 except for rail stage 801A includes a plurality of side rollers 902 disposed at one end (e.g., a top end) of the rail stage 801. FIG. 9A illustrates that the vertical side 802 of the rail stage 801B includes a first side roller 902A and second side roller 902B. The side rollers 902 of each rail stage 801 are mounted on the outer edge 805 of the rail stage 801. Referring specifically to FIG. 9C, each side roller 902 is mounted to the outer surface 805 of its respective rail stage 801 using fasteners such as a nut 909 and bolt 907.

Thus, each rail stage 801 except for rail stage 801A may include a total of four side rollers 901 with two side rollers mounted on the outer edge 805 of each vertical side 802 of the rail stage 801. Having four side rollers 901 reduces the likelihood of the telescoping unit 304 of shaking while being collapsed or expanded. In one embodiment, the side rollers 902 are made of nylon, but other materials may be used. The side rollers 901 may have a diameter of 1 inch for example, but may have other diameters.

Furthermore, in one embodiment, both vertical sides 802A and 802B of each rail stage 801 includes a slot 901 that runs along the length of each vertical side 802 as shown in FIG. 9A. The side rollers 902 of a given rail stage are disposed within the slot 901 of the given rail stage's preceding rail stage. For example, assuming FIG. 9A illustrates side rollers 902 of rail stage 801B, the side rollers 902 are disposed within the slot 901 of rail stage 801A. The combination of the side rollers 902 and the slots 901 on the rail stages restrict the direction of movement of the telescoping unit 304 in the direction of the slots 901 during the expansion or retraction of the telescoping unit 304.

In one embodiment, each vertical side 802 of each rail stage 801 includes one or more cam rollers 903. The cam rollers 903 of each rail stage 801 are disposed at least at one end of the rail stage 801. The cam rollers 903 may be disposed at both the top and bottom ends of the rail stage 801 or may be disposed only at one end of the rail stage. FIG. 9A illustrates that the vertical side 802 of the rail stage 801A includes a cam roller 903 disposed at notch 905 formed in a corner of the bottom end of the vertical side 802 of the rail stage 801A. The cam roller 903 protrudes from the notch 905 of the vertical side 802 of rail stage 801A in a direction that is perpendicular to the outer surface 805 of the vertical side 802 of the rail stage 801A. As shown in FIG. 9C, the cam roller 903 includes a threaded end 911 that screws into a hole formed within the notch 905 of the vertical side 902 in order to attach the cam roller 903 to the vertical side 802 of the rail stage 801. The cam rollers 903 may have a diameter of 1.4 inch for example, but may have other diameters. The cam rollers 903 may be made of nylon, but other materials may be used.

In one embodiment, the cam roller 903 of each rail stage 801 is in contact with the outer surface 805 of the subsequent rail stage 801. For example, cam roller 903 of rail stage 801A is in contact with the outer surface 805 of rail stage 801B as shown in FIG. 9A. The usage of the cam rollers 903 improves smooth movement of the telescoping unit 304 as the rail stages 801 are collapsed and expanded. The cam rollers 903 also assist in guiding each rail stage 801 in the proper direction as the rail stages 801 are collapsed and expanded. Given that the cam rollers 903 and side rollers 902 are made of nylon and the rail stages 801 are made of aluminum in one embodiment, wear on the rollers 902, 903 and the rail stages 801 is reduced thereby extending the time period between replacement of parts of the telescoping unit 304.

As the telescoping unit 304 is transitioned between the collapsed and the expanded states, the different rail stages 801 of the telescoping unit 304 collide with one another. Collision between the different rail stages 801 creates shock which may damage the telescoping unit 304. In one embodiment, each rail stage 801 of the telescoping unit 304 includes one or more shock reducing units 1000 as shown in FIGS.

10A to 10E to reduce damage to the different rail stages 801 as the telescoping unit 304 is expanded and contracted.

Figure 10A:
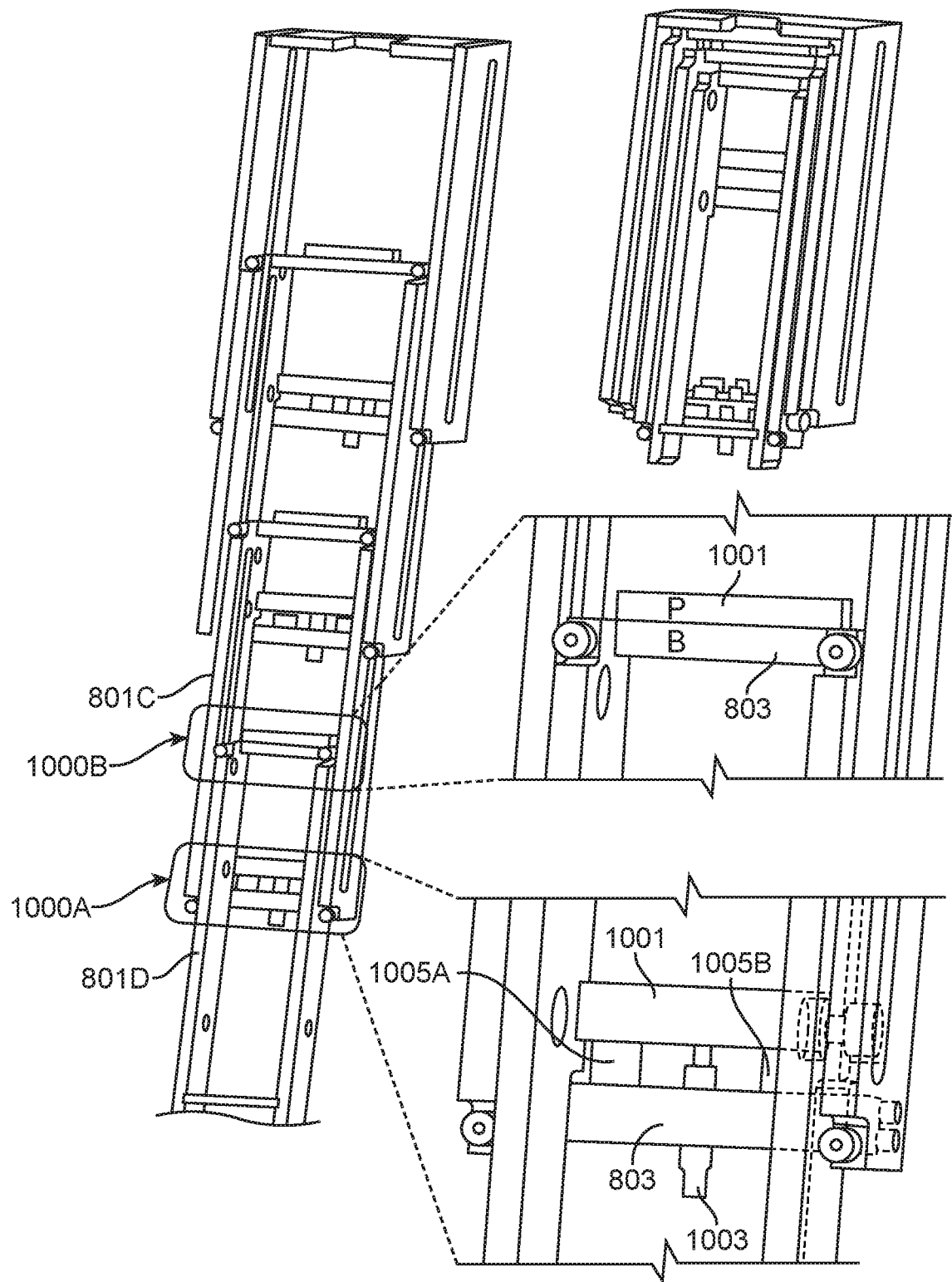
FIGS. 10A to 10E illustrates detailed views of the shock reducing units of the telescoping unit of the first wash stage according to one embodiment.

In one embodiment, the shock reducing unit 1000B at the top of a rail stage 801 includes an impact reduction block 1001. The impact reduction block 1001 is made of a shock absorbent material used to reduce impact such as urethane in one embodiment, but other materials may be used. The impact reduction block 1001 is mounted on a topmost horizontal side 803 of the rail stage 801 as shown in FIG. 10A. The impact reduction block 1001 is made of a material that is more elastic than the topmost horizontal side 803 of the rail stage. The impact reduction block 1001 may have a width that is the same width of the topmost horizontal side 803 of the rail stage 801 or may have a smaller width.

In one embodiment, the shock reducing unit 1000A at the bottom of a rail stage 801 includes a shock absorber 1003 and a plurality of impact reduction pads 1005. The shock absorber 1003 may be positioned between ends of the lowermost horizontal side 803 of the rail stage (e.g., at the center) as shown in FIG. 10A in one embodiment. The plurality of impact reduction pads 1005 may include a first impact reduction pad 1005A mounted at one side (e.g., left side) of the shock absorber 1003 and a second impact reduction pad 1005B mounted at a second side (e.g., right side) of the shock absorber 1003. The plurality of impact reduction pads 1005 are mounted on the lowermost horizontal side 803 of the rail stage. The plurality of impact reduction pads 1005 are made of a material that is more elastic than the lowermost horizontal side 803 of the rail stage. For example, the impact reduction pads 1005 may be made of urethane, but other materials may be used.

In one embodiment, intermediate rail stages 801B to 801C may include the shock reducing unit 1000A at the top of the rail stage and the shock reducing unit 1000B at the bottom of the rail stage 801. In contrast, end rail stages 801A and 801D may include one of shock reducing unit 1000A or 1000B. For example, rail stage 801A may include shock reducing unit 1000B at the bottom of the rail stage 801A without any shock reducing unit 1000 at the top of the rail stage whereas rail stage 801D may include shock reducing unit 1000A at the top of the rail stage 801D without any shock reducing unit 1000B at the bottom of the rail stage 801D.

Figure 10B:
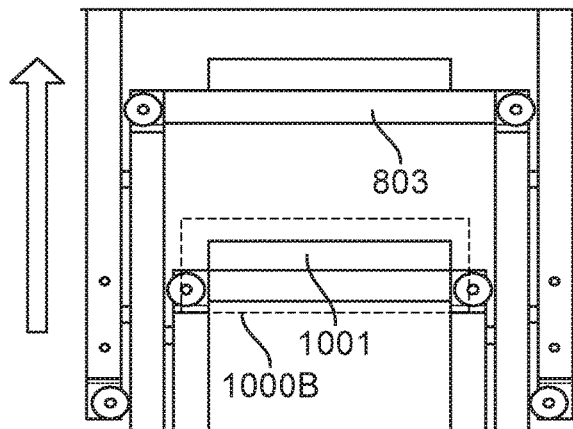
Figure 10C:
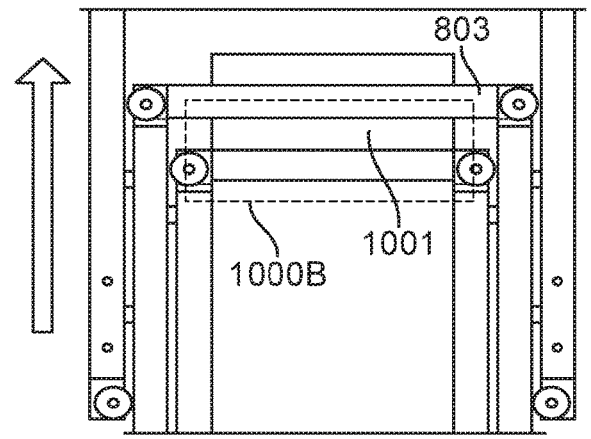

FIGS. 10B and 10C illustrate usage of the shock reducing unit 1000B as the telescoping unit 304 is collapsed according to one embodiment. FIG. 10B illustrates a shock reducing unit 1000B of a rail stage 801. The shock reducing unit 1000B includes an impact reduction block 1001. FIG. 10C illustrates as the telescoping unit 304 is collapsed, the shock reducing unit 1000B buffers the impact between the two adjacent rail stages 801. In FIG. 10C, the impact reduction block 1001 reduced the amount of impact between adjacent rail stages as the impact reduction block 1001 contacts the horizontal side 803 of the adjacent rail stage. Since the impact reduction block 1001 is made of a material (e.g., urethane) that is more elastic than the horizontal side 803 of the adjacent rail stage, the impact reduction block 1001 dampens the shock between adjacent rail stages when the rail stages come into contact.

Figure 10D:
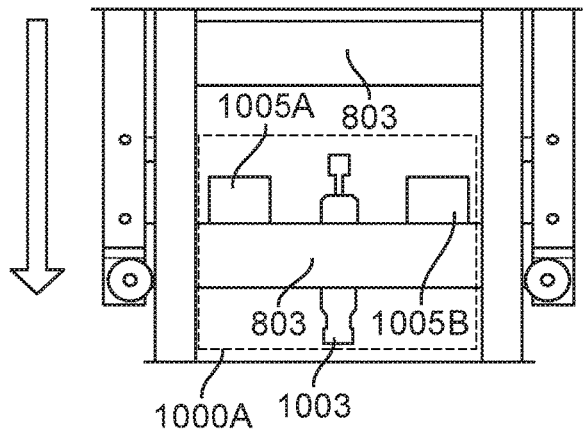
Figure 10E:
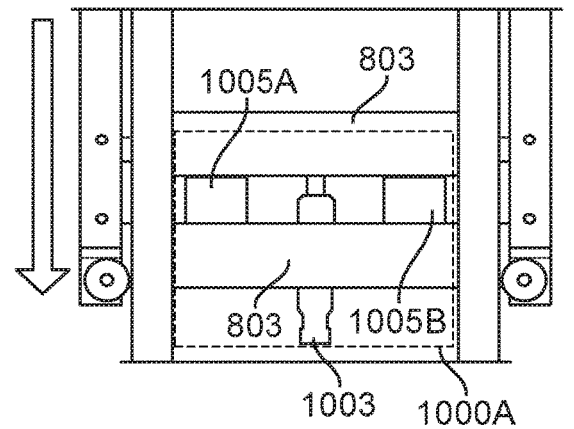

FIGS. 10D and 10E illustrate usage of the shock reducing unit 1000A as the telescoping unit 304 is expanded according to one embodiment. FIGS. 10D and 10E illustrate a shock reducing unit 1000A of a rail stage 801. The shock reducing unit 1000A includes a shock absorber 1003 and a plurality of impact reduction pads 1005. In one embodiment, the telescoping unit 304 may expand at a faster speed than it can collapse given gravity. Thus, a shock absorber 1003 may be employed to protect the telescoping unit 304 from damage during expansion.

FIGS. 10D and 10E illustrate as the telescoping unit 304 is expanded, the shock reducing unit 1000B buffers the impact between the two adjacent rail stages 801. In FIGS. 10D and 10E, the shock absorber 1003 initially contacts the horizontal side 803 of the adjacent rail stage as the telescoping unit 304 is expanded. The shock absorber 1003 slows the speed at which the two rail stages contact each other. The plurality of impact reduction pads 1005 contact the horizontal side 803 of the adjacent rail stage to further dampen the impact of collision between adjacent rail stages to reduce the damage to the telescoping unit 304 during expansion of the telescoping unit 304.

Figure 11:
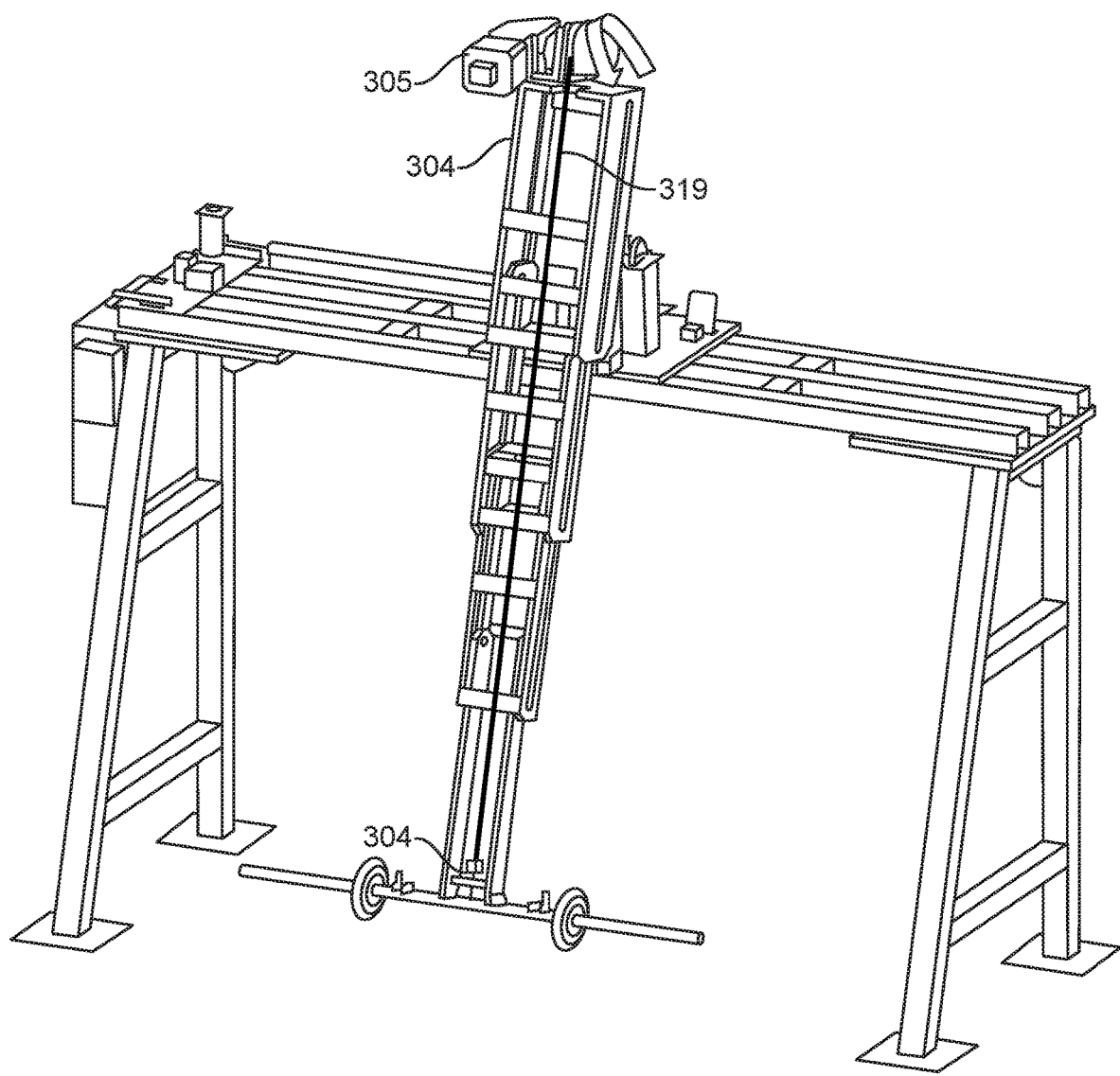
FIG. 11 illustrates a detailed view of a mechanism for collapsing and expanding the telescoping unit of the first wash stage according to one embodiment.

FIG. 11 illustrates a detailed view of a mechanism for retracting and collapsing the telescoping unit of the first wash stage 103 according to one embodiment. As mentioned previously, the first wash stage includes a motor 305 connected to the telescoping unit 304. The first wash stage 103 also includes a wire 319 including a first end connected to a drum 321 (shown in FIG. 12) and a second end connected to the telescoping unit 304. In one embodiment, the second end of the wire 319 is connected to the bottommost horizontal side 803 for the last rail stage 801D.

In one embodiment, the telescoping unit 304 is collapsed or expanded as a result of the motor 305 respectively raising or lowering the wire 319 via the drum 321 according to the contour profile of a vehicle 101. The controller 109 uses the vertical contour profile of the vehicle 101 to control an amount in which the motor 305 rotates to raise or lower the wire 319 to achieve the various height points described in the vertical contour profile of the vehicle 101. As will be described further below, in one embodiment a lookup table may be stored that translates the number of turns required by the motor 305 to achieve an amount of vertical movement that is mapped to a specific height point in the vertical contour profile of the vehicle 101.

For example, assuming that the telescoping unit 304 is in the fully expanded state or in an intermediate state between fully expanded and fully collapsed, as the motor 305 raises the wire 319, each of the plurality of rail stages 801 of the telescoping unit 304 are raised and become housed within an adjacent rail stage as previously described above. The plurality of rail stages 801 can be raised by the motor 305 and the wire 319 until the telescoping unit 304 is in the fully collapsed state or an intermediate state between fully collapsed or fully expanded.

Conversely, assuming that the telescoping unit 304 is in the fully collapsed state or at an intermediate state between fully collapsed and fully expanded, as the motor 305 lowers the wire 319, the plurality of rail stages 801 of the telescoping unit 304 expands. The plurality of rail stages 801 can be lowered by the motor 305 and wire 319 until the telescoping unit 304 is in the fully expanded state or an intermediate state between fully collapsed or fully expanded.

In one embodiment, the motor 305 applies only a vertical force to the wire 319 to retract or expand the telescoping unit 304. That is, the motor 305 applies force to the wire 319 in the vertical direction to retract or expand the telescoping unit 304, but not the horizontal direction. However, given that the telescoping unit 304 is positioned at an angle, the telescoping unit 304 moves in both the vertical direction and the horizontal direction responsive to the vertical force applied by the motor 305 in retracting the telescoping unit 304 or expanding the telescoping unit 304.

In one embodiment, the wire 319 is made of a flexible material such as high-modulus polyethylene (e.g., ultra-high-molecular-weight polyethylene (UHMWPE)) which is typically used in marine applications (e.g., boats). However, other embodiments may use different material than UHMWPE. The wire 319 may have a thickness of 0.3 inches and is 165 inches in length in one embodiment. However, other wire thicknesses and lengths may be used in other embodiments.

Figure 12B:
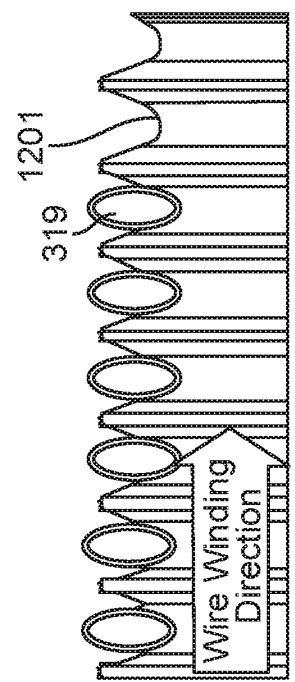
FIG. 12A to 12C illustrate detailed views of the drum and wire for collapsing and expanding the telescoping unit of the first wash stage according to one embodiment.
Figure 12C:
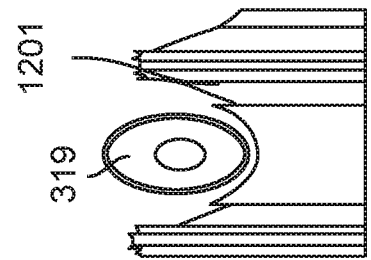
Figure 12A:
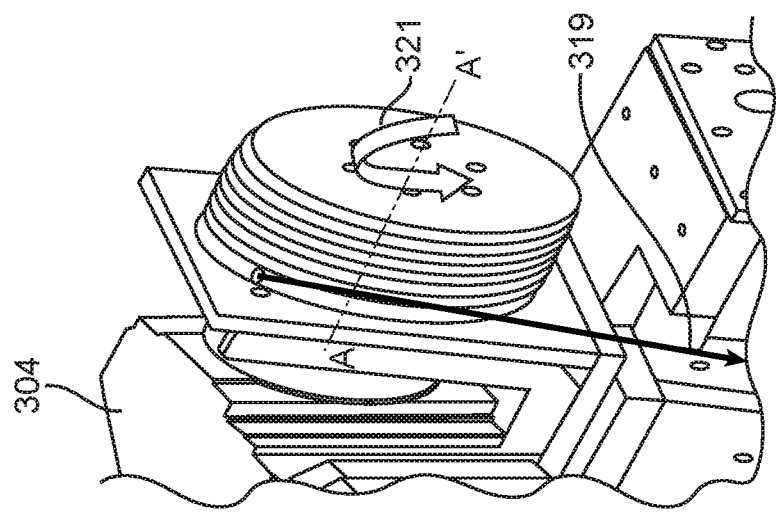

FIGS. 12A, 12B, and 12C illustrate detailed views of a drum 321 and wire 319 for expanding and collapsing the telescoping rail 304 of the first wash stage 103 according to one embodiment. Referring to FIG. 12A, the first wash stage 101 further includes the drum 321. The drum 321 may be made of nylon and have a diameter of 7.8 inches for example. Other materials and sizes for the drum 321 may be used in other embodiments.

The drum 321 is coupled to the motor 304 and one end of the wire 319 is connected to the drum 321 in one embodiment. As the motor 304 rotates, the drum 321 also rotates thereby wrapping the wire 319 around the drum 321 or unwrapping the wire 319 from the drum 321. For example, if the drum 321 rotates clockwise, the telescoping rail 304 is collapsed as the wire 319 wraps around the drum 321. If the drum 321 rotates counterclockwise, the telescoping rail 304 expands thereby unwrapping the wire 319 from around the drum 321.

FIGS. 12B and 12C are cross-section views of the drum 321 along line A-A' according to one embodiment. In one embodiment, the drum 321 includes a plurality of grooves 1201. The wire 319 is disposed within the plurality of grooves 1201 as the wire 319 is wrapped around the drum 321. In one embodiment, the diameter of the wire 319 is larger than the depth of the plurality of grooves 1201. This reduces the likelihood of the write 319 breaking as it is wound or unwound from the drum 321.

Wash Unit 306

FIGS. 13A-13D illustrate detailed views of the wash unit 306. In one embodiment, the wash unit 306 include a front manifold 306A and a rear manifold 306B. The front manifold 306A is a chamber that houses water used to wash the front and top surfaces of the vehicle 101 whereas the rear manifold 306B is a chamber that houses water used to wash the rear surface of the vehicle 101. The front and rear manifolds 306A, 306B may be made of metal such as stainless steel, but other materials may be used.

FIG. 13A shows a perspective view of the wash unit 306 and FIG. 13B shows a side view of the wash unit 306 in one embodiment. As shown in FIG. 13A, the front manifold 306A and the rear manifold 306B have a pipe shape. The length of the front and rear manifolds 306 is 63 inches with a diameter of 1 inch in one embodiment. The front manifold 306A and the rear manifold 306B are attached to the bottom end of the last rail stage 801D of the telescoping unit 304 in one embodiment. The front manifold 306A and the rear manifold 306B may be attached to the end of the rail stage 801 using couplers 1303A and 1303B. The couplers 13013 are disposed at each side of the end of the last rail stage 801D and surround at least a portion of the front manifold 306A and the rear manifold 306B as shown in FIGS. 13A and 13B.

In one embodiment, the front manifold 306A includes an input port 1301A connected to the water supply line 303A. The input port 1301A supplies water provided by the water supply line 303A to the front manifold 306A. The rear manifold 306B includes an input port 1301B connected to the water supply line 303B. The input port 1301B supplies water provided by the water supply line 303B to the rear manifold 306B.

Figure 13D:
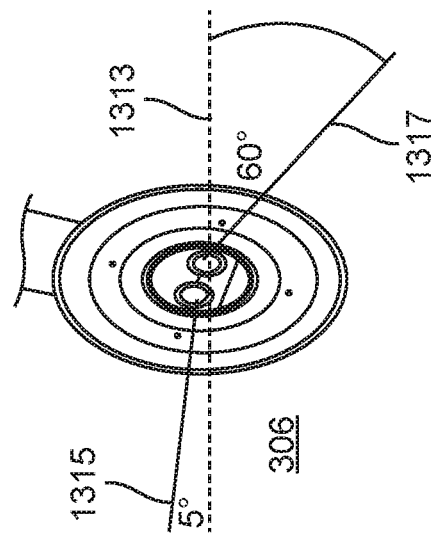
Figure 13C:
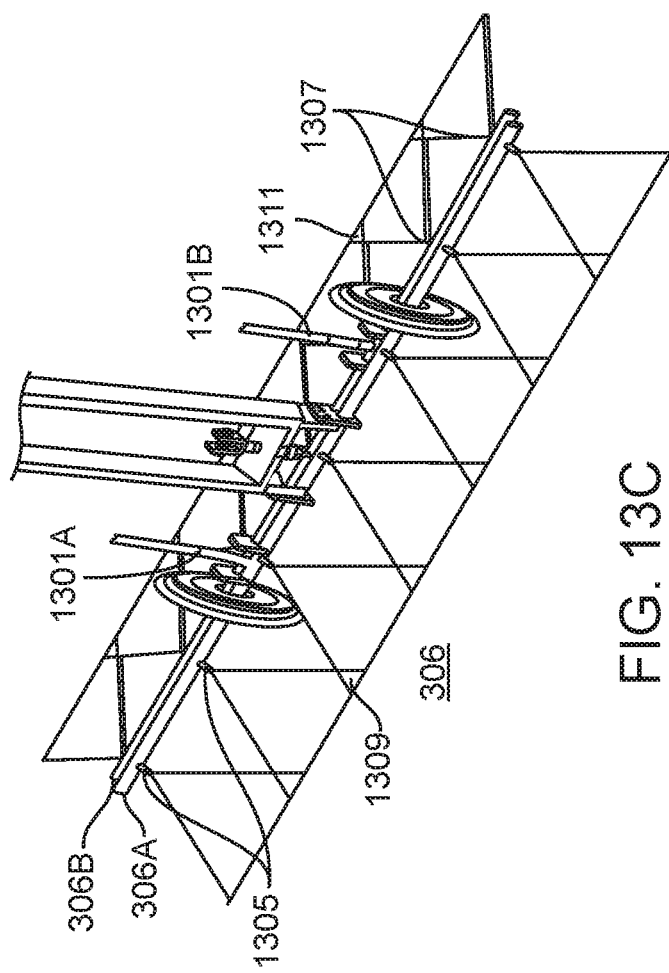

The front manifold 306A sprays the water supplied by the water supply line 303A using a plurality of nozzles 1305 shown in FIG. 13C. As mentioned previously, the front manifold 306A is used to wash the front and top surfaces of the vehicle 101 until the front and top surfaces are no longer overlapping with the front manifold 306A. In one embodiment, the nozzles 1305 are equally spaced apart from each other. For example, each nozzle 1305 may be spaced apart from an adjacent nozzle 1305 by 10.2 inches. Other distance spacing between nozzles may be used. In one embodiment, the water sprayed from each nozzle 1305 creates an overlap section 1309 with water sprayed by an adjacent nozzle 1305. By overlapping the sprayed water to create the overlap section 1309, cleaning efficiency of the front and top surfaces of the vehicle 101 is improved. In one embodiment, the overlap 1309 of water sprayed by adjacent nozzles 1305 is 1.5 inches.

The rear manifold 306B sprays the water supplied by the water supply line 303B using a plurality of nozzles 1307. As mentioned previously, the rear manifold 306B is used to wash the top and back surfaces of the rear of the vehicle 101 while the rear top and back surfaces are overlapping with the rear manifold 306B. The nozzles 1307 on the rear manifold 306B and the nozzles 1305 on the front manifold 306A are interdependently controlled to wash the front, top, and rear surfaces of the vehicle 101 as described below. In one embodiment, the nozzles 1307 are equally spaced apart from each other similar to nozzles 1305. For example, each nozzle 1307 may be spaced apart from an adjacent nozzle 1307 by 10.2 inches. Other distance spacing between the nozzles 1307 may be used. In one embodiment, the water sprayed from each nozzle 1307 creates an overlap section 1311 with water sprayed by an adjacent nozzle 1307. By overlapping the sprayed water to create the overlap section 1311, cleaning efficiency of the rear surface of the vehicle 101 is improved. In one embodiment, the overlap 1311 of water sprayed by adjacent nozzles 1307 is 1.5 inches.

FIG. 13D illustrates the angle of position of the nozzles 1305 of the front manifold 306A and the angle of position of the nozzles 1307 of the rear manifold 306B with respect to reference line 1313 that is parallel to ground according to one embodiment. In one embodiment, the angle 1315 of nozzles 1305 is less than the angle 1317 of nozzles 1307. For example, the nozzles 1305 of the front manifold 306A are at an angle of 5 degrees above the reference line 1313 whereas nozzles 1307 of the rear manifold 306B are at an angle of 60 degrees below the reference line 1313. The arrangement of the nozzles 1305 and 1307 in combination with the nozzles 1305 and 1307 being kept within the predetermined distance range of the front, top, and rear surfaces of the vehicle 101 provides the most effective washing. Note that the angles of the nozzles 1305 and 1307 are exemplary and other angles may be used in other embodiments.

Figure 14:
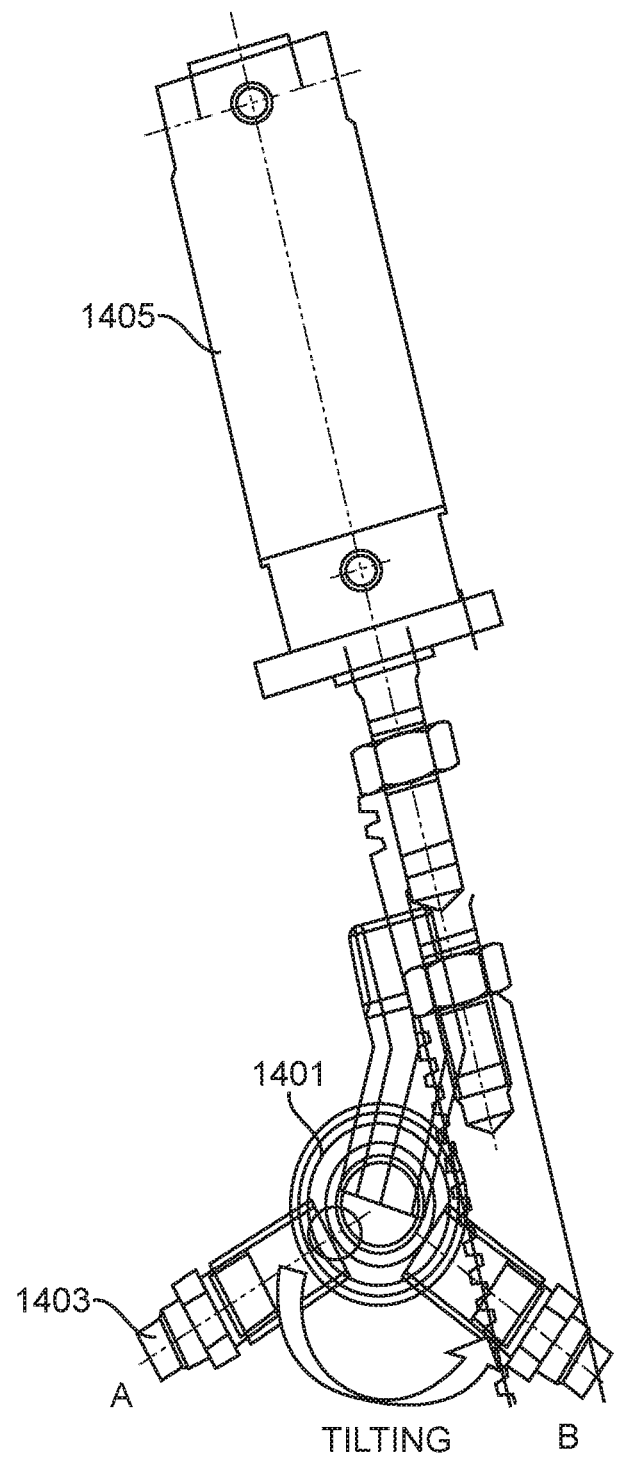
FIG. 14 illustrates a wash unit of the first wash stage according to another embodiment.

FIG. 14 illustrates another embodiment of the wash unit 306. In the embodiment of FIG. 14, the wash unit 306 includes a tilt device 1405, a water manifold 1401, and nozzles 1403 according to one embodiment. In FIG. 14, the wash unit 306 includes a single manifold rather than two water manifolds as described in the embodiment of FIG. 14. The set of nozzles 1403 rotate about the axis of the water manifold 1401 depending on whether the front, top, and rear surfaces of the vehicle are being washed in one embodiment. That is, the nozzles 1403 may rotate between positions A and B to change the angle of the nozzles 1403 depending on which portion of the vehicle 101 is being washed. The angle of the water manifold 1401 is changed by a tilt device 1405. The tilt device 1405 may include a gear that spins to change the rotation of the nozzles 1403 between positions A and B.
Safety Device 307

Figure 15A:
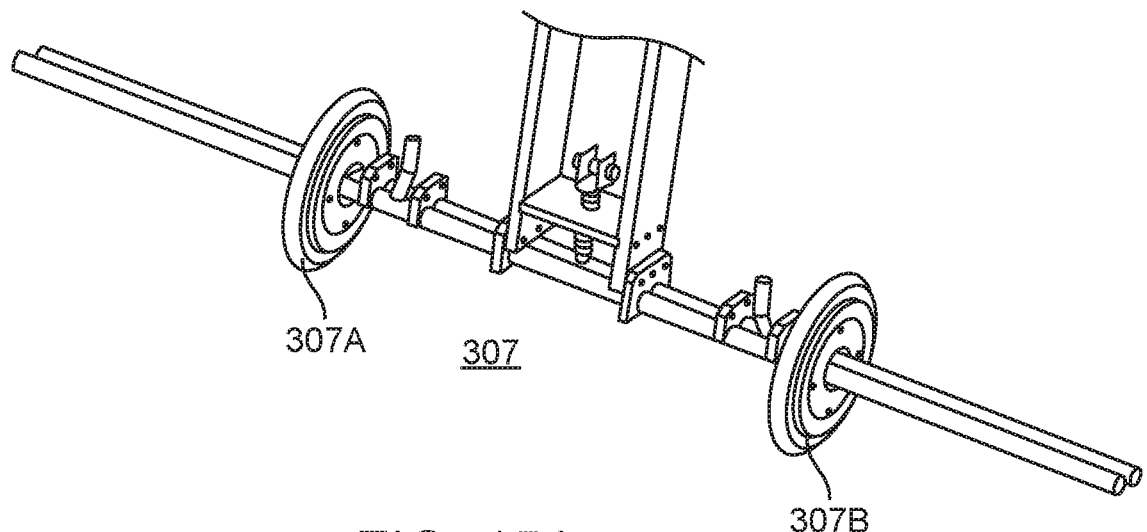
FIGS. 15A and 15B illustrate various views of a safety device of the first wash stage according to one embodiment.

FIG. 15A illustrates a detailed view of the safety device 307 according to one embodiment. As mentioned above, the safety device 307 includes safety device 307A on a first portion of the wash unit 306 and safety device 307B on a second portion of the wash unit 306 such that the safety device 307A and safety device 307B are spaced apart from each other. The safety device 307 reduces damage to vehicle 101 if there is impact between the telescoping unit 305 and the vehicle 101 due to the material of the safety device 307 and the safety device 307 rolling along the upper surfaces of the vehicle 101 upon contact of the safety device 307 and the vehicle 101.

Figure 15B:
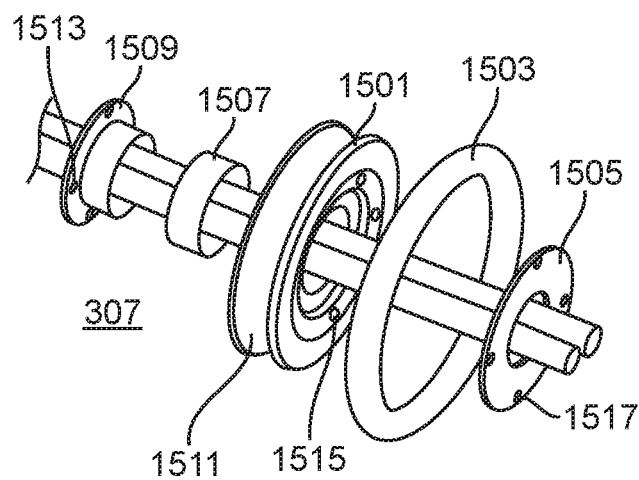

FIG. 15B illustrates an exploded view of the safety device 307. In one embodiment, each of safety device 307A and safety device 307B includes a housing 1501, an damage mitigator 1503, a cover 1505, a bushing 1507, and a bracket 1509. The housing 1501 functions as the frame for the safety device 307A. All of the components of the safety device 307B attach to the housing 1501.

The housing 1501 includes a groove 1511 in one embodiment. The impact mitigator 1503 is disposed within the groove 1511 of the housing 1501. As shown in FIG. 15B, the impact mitigator 1503 has a ring shape with a curved surface in one embodiment. Due to the curved surface of the damage mitigator 1503, the groove 1511 also has a curved surface that corresponds to the curvature of the damage mitigator 1503 to ensure a snug fit of the damage mitigator 1503 within the groove 1511.

The damage mitigator 1503 is made of elastic material so as to reduce damage to the vehicle 101 upon contact between the safety device 307 and the vehicle 101. For example, the damage mitigator 1503 is made of shock absorbent material such as ethylene propylene diene monomer (EPDM). In one embodiment, in the case of contact, the only portion of the safety device 307 that contacts the vehicle is damage mitigator 1503. Damage to the vehicle 101 is reduced due to impact absorption by the damage mitigator 1503 and rolling of the safety device 307 while the safety device 307 is in contact with the vehicle 101.

In one embodiment, the bushing 1507 is inserted in a hole at the center of the housing 1501. The bushing 1507 may be a sleeve bearing for example. The bracket 1509 is inserted into the bushing 1507 such that the bracket 1509 is disposed at one side of the housing 1501 (e.g., left side). The bracket 1509 includes a plurality of holes 1513 which are aligned with holes 1515 on the housing 1501 and holes 1517 on the cover 1505. The cover 1505 is inserted into another side of the housing 1501 (e.g., right side). Fasteners (e.g., screws, nuts, bolts, etc.) may be used to secure the bracket 1509, housing 1501, and cover 1505 together.

Rotation Apparatus 1600

Figure 16A:
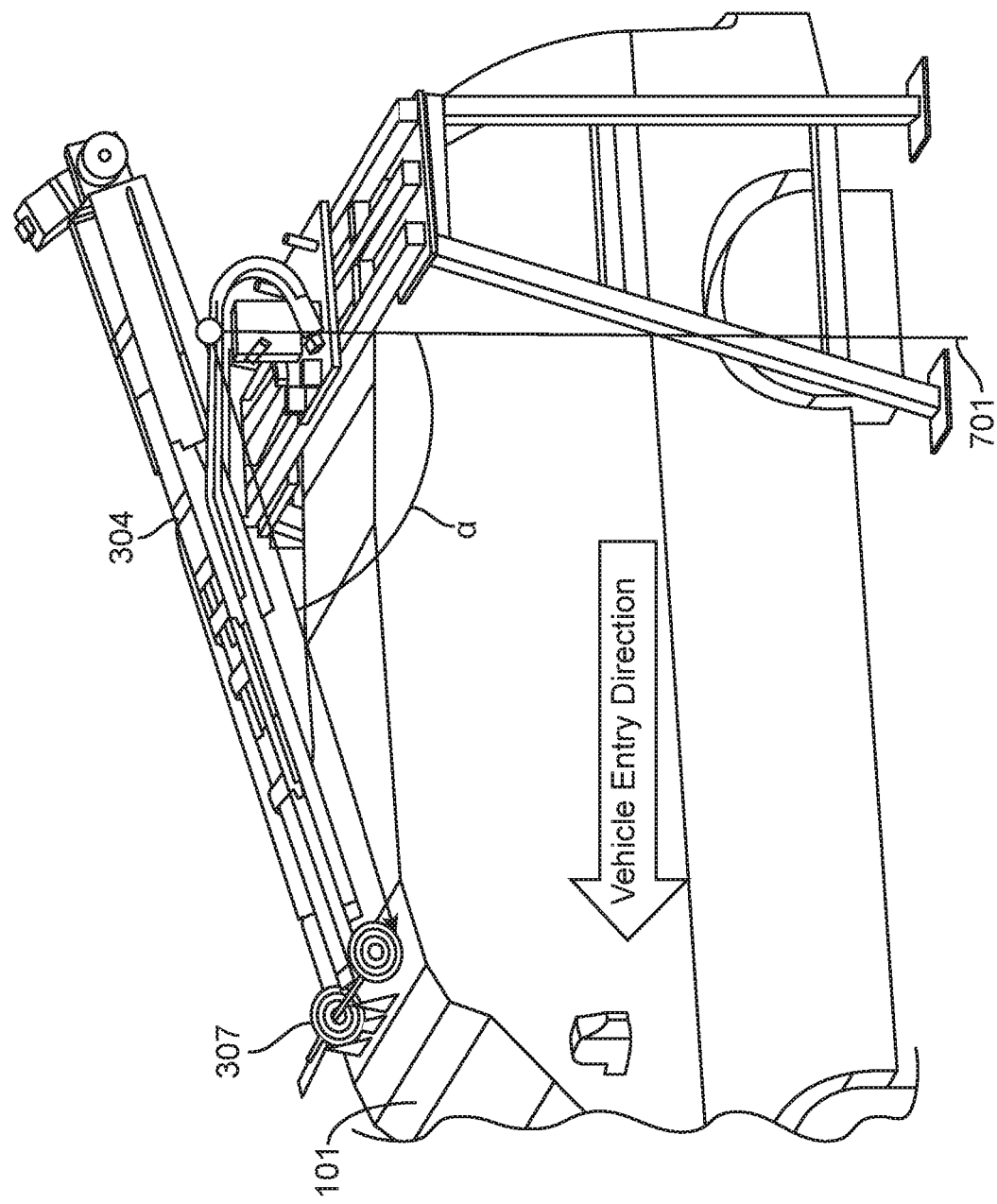
FIGS. 16A-16C illustrate a reset apparatus of the first wash stage in response to a collision between the first wash stage and the vehicle according to one embodiment.
Figure 16C:
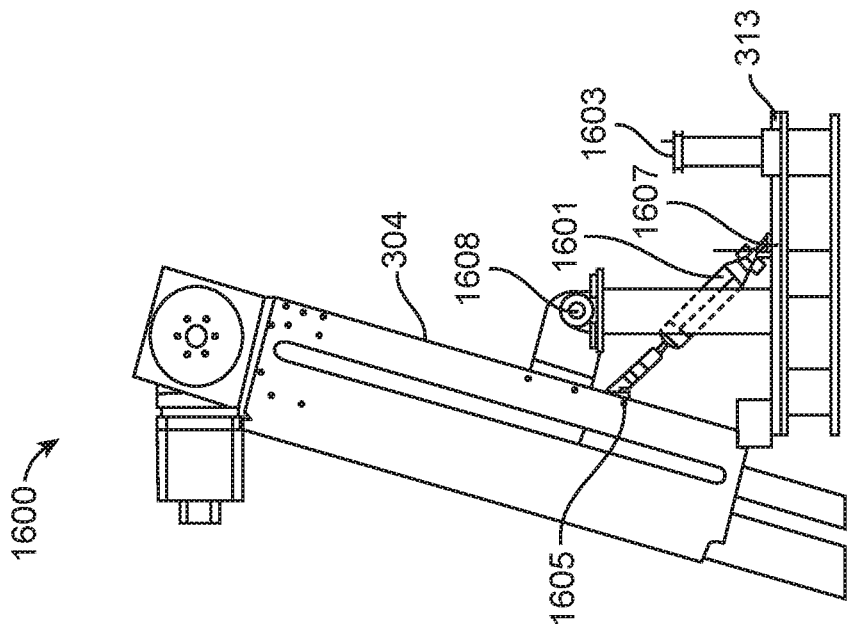

FIG. 16A illustrates a collision between the vehicle 101 and the safety device 307 during the first wash stage 103. In one embodiment, the first wash stage 103 includes a rotation apparatus 1600 shown in FIGS. 16B-16C that rotates the telescoping unit 304 in response to a collision between the vehicle 101 and the safety device 101. In one embodiment, the rotation apparatus 1600 is a passive device. The force of a collision between the vehicle 101 and the safety device 307 causes the rotation apparatus 1600 to rotate the telescoping unit 304 about the hinge point 1608 thereby increasing the angle α between the telescoping unit 304 and reference line 701. As mentioned previously, the telescoping unit 304 is positioned between the angle range of 13 to 17 degrees from the reference 701 during normal operation of the first wash stage 103. However, if a collision occurs between the vehicle 101 and the safety device 307, the telescoping unit 304 is rotated upward to an angle greater than the angle range of 13 to 17 degrees to prevent or at least reduce any further damage to the vehicle 101. For example, the rotation apparatus 1600 allows the telescoping unit 304 to rotate upward to an angle up to 60 degrees from the reference 701.

Figure 16B:
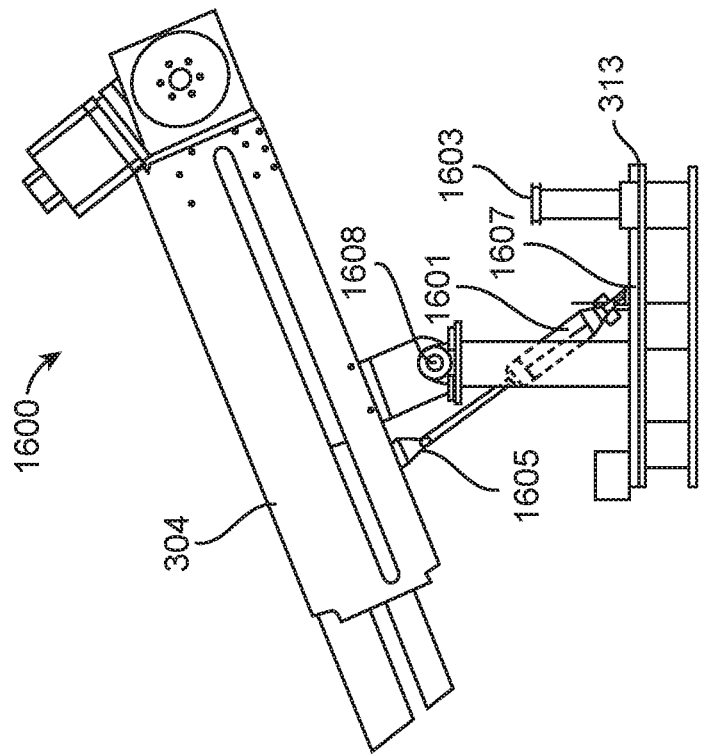

Referring to FIG. 16B, the rotational apparatus 1600 is shown according to one embodiment. As shown in FIG. 16B, the rotation apparatus 1600 includes a shock 1601, the hinge point 1608, and an oil supply 1603 that are mounted to the mounting plate 313 in one embodiment. The shock 1601 includes a first end connected to the telescoping unit 304 and a second end connected to the mounting plate 313. The first end of the shock 1601 may be connected to a horizontal side 803 of one of the plurality of rail stages 801 such as a horizontal side 803 of the rail stage 801A. The oil supply 1603 is coupled to the shock 1601 to supply the shock 1601 with oil.

To reduce damage to the vehicle 101, the telescoping unit 304 rotates about the hinge point 1608 upward upon impact between the vehicle 101 and the safety device 307. As mentioned above, the telescoping unit 304 rotates due to the force from the collision between the vehicle 101 and the safety device 307.

In one embodiment, pressure is always supplied to the oil supply 1603 that applies oil to the shock 1601. As a result, the shock 1601 applies a constant force on the telescoping unit 304 to reduce the weight of the telescoping unit 304 as the telescoping unit 304 rotates about the hinge point 1608. When the vehicle 101 clears the first wash stage 103, the telescoping unit 304 returns to its initial position due to gravity and the weight of the telescoping unit 304. In one embodiment, the shock 1601 slows the rate in which the angle of the telescoping unit 304 is returned back to its initial position by applying the constant force to the telescoping unit 304. However, the weight of the telescoping unit 304 and gravity are enough to overcome the force applied by shock 1601, but the shock is still able to slow the rate in which the telescoping unit 304 returns back to its initial angle. If the first wash stage 103 lacked the shock 1601 and oil supply 1603, the telescoping unit 304 would quickly return to its initial angle prior to collision thereby increasing the likelihood of damage to the first wash stage 103.

Overview of a First Embodiment of the Second Wash Stage 105

Figure 17:
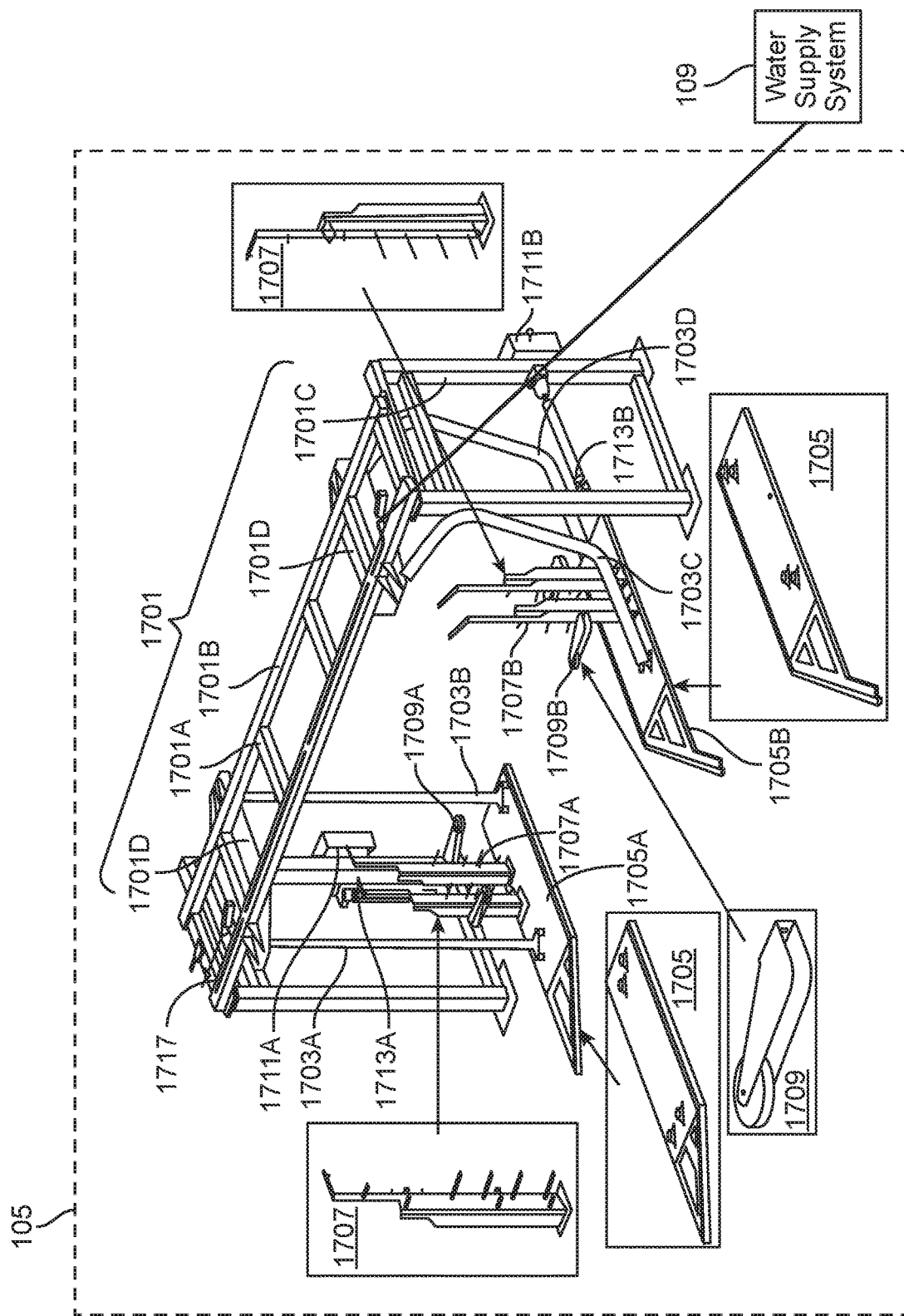
FIG. 17 illustrates a detailed view of the second wash stage of the two-stage brushless car wash system according to a first embodiment.

Referring to FIG. 17, a perspective view of the second wash stage 105 of the car wash system 100 is shown according to one embodiment. In one embodiment, the second wash stage 105 includes a frame 1701, a plurality of arms 1703, a plurality of base assemblies 1705, a plurality of nozzle assemblies 1707, a plurality of collision prevention units 1709, intermediate stop circuit lines 1711, and cylinders 1713 that are each described in further detail below. However, the second wash stage 105 may have additional or fewer components than described herein.

The frame 1701 is a structure used to support the other components of the second wash stage 105. For example, one end of each of the plurality of arms 1703 is attached to the frame 1701 and the base assemblies 1705 that are attached to a second end of the plurality of arms 1703 are floating (e.g., hanging) so as not to contact the ground. In particular, the plurality of arms 1703 are attached to mounting plates 1701D included in the frame 1701. In one embodiment, the plurality of arms 1703 and the plurality of base assemblies 1705 are collectively considered a width adjusting unit of the second wash stage 105.

The frame 1701 includes a plurality of frame rails that collectively form the frame 1701. Frame rails 1701A to 1701C shown in FIG. 17 are merely examples of horizontal and vertical frame rails. The frame 1701 may be made of metal such as steel or aluminum or other metals. The frame 1701 has a height greater than 90 inches (e.g., 119.7 inches) and a width greater than 126 inches (e.g., 165.4 inches) in one embodiment. This allows for the second wash stage 105 to accommodate vehicles 101 with a maximum height of 90 inches and a maximum width of 126 inches. However, the frame 1701 may have different dimensions depending on the size of the vehicles being washed.

In one embodiment, the plurality of arms 1703 support the base assemblies 1705. The plurality of arms 1703 includes a first set of arms and a second set of arms. Each set of arms is configured to connect to one of the plurality of base assemblies 1705. For example, the first set of arms includes arms 1703A and 1703B that connect the base assembly 1705A (e.g., a driver side base assembly) to the frame 1701. The second set of arms include arms 1703C and 1703D that connect the base assembly 1705B (e.g., a passenger side base assembly) to the frame 1701. As shown in FIG. 17, the base assemblies 1705 are floating off the ground (not in contact) due to being connected to the arms 1703.

In one embodiment, the base assemblies 1705 adjust the variable width of the second wash stage 105. Generally, base assemblies 1705 are floating off the ground by hanging from the frame 1701 via the hanging arms 1703 (e.g., the base assemblies 1705 are floating above ground level) and contact the vehicle 101 to adjust the width of the second wash stage 105 based on the width of the vehicle 101. As will be further described below, the base assemblies 1705 contact tires of the vehicle 101 which thereby push the base assemblies 1705 outward to adjust the width of the second wash stage 105 in accordance with the width of the vehicle 101.

In one embodiment, a plurality of nozzle assemblies 1707 (e.g., a wash unit) wash vehicle 101 by spraying water on the side surfaces of the vehicle 101. In other embodiments, the nozzle assemblies 1707 may spray detergent such as soap in addition to water. The nozzle assemblies 1707 are installed on the base assemblies 1705 as shown in FIG. 17, so that the nozzle assemblies 1707 are also floating off the ground.

In one embodiment, each nozzle assembly 1707 is mounted to a corresponding one of the base assemblies 1705. For example, nozzle assembly 1707A is mounted to base assembly 1705A and nozzle assembly 1707B is mounted to base assembly 1705B. Since the nozzle assemblies 1707 are mounted on the base assemblies 1705, the lateral position of the nozzle assemblies 1707 change based on the width of the vehicle 101 being washed. Thus, the distance from the nozzle assemblies 1707 to the side surfaces of the vehicle 101 being washed can be kept within a predetermined distance range that improves cleaning efficiency of the side surfaces of the vehicle compared to conventional car wash systems with nozzle assemblies that have static positions.

Water supply lines 1717 supply water to the nozzle assemblies 1707. Each water supply line 1717 is connected to a corresponding one of the nozzle assemblies 1707. For example, a water supply line is connected to nozzle assembly 1707A and a water supply line is connected to nozzle assembly 1707B.

In one embodiment, the plurality of collision prevention units 1709 prevent the base assemblies 1705 from being positioned underneath the vehicle 101. The plurality of collision prevention units 1709 may contact the side surface of the vehicle 101 thereby preventing the base assemblies 1705 from further moving inward toward the center of the second wash stage 105. If the base assemblies 1705 were to move toward the center of the second wash stage 105, the base assemblies 1705 may go underneath the vehicle 101 and may damage the vehicle 101 upon contact with the underside of the vehicle 101. Furthermore, the nozzles assemblies 1705 may contact the side surfaces of the vehicle 101 if the base assemblies 1705 go underneath the vehicle 101. Thus, the collision prevention units 1709 prevent the nozzle assemblies 1705 from colliding with the side surfaces of the vehicle 101 as further described below. In one embodiment, the plurality of collision prevention units 1709 include stop device 1709A and stop device 1709B. Stop device 1709A is mounted to nozzle assembly 1707A whereas stop device 170B is mounted to nozzle assembly 1707B in one example.

In one embodiment, a plurality of cylinders 1713 reduce shaking of the base assemblies 1705 during operation of the second wash stage 105. The plurality of cylinders 1713 may also be locked in place after the width of the second wash stage 105 is set in one embodiment. By locking the cylinders 1713, the base assemblies 1705 cannot move so as to be positioned under the vehicle 101 when the base assemblies 1705 are no longer in contact with the tires of the vehicle 101 as will be further described below.

In one embodiment, the plurality of cylinders 1713 include cylinder 1713A and cylinder 1713B where each cylinder 1713 is coupled to a corresponding one of the plurality of base assemblies 1705. For example, cylinder 1713B is attached to base assembly 1705B whereas cylinder 1713A is attached to base assembly 1705. Each cylinder 1713 includes two ends with one end of the cylinder 1713 attached to the frame 1701 and another end of the cylinder 1713 attached to the base assembly 1705. For example, one end of cylinder 1713B is attached to frame rail 1701C and the other end of the cylinder 1713B is attached to base assembly 1705B.

In one embodiment, the plurality of intermediate stop circuit lines 1711 (e.g., air lines) supply air to the plurality of cylinders 1713. Suppling air to the cylinders 1713 unlocks the cylinders 1713 and allows the cylinders 1713 to return to their original position once vehicle 101 has exited the second wash stage 105.

In one embodiment, the plurality of intermediate stop circuit lines 1711 includes intermediate stop circuit line 1711A and intermediate stop circuit line 1711B. Intermediate stop circuit line 1711A is connected to cylinder 1713A and supplies air to cylinder 1713A to unlock or lock cylinder 1713A. Similarly, intermediate stop circuit line 1711B is connected to cylinder 1713B and supplies air to cylinder 1713B to unlock or lock cylinder 1713B.

Operation of the First Embodiment of the Second Wash Stage 105

Figure 18A:
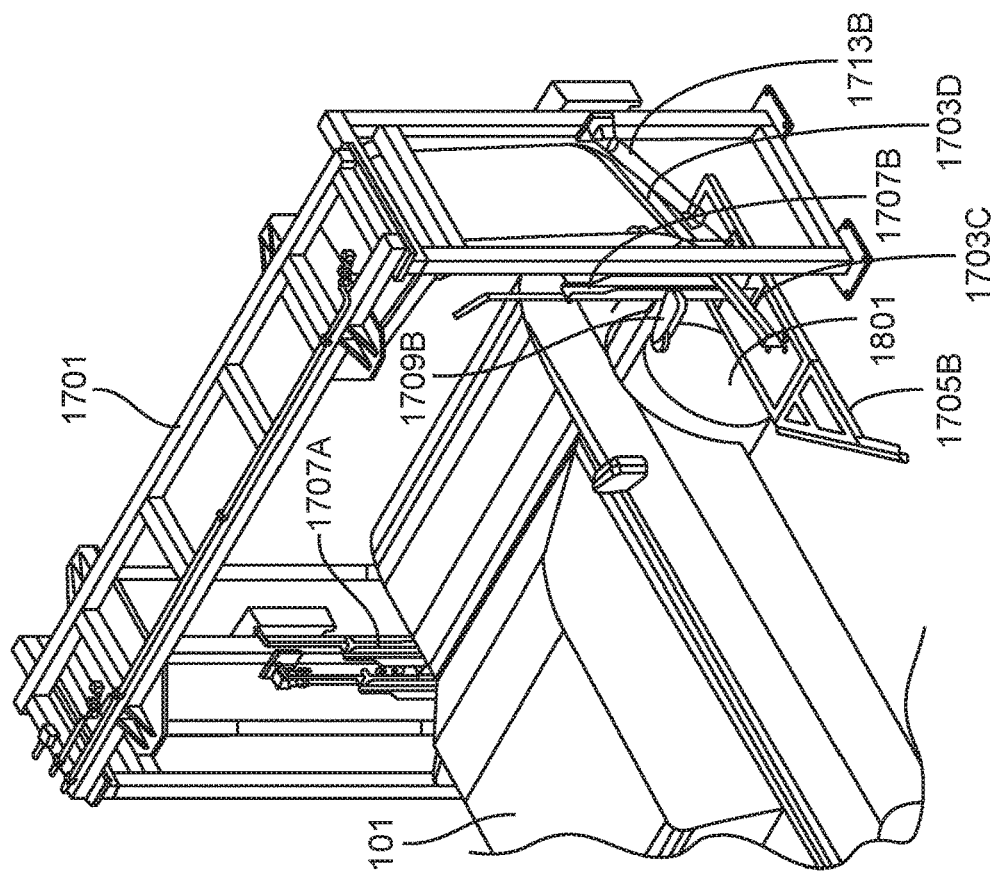

FIGS. 18A to 18D illustrate operation of the second wash stage 105 to wash side surfaces of the vehicle 101 according to one embodiment. FIG. 18A illustrates the adjustment operation during the second wash stage 105 operation. Generally, the second wash stage 105 has a variable width to account for the contour of the side surfaces of the vehicle 101 while washing the side surfaces of the vehicle 101. During the initial adjustment operation, the width of the second wash stage 105 is adjusted according to the width of the vehicle 101.

Figure 18B:
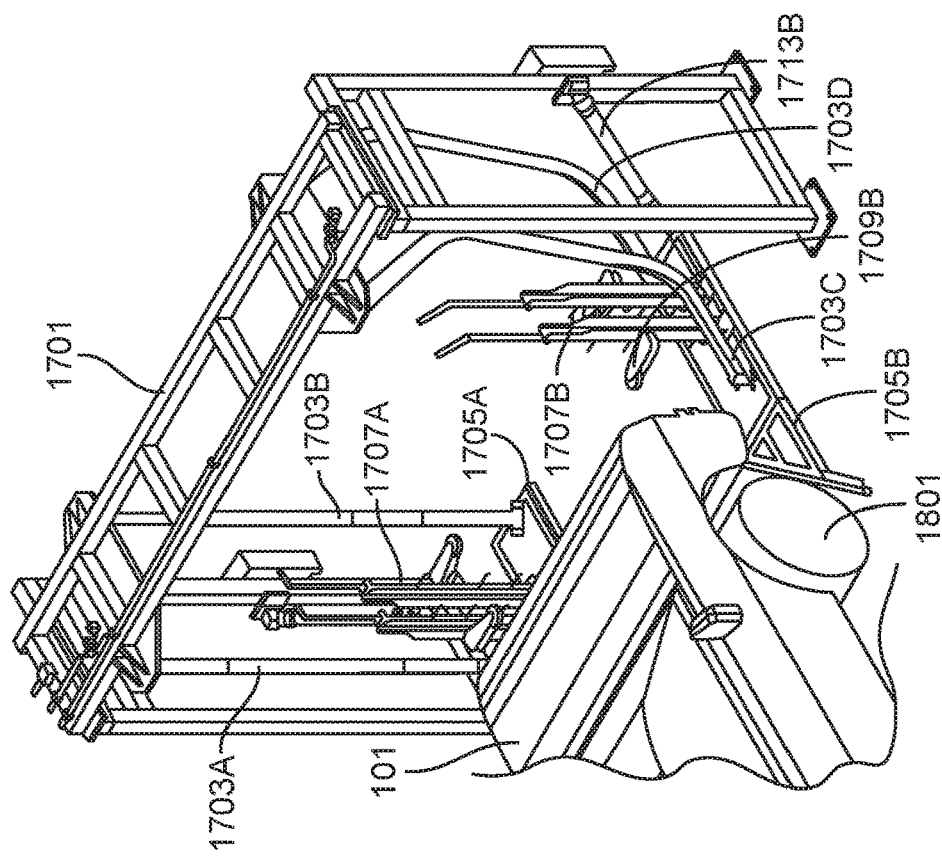

As shown in FIG. 18A, the tires 1801 of the vehicle 101 contact the plurality of base assemblies 1705 as the vehicle 101 approaches the second wash stage 105. As the vehicle 101 moves forward due to the conveyer moving the vehicle 101 forward, the base assemblies 1705 are pushed outward away from the center of the second wash stage 105B by being in contact with the tires 1801 to set the width of the second wash stage 105 as shown in FIG. 18B. Thus, the sides of the vehicle (e.g., the sides of the tires) are in physical contact with the second wash stage 105 to set the width of the second wash stage 105 according to the width of the vehicle 101.

FIG. 18B illustrates the initial wash operation of the second wash stage 105 in one embodiment. Once the width of the second wash stage 105 is adjusted according to the width of the vehicle 101, the cylinders 1713 are activated by the controller 109 so as to lock the length of the cylinders 1713 in place during the initial wash stage in one embodiment. By locking the cylinders 1713, the width of the second wash stage 105 is thereby locked in place. The nozzle assemblies 1707 can then begin washing the front portion of the side surfaces (e.g., the sides of the front fenders) of the vehicle 101. The nozzle assemblies 1707 may wash the front portion of the side surface of the vehicle 101 using water output by the nozzle assemblies 1707 or a combination of water and detergent (e.g., soap) output by the nozzle assemblies 1707. If the nozzle assemblies 1707 output only water, the second wash stage 105 relies upon the detergent output by the chemical arches 401 in the first wash stage 103 to aid in cleaning the vehicle 101.

FIG. 18C illustrates an intermediate wash operation of the second wash stage 105 in one embodiment. As the vehicle 101 continues to move along the second wash stage 105, nozzle assemblies 1707 continue to wash the side surfaces of the vehicle 101 such as the center portion of the side surfaces of the vehicle (e.g., the doors) and the rear portion of the side surfaces of the vehicle (e.g., rear fenders). As shown in FIG. 18C, at one point during the second wash stage 105, the base assemblies 1705 are no longer in contact with the vehicle 101 due to the length of the base assemblies 1705 not being long enough to span the length of the wheelbase of the vehicle 101. Thus, the base assemblies 1705 are only capable of contacting either the front tires or the rear tires, but cannot simultaneously contact both the front tires and rear tires due to the short length of the base assemblies 1705.

Even though the base assemblies 1705 are no longer in contact with the tires 1801 of the vehicle 101 as shown in FIG. 18C, the width of the second wash stage 105 is maintained due to the cylinders 1713 locking the width of the second wash stage 105. As mentioned previously, locking the cylinders 1713 prevents the base assemblies 1705 from moving underneath the vehicle 101 during the intermediate wash operation.

Although not shown, the cylinders 1713 include a number of components such as various solenoids and valves to control the lock and unlock operation of the cylinders 1713. As mentioned above, the intermediate stop circuit lines 1711 supply air to the cylinders 1713. When the vehicle 101 has yet to contact the base assemblies 1705, the intermediate stop circuit lines 1711 do not supply air to the cylinders 1713. When air is not supplied to the cylinders 1713, the cylinders 1713 can expand or contract. Thus, the cylinders 1713 are unlocked.

When the vehicle 101 contacts the base assemblies 1705, the intermediate stop circuit lines 1711 supply air to cylinders 1713. The supplied air to the cylinders 1713 allows the cylinders 1713 to further contract, but do not allow the cylinders 1713 to expand thereby locking the cylinders 1713 in place. Thus, the base assemblies 1705 that are connected to the cylinders 1713 can move outward away from the vehicle 101 during the second wash stage 105, but cannot move inward toward the vehicle 101 during the second wash stage. In other words, the cylinders 1713 are locked thereby preventing the base assemblies 1705 from moving inward.

FIG. 18D illustrates the reset operation of the second wash stage 105 in one embodiment. After the vehicle 101 has exited the second wash stage 105, the width of the second wash stage 105 is reset to its initial position. In one embodiment, the width of the second wash stage 101 is reset by unlocking cylinders 1713. By unlocking the cylinders 1713, the base assemblies 1705 are able to move back to their initial position. As will be described below with respect to FIG. 20, the base assemblies 1705 may move to their initial position using gravity which causes the base assemblies 1705 and arms 1703 to move inward toward the center of the second wash stage 105.

To unlock the cylinders 1713, the intermediate stop circuit lines 1711 stops supplying air to the cylinders 1713. Once the cylinders 1713 are unlocked, the base assemblies 1705 return to their initial position using gravity and the weight of the base assemblies 1705 as described above. In one embodiment, the intermediate stop circuit lines 1711 stop supplying air to the cylinders 1713 a threshold amount of time (e.g., 2 seconds) after the vehicle 101 has exited the second wash stage 105 thereby causing the base assemblies 1705 to return to their initial position. Alternatively, the intermediate stop circuit lines 1711 do not supply air to the cylinders 1713 based on a signal received from a photo sensor at the entry of the car was system 100 that is different from the optical sensor 301. The timing in which the optical sensor sends the signal is calculated based on the speed of the conveyer 107. Based on the speed of the conveyer 107 and the length of the car wash 100, the time it takes for a vehicle to exit the second wash stage 105 can be calculated.

After the second wash stage 105 is completed, the vehicle 101 may be dried by one or more fans or blowers (not shown). The fans generate wind that dry the surfaces of the vehicle 101 washed by the first wash stage 103 and the second wash stage 105.

Arms 1703

Figure 19:
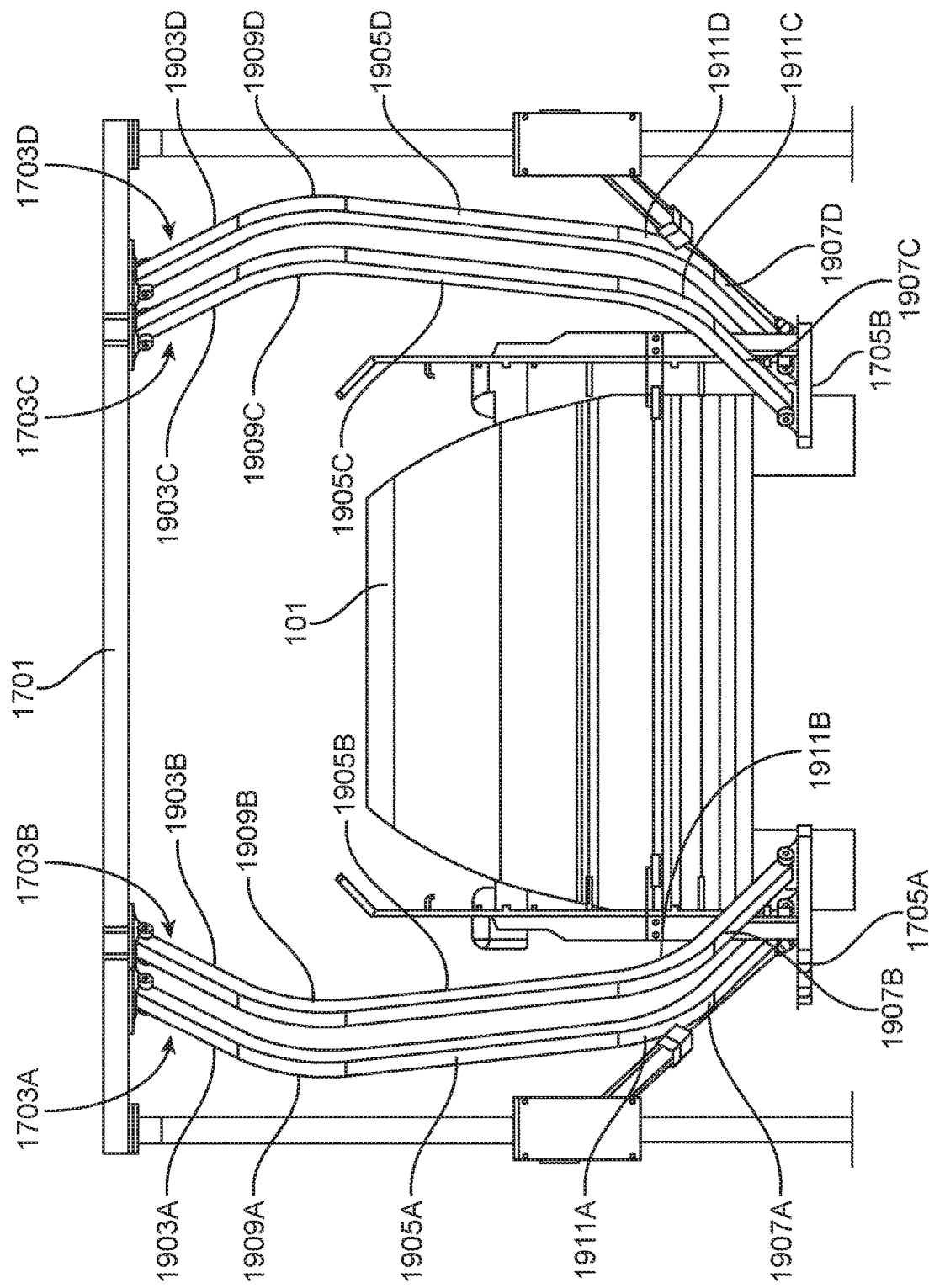
FIG. 19 illustrates dual bend arms of the second wash stage according to one embodiment.

Generally, the arms 1703 connect the hanging base assemblies 1705 to the top of the frame 1701. The arms 1703 may have different shapes in different embodiments. FIG. 19 illustrates a front view of the second wash stage 105 to illustrate an example shape of the plurality of arms 1703. As shown in FIG. 19, the arms 1703 each include at least one bend in one embodiment. By having at least one bend in each of the arms 1703, the likelihood of contact between the vehicle 101 and the arms 1703 is reduced compared to if the arms 1703 were straight (e.g., lack any bends). If the arms were straight, there is a high likelihood of contact between side view mirrors of the vehicle 101 and the arms 1703. The at least one bend in each arm 1703 is located at the end of the arm that is closest to the base assembly 1705 in one embodiment.

The example of FIG. 19 illustrates a "C" shaped arm that includes a plurality of bends (e.g., two bends) according to one embodiment. Each of the "C" shaped arms 1703A-1703D shown in FIG. 19 includes an upper part 1903, a center part 1905, and a lower part 1907. A first bend 1909 is formed between the upper part 1903 and the center part 1905 and a second bend 1911 is formed between the center part 1905 and the lower part 1907. For example, arm 1703A includes an upper part 1903A, a center part 1905A, and a lower part 1907A with a first bend 1909A formed between the upper part 1903A and the center part 1905A and a second bend 1911A formed between the center part 1905A and the lower part 1907A. Arm 1703B includes an upper part 1903B, a center part 1905B, and a lower part 1907B with a first bend 1909B formed between the upper part 1903B and the center part 1905B and a second bend 1911B formed between the center part 1905B and the lower part 1907B. Arm 1703C includes an upper part 1903C, a center part 1905C, and a lower part 1907C with a first bend 1909C formed between the upper part 1903C and the center part 1905C and a second bend 1911C formed between the center part 1905C and the lower part 1907C. Arm 1703D includes an upper part 1903D, a center part 1905D, and a lower part 1907D with a first bend 1909D formed between the upper part 1903D and the center part 1905D and a second bend 1911D formed between the center part 1905D and the lower part 1907D.

In one embodiment, the upper part 1903 and the lower part 1907 of the "C" shaped arms are symmetrical. That is, the upper part 1903 and the lower part 1907 of the "C" shaped arms 1703 have a same length. Furthermore, the angle between the upper part 1903 and the center part 1905 of the "C" shaped arms 1703 is the same as the angle between the lower part 1907 and the center part 1905 of the "C" shaped arms 1703 in one embodiment. By having upper and lower parts with the same length and the same angle between the upper part and the center part and between the lower part and center part, the ability of the "C" shaped arms 1703 to return to their initial position due to the weight of the arms 1703 and gravity after the vehicle 101 has left the second wash stage 105 is improved as further described below with respect to FIGS. 20A and 20B.

Figure 20A:
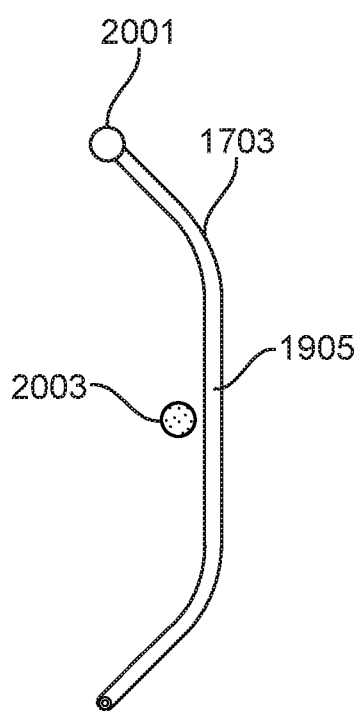
FIGS. 20A-20B illustrate the center of gravity of the dual bend arms of the second wash stage according to one embodiment

FIG. 20A illustrates the orientation of an arm 1703 after the arm 1703 has been pushed outward from the center of the second wash stage 105 due to the vehicle 101 being in contact with the base assemblies 1705. Arm 1703 shown in FIG. 20 may represent the arms on the right side of the second wash stage 105. As shown in FIG. 20A, the center part 1905 of the arm 1703 is vertical (e.g., normal to ground) while the width of the second wash stage 105 is adjusted for the vehicle 101. While the arm 1703 is oriented such that the center part 1905 is in the vertical position, the center of gravity of the arm 2003 is located to the right side of the hinge point 2001 of the arm 1703. That is, the hinge point 2001 is misaligned with the center of gravity 2003 of the arm 1703. The hinge point 2001 is the part of the arm 1703 that connects to the frame 1701.

Figure 20B:
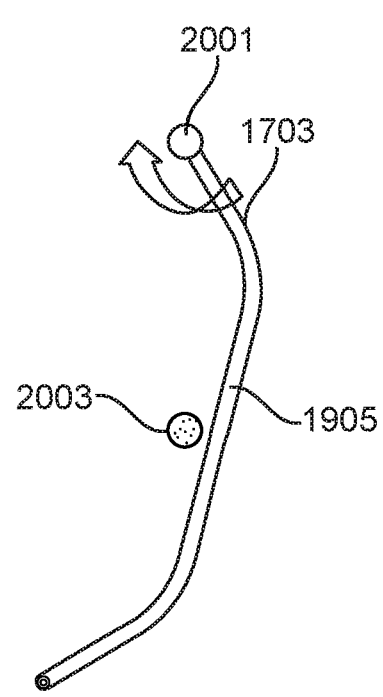

FIG. 20B illustrates the orientation of the arm 1703 in its initial reset position after the vehicle 101 has left the second wash stage 105. In FIG. 20B, the arm 1703 rotates clockwise about the hinge point 2001 due to gravity until the arm 1703 reaches its initial reset position. At the initial reset position of the arm 1703, the center of gravity 2003 of the arm 1703 is aligned with the hinge point 2001 of the arm 1703 in one embodiment.

Figure 20C:
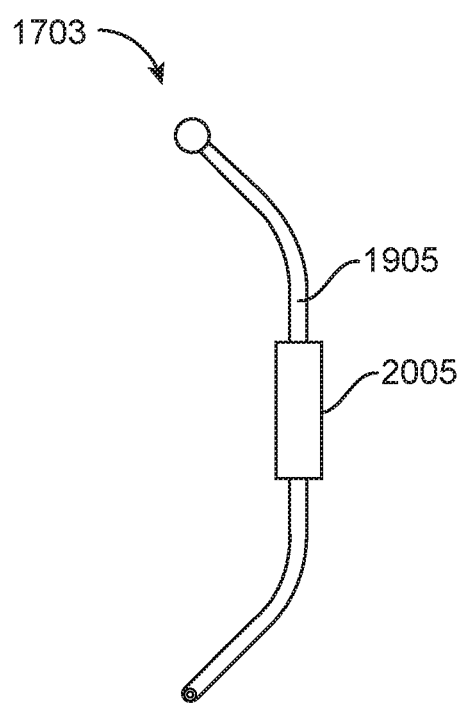
FIGS. 20C-20D illustrate weights applied to the dual bend arms to change the center of gravity of the dual bend arms according to one embodiment.
Figure 20D:
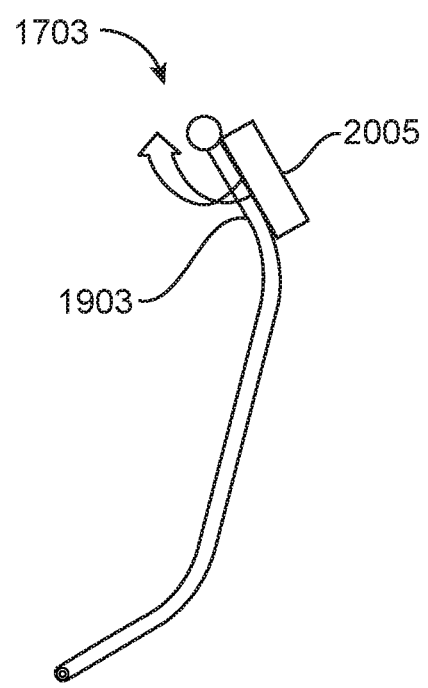

In one embodiment, weights 2005 may be placed on the "C" shaped arms to adjust the center of gravity of the arms 1703 as shown in FIGS. 20C and 20D. A weight 2005 may be placed on the center part 1905 of the arm 1703 as shown in FIG. 20C to adjust the center of gravity of the arm 1703. Alternatively, a weight 2005 may be placed on the upper part 1903 of the arm 1703. By changing the center of gravity of the arms 1703 using weights 2005, the arms 1703 may more easily return to their initial reset position after the vehicle 101 leaves the second wash stage 105 compared to the embodiment without the weights 2005 due to the weight 2005 adding more mass to the arms 1703.

The above description of the center of gravity of the arm 1703 is applicable to the arms positioned at the left side of the second wash stage 105. However, while the arms 1703 positioned at the left side of the second wash stage 105 are oriented such that the center part 1905 of the arms are in the vertical position, the center of gravity of the arm 1703 is located to the left side of the hinge point 2001 of the arm 1703 rather than the right side as shown in FIG. 20A.

Figure 21:
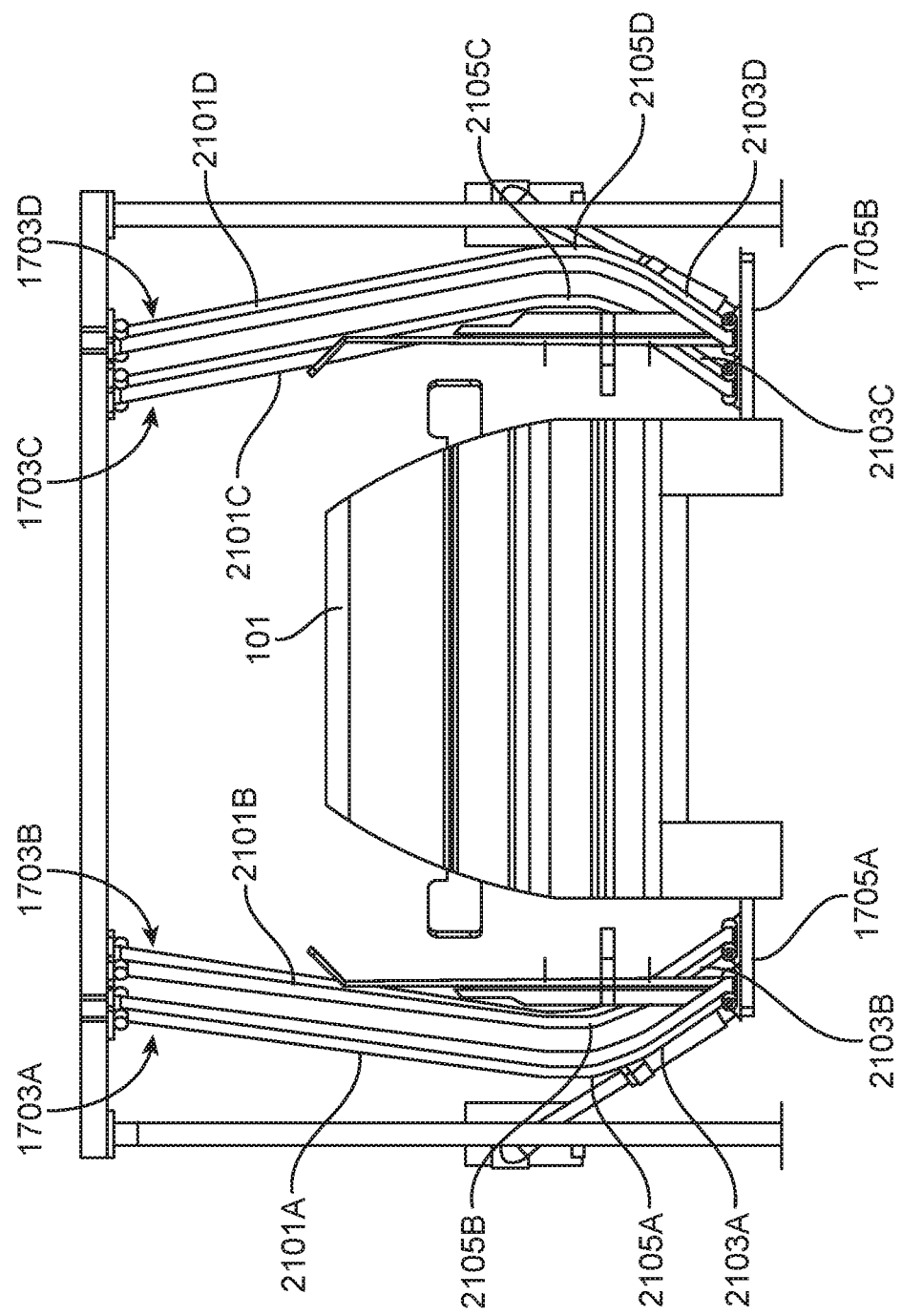
FIG. 21 illustrates single bend arms of the second wash stage according to one embodiment.

FIG. 21 illustrates a front view of the second wash stage 105 to illustrate another shape of the plurality of arms 1703 according to one embodiment. In comparison to the embodiment shown in FIG. 19, the arms 1703 shown in FIG. 21 each include one bend in one embodiment. By having a single bend in each of the arms 1703, the likelihood of contact between the vehicle 101 and the arms 1703 is reduced compared to if the arms 1703 were straight (e.g., lack any bends) similar to the embodiment shown in FIG. 19. If the arms were straight, there is a high likelihood of contact between side view mirrors of the vehicle 101 and the arms 1703. The at least one bend in each arm 1703 is located at the end of the arm that is closest to the base assembly 1705.

The example of FIG. 21 illustrates an "L" shaped arm that includes a single bend (e.g., one bend) according to one embodiment. Each of the "L" shaped arms 1703A-1703D shown in FIG. 21 includes an upper part 2101 and a lower part 2103. A bend 2105 is formed between the upper part 2101 and the lower part 2103. For example, arm 1703A includes an upper part 2101A and a lower part 2103A with a bend 2105A formed between the upper part 2101A and the lower part 2103A. Arm 1703B includes an upper part 2101B and a lower part 2103B with a bend 2105B formed between the upper part 2101B and the lower part 2103B. Arm 1703C includes an upper part 2101C and a lower part 2103C with a bend 2105C formed between the upper part 2101C and the lower part 2103C. Arm 1703D includes an upper part 2101D and a lower part 2103D with a bend 2105D formed between the upper part 2101D and the lower part 2103D.

Figure 22A:
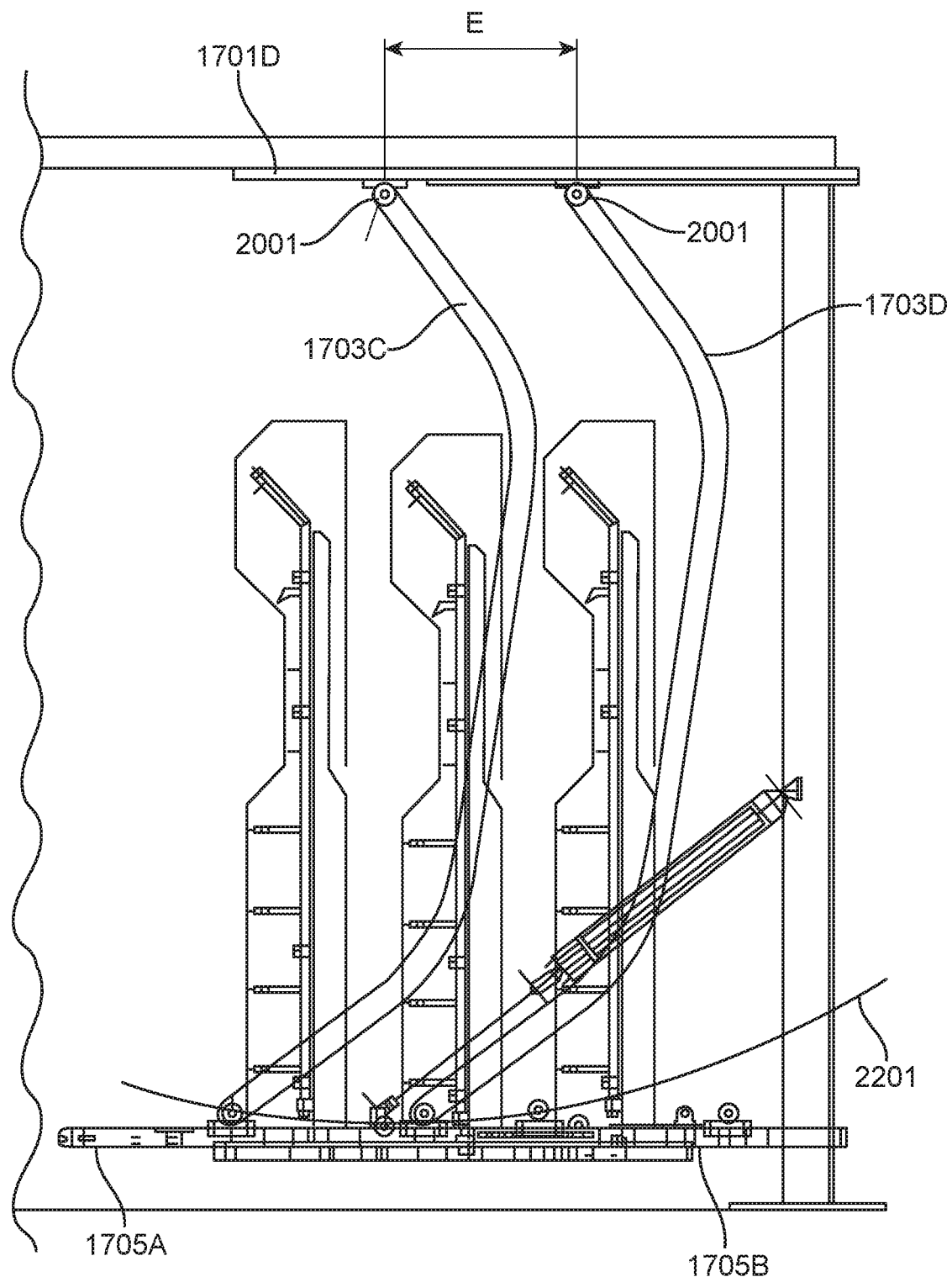
FIG. 22A illustrate a path of motion of components of the second wash stage according to one embodiment.

FIG. 22A illustrates a side view of the arms 1703C and 1703D positioned at the right side of the second wash stage 105 according to one embodiment. Although FIG. 22A does not show arms 1703A and 1703B positioned at the left side of the second wash stage 105, the description of FIG. 22A is also applicable to arms 1703A and 1703B.

As shown in FIG. 22A, the hinge points 2001 of arms 1703C and 1703D are attached to the mounting plate 1701D of frame 1701. In one embodiment, the hinge points 2001 are separated by a threshold distance "E". The threshold distance "E" is 20.9 inches according to one embodiment. If the hinge points 2001 are separated by a distance less than the threshold distance "E", the arms 1703 and base assemblies 1705 shake upon the initial impact between the tires 1801 and the base assemblies 1705. By separating the hinge points 2001 of the arms 1703 by the threshold distance "E," shaking of the arms 1703 and base assemblies 1705 are reduced.

FIG. 22A also illustrates the path of motion 2201 of the base assemblies 1705 as the base assemblies 1705 are repositioned in accordance with the width of the vehicle 101. The path of motion 2201 is not in a straight line such as the horizontal direction. Rather, the path of motion 2201 of the base assemblies 1705 is in an arc (e.g., crescent shape) given that each arm 1703 is attached to the mounting plate 1701D by a single hinge point 2001. During the movement in the path of motion 2201, the nozzles of the water assemblies 1707 remain substantially flat to ensure optimum washing efficiency.

Figure 22B:
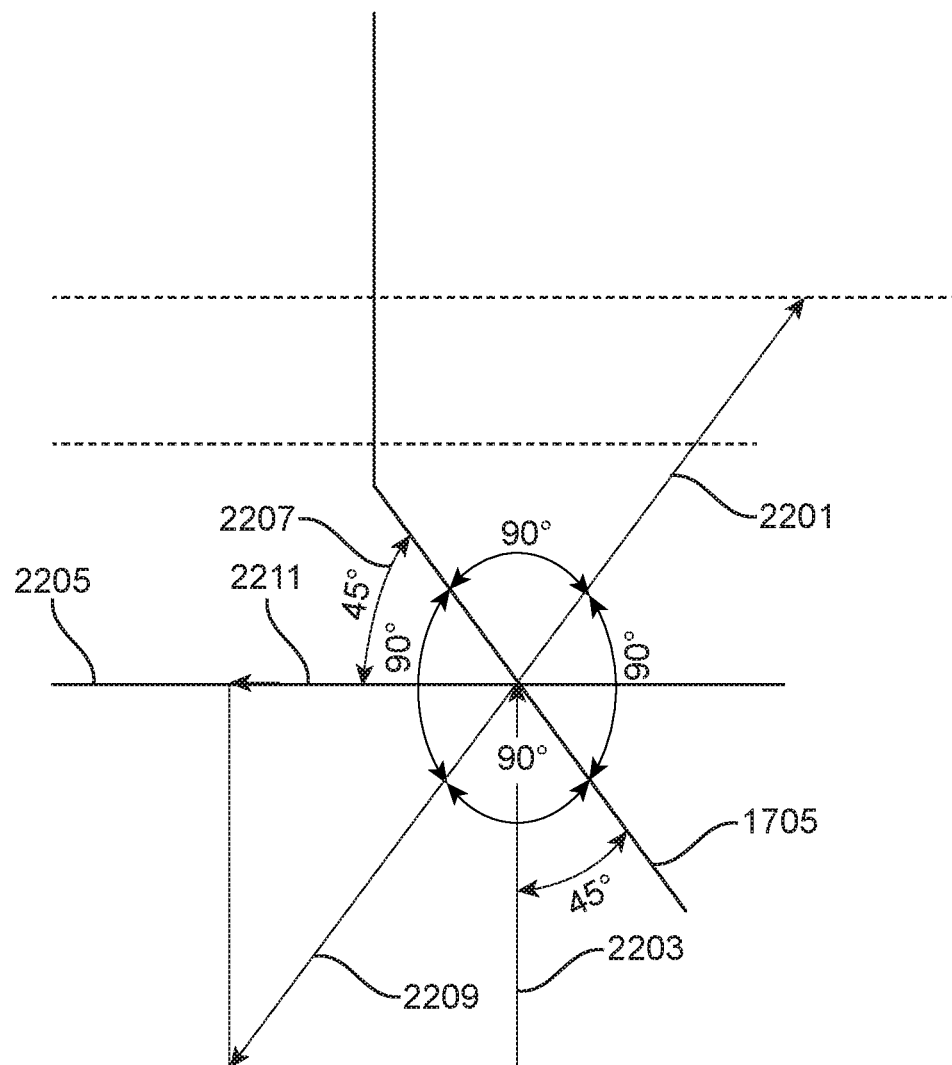
FIG. 22B illustrates force vectors that cause the second wash stage to move in the path shown in FIG. 22A according to one embodiment.

FIG. 22B is a force diagram describing the forces applied to the base assembly 1705 to adjust the width of the second wash stage 105 according to one embodiment. A plan view of a portion of the base assembly 1705 is shown. Vector 2203 represents the direction and force applied by the tire 1801 on the vehicle entry guide of the base assembly 1705 (described below). Vector 2211 represents the reaction force in the left direction in response to the force applied by the tire 1801 and vector 2209 is the reaction force opposite the vector 2201. The sum of the vectors 2203, 2209, and 2211 results in vector 2201 that represents the path of motion of the base assembly 1705.

The vehicle entry guide of the base assembly 1705 is set at an angle 2207 with respect to the reference line 2205. In one embodiment the angle is 45 degrees, but other angles may be used. If the 45-degree angle is used, the direction of the arm rotation along the path of motion 2201 is formed in a 90-degree direction with the vehicle entry guide 1705. In general, as the angle of the vehicle entry guide increases, the amount of travel along the path of motion 2201 increases as well as the force applied to the arms 1703.

Base Assemblies 1705

Figure 23A:
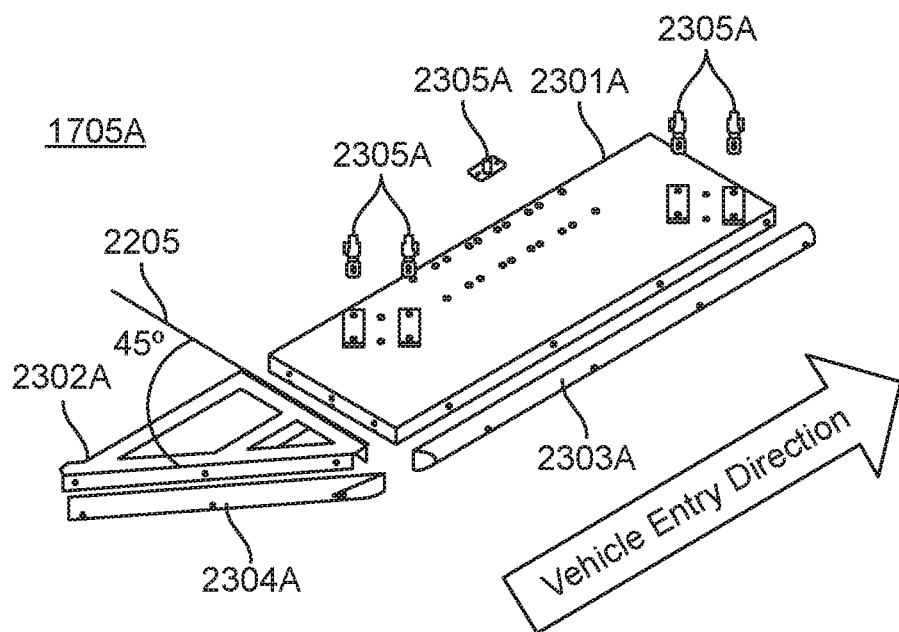
FIGS. 23A, 23B, and 23C illustrate detailed views of base assemblies of the second wash stage according to the first embodiment.
Figure 23B:
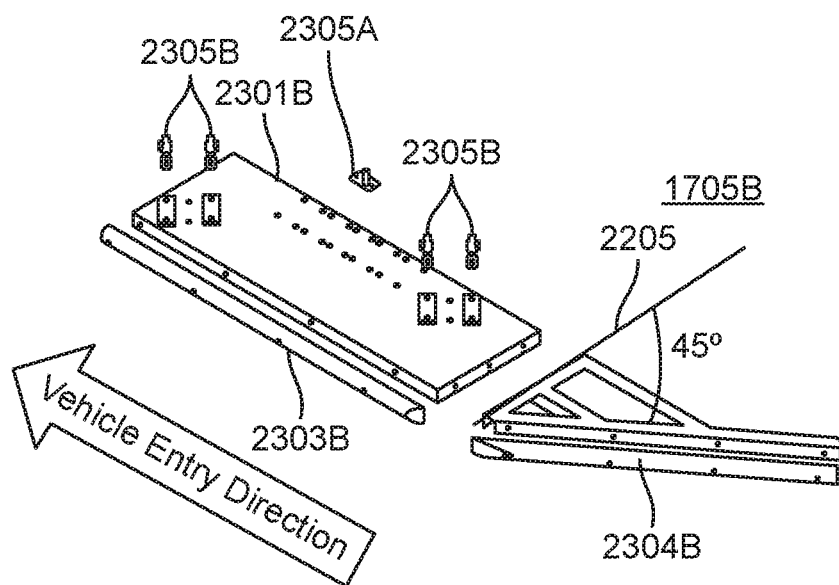

FIGS. 23A and 23B illustrate detailed views of the components of base assemblies 1705A and 1705B, respectively, according to one embodiment. The base assembly 1705A includes a base structure 2301A, a vehicle entry guide 2302A, impact part 2303A, impact part 2304A, bearings 2305A, and cylinder bracket 2305A in one embodiment. Similarly, base assembly 1705B includes a base structure 2301B, a vehicle entry guide 2302B, impact part 2303B, impact part 2304B, bearings 2305B, and cylinder bracket 2305B in one embodiment.

The base structure 2301 functions as the frame of the base assembly 1705 to support the components of the base assembly 1705. The vehicle entry guide 2302, bearings 2305, cylinder bracket 2305, water assembly 1707, and impact part 2302A all attach to the base structure 2301 in on embodiment. The base structure 2301 is rectangular in shape and may be made of metal such as aluminum, but other shapes and materials may be used.

Impact part 2303 is attached to the base structure 2301. The impact part 2303 may be attached to an edge of the base structure 2301 using fasteners such as screws or nuts and bolts. The impact part 2303 is configured to protect the base structure 2301 from damage while the tires 1801 of the vehicle 101 are in contact with the base assembly 1705. Since the impact part 2303 is in contact with the tires, the impact part 2303 must also not impede the travel of the vehicle 101 through the second wash stage 105. Thus, the impact part 2303 is made of a material strong enough to protect the base structure 2301 while having low friction to allow the tires to smoothly glide along the impact part 2303. In one embodiment, the impact part 2303 is made of plastic such as polyethylene, but other materials may be used.

The vehicle entry guide 2302 guides the vehicle 101 into the second wash stage 105. As mentioned previously, the vehicle entry guide 2302 is angled such as at an angle of 45 degrees with respect to reference line 2205. The vehicle entry guide 2302 impacts the tires 1801 of the vehicle 101 to adjust the width of the second wash stage 105. The vehicle entry guide 2302 is triangular in shape and may be made of metal such as aluminum, but other shapes and materials may be used.

Impact part 2304 is attached to the vehicle entry guide 2302. The impact part 2304 may be attached to an edge of the vehicle entry guide 2302 using fasteners such as screws or nuts and bolts. The impact part 2304 is configured to protect the vehicle entry guide 2302 from damage while the tires 1801 of the vehicle 101 are in contact with the vehicle entry guide 2302. Since the impact part 2304 is in contact with the tires, the impact part 2304 must also not impede the travel of the vehicle 101 through the second wash stage 105. Thus, the impact part 2304 is made of a material strong enough to protect the vehicle entry guide 2302 while having low friction to allow the tires to smoothly glide along the impact part 2304. In one embodiment, the impact part 2304 is made of plastic such as polyethylene, but other materials may be used.

Figure 23C:
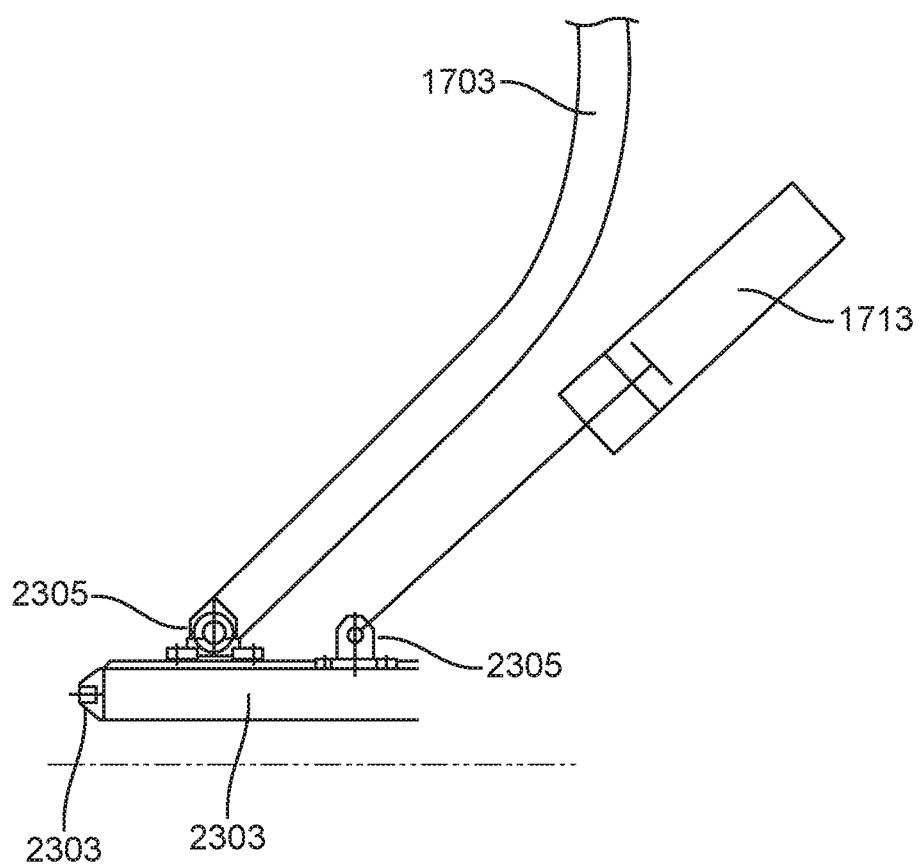

In one embodiment, bearings 2305 are hinge points of the base assemblies 1705. Each bearing 2305 is configured to attach to an end of a corresponding one of the plurality of arms 1703 as shown in FIG. 23C. The bearings 2305 allow for the base assemblies 1705 to hang from the arms 1703 resulting in the base assemblies 1705 floating off the ground. The bearings 2305 also allow for the rotation of the base assembly 1705 as the base assembly 1705 travels along the path of motion 2201. The bearings 2305 may be stainless steel bearings, but other materials may be used for the bearings in other embodiments.

Referring back to FIGS. 23A and 23B, bearings 2305 attach to a top surface of the base structure 2301 in one embodiment. Each bearing 2305 may be attached to the top surface of the base structure 2301 using fasteners such as screws or nuts and bolts. As shown in FIG. 23, a pair of bearings is attached at one end of the base structure 2301 (e.g., at the corner) and another pair of bearings is attached at another end of the base structure 2301.

FIGS. 24A and 24B illustrate plan views of the base assembly 1705A and base assembly 1705B, respectively, according to one embodiment. Specifically, FIGS. 24A and 24B respectively illustrate hinge points 2401A and 2403A of base assembly 1705A and hinge points 2401B and 2403B of base assembly 1705B. Hinge points 2401 are representative of the location of the pair of bearings 2305 positioned at the top end of the base structure 2301 and hinge points 2403 are representative of the location of the pair of bearings 2305 positioned at the bottom end of the base structure 2301 in one embodiment.

As shown in FIGS. 24A and 24B, the hinge points 2401 and 2403 are misaligned in one embodiment. That is, the hinge points 2401 and 2403 are misaligned in both the horizontal and vertical directions. Due to the misalignment, hinge points 2401 and 2403 are offset from each other in both the horizontal and vertical directions.

In one embodiment, the hinge points 2401 and 2403 are angled with respect to an edge of the base assembly 1705. For example, hinge point 2401A and 2403A are angled with respect to the edge 2405A at an angle of 45 degrees in one embodiment, but other angles may be used. Similarly, hinge point 2401B and 2403B are angled with respect to the edge 2405B at an angle of 45 degrees in one embodiment. Angling the hinge points 2401 and 2403 mitigates the impact of the vehicle 101 upon entry and reduces tilting of the base assembly 1705 during the width adjustment of the second wash stage 105.

In one embodiment, the distance 2407 between center points of hinge point 2401 and 2403 is a threshold distance such as 20.9 inches. If the distance between the center points of hinge point 2401 and 2403 is less than the threshold distance, the base assembly 1705 shakes upon impact with the tires 1801 of the vehicle 101. Having the hinge points 2401 and 2403 separated by the threshold distance reduces shaking upon impact between the base assembly 1705 and the tires 1801.

Referring back to FIGS. 23A and 23B, the cylinder bracket 2305 is attached to the top surface of the base structure 2301 in one embodiment. The cylinder bracket 2305 may be attached to the top surface of the base structure 2301 using fasteners such as screws or nuts and bolts. The cylinder bracket 2305 may be positioned between the pairs of bearings 2305 as shown in FIG. 23. For example, the cylinder bracket 2305 is positioned between the pair of bearings 2305 at one end of the base structure 2301 and the pair of bearings 2305 at the other end of the base structure 2301. The cylinder bracket 2305 is configured to attach one end of cylinder 1713 to the top surface of the base structure 2301 in one embodiment as shown in FIG. 23C.

Figure 25:
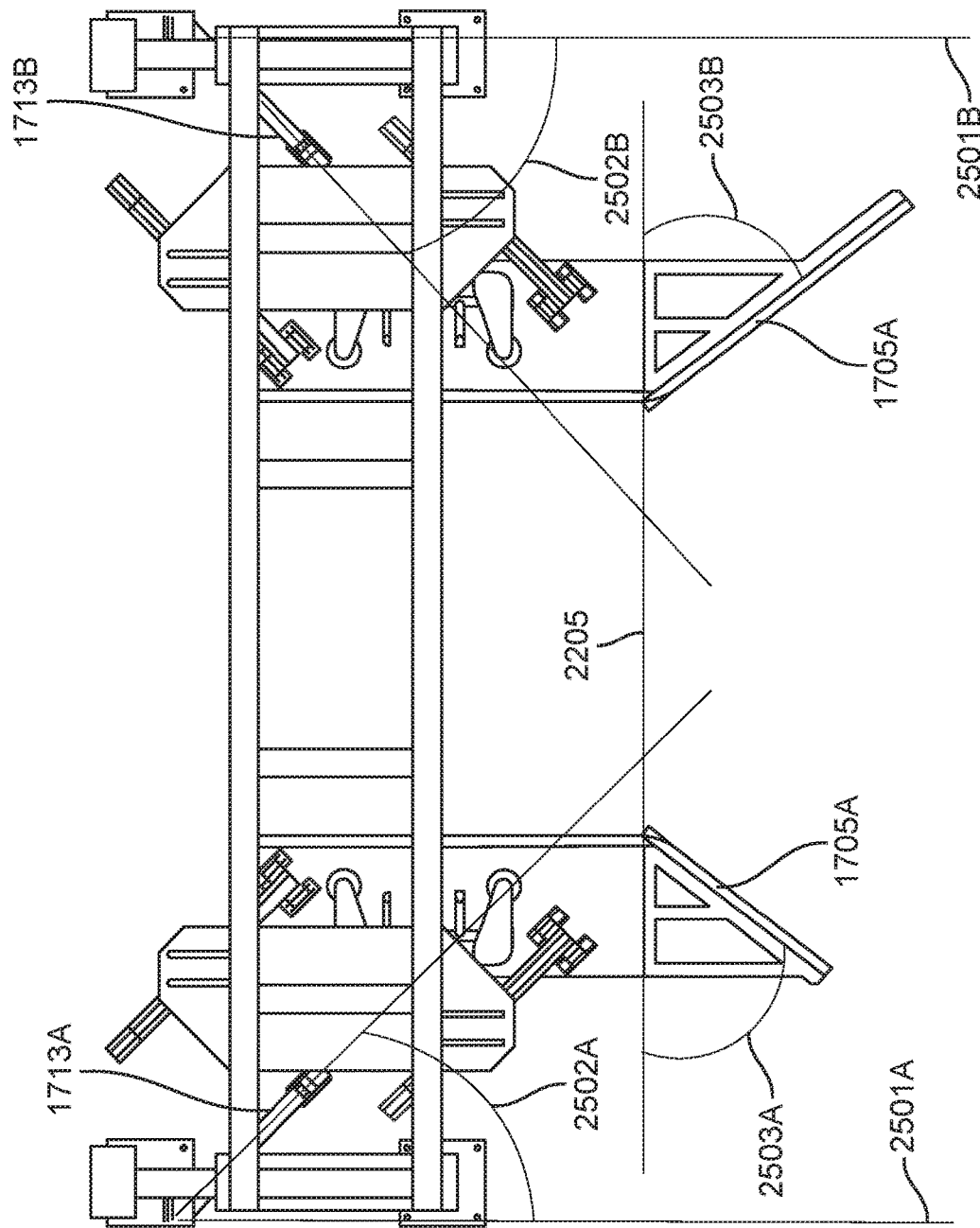
FIG. 25 illustrates a plan view of the second wash stage according to one embodiment.

FIG. 25 illustrates a plan view of the second wash stage 105 to illustrate the angles of the base assembly 1705 and the cylinders 1713 according to one embodiment. As shown in FIG. 25, cylinder 1713A forms an angle 2502A with respect to reference 2501A and cylinder 1713B forms an angle 2502B with respect to reference 2501B. Reference 2501A and reference 2501B are in in the direction of entry of the vehicle 101. In one embodiment, the angles formed between the cylinders 1713 and their respective reference 2501 is 45 degrees. Using the 45-degree angle mitigates the impact of the vehicle's entry with the base assemblies 1705. Furthermore, as mentioned previously, the angles 2503 (e.g., 2503A and 2503B) formed between the base assembly 1705 with reference line 2205 is also 45 degrees. Thus, the sum of the angles of the cylinders 1703 and the base assemblies 1715 is 90 degrees according to one embodiment. However, other embodiments may have a different sum of angles.

Nozzle Assemblies 1707

Figure 26A:
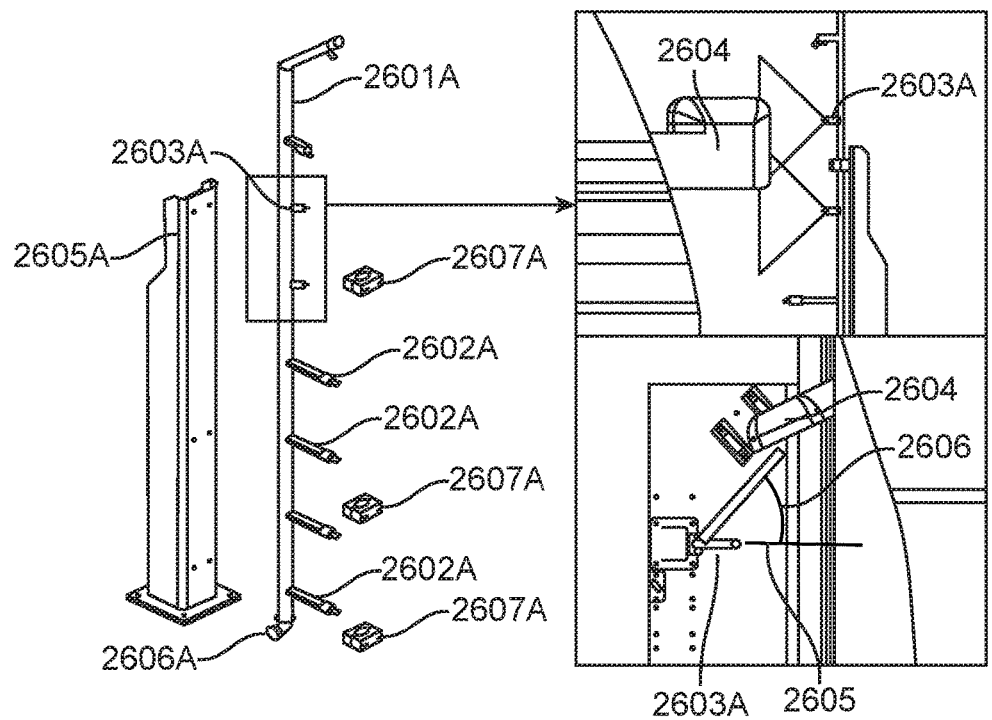
FIGS. 26A and 26B illustrate nozzle assemblies of the second wash stage according to one embodiment.
Figure 26B:
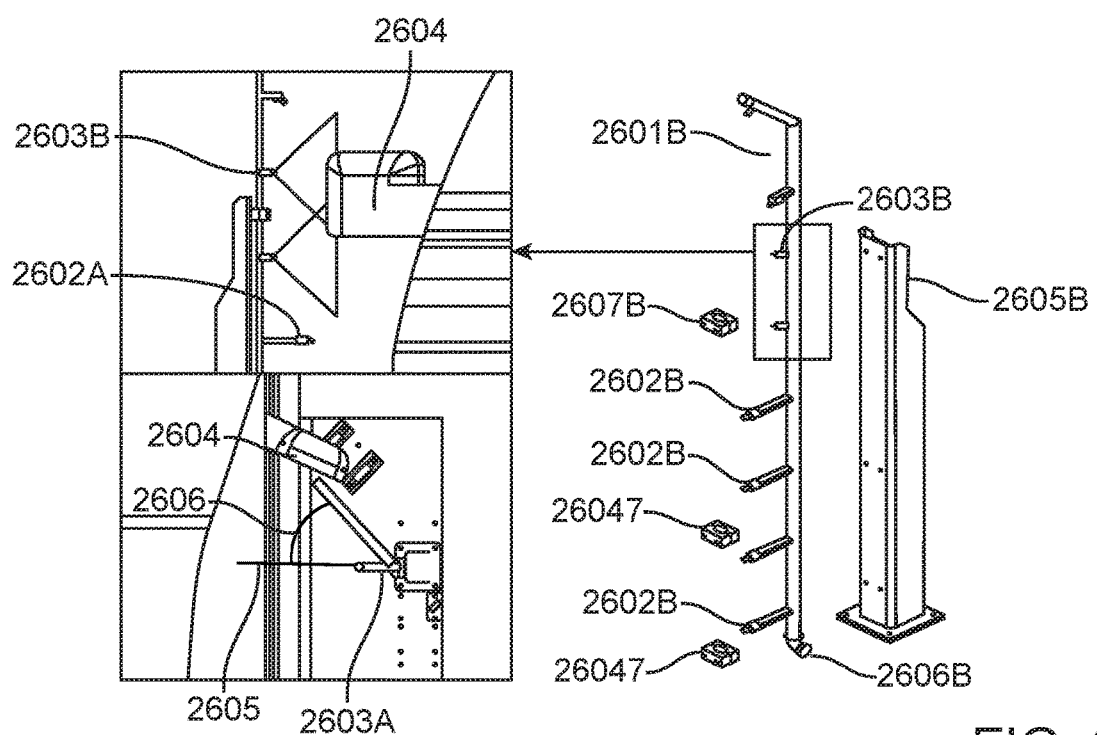

FIGS. 26A and 26B illustrate a detailed view of the nozzle assemblies 1707 included in the second wash stage 105 according to one embodiment. Nozzle assemblies 1707 are examples of the wash unit of the second wash stage 105. As mentioned previously, the nozzle assemblies 1707 include a nozzle assembly 1707A configured to wash the side surface of the driver side of the vehicle 101 and a nozzle assembly 1707B configured to wash the side surface of the passenger side of the vehicle 101 according to one embodiment.

As shown in FIG. 26A, the nozzle assemblies 1707A include a support structure 2605A, a water manifold 2601A, a plurality of water nozzles 2602A, 2603A, and a plurality of fasteners 2604A according to one embodiment. Similarly, as shown in FIG. 26B, the nozzle assemblies 1707B include a post structure 2605B, a water manifold 2601B, a plurality of water nozzles 2602B, 2603B, and a plurality of fasteners 2604B according to one embodiment. As shown in FIGS. 26A and 26B, the passenger and driver side nozzle assemblies include the same types of components in one embodiment. However, the driver and passenger side nozzle assemblies may include different components from each other in other embodiments.

In one embodiment, the water manifolds 2601 are chambers that supply water used to wash the side surfaces of the vehicle 101. For example, the water manifold 2601A houses water used to wash the driver side of the vehicle 101 and the water manifold 2601B houses water used to wash the passenger side of the vehicle 101. Each water manifold 2601 may be a pipe that includes an inlet (e.g., 2606A, 2606B) that is connected to a water supply that supplies water to the water manifold 2601 for washing the vehicle 101. Each water manifold 2601 may be made of stainless steel and have a diameter of 1.1 inches and a length of 69 inches for example. However, other dimensions and materials may be used for the water manifold 2601.

In one embodiment, the water manifolds 2601 include outlet ports that are each connected to a corresponding one of the plurality of water nozzles 2602 and 2603. As shown in FIG. 26, the water nozzles 2602 and 2603 are disposed across the length of the water manifolds 2601. The water nozzles 2602 and 2603 may be spaced apart from each other at equal distances in one embodiment.

Generally, the water nozzles 2602 and 2603 spray water housed within the water manifolds 2601 onto the side surfaces of the vehicle 101 to wash the vehicle 101. To improve wash performance, the water nozzles 2602 and 2603 are kept within a predetermined distance range of the side surfaces of the vehicle 101. The water nozzles 2601 and 2603 are capable of being kept within the predetermined distance range of the side surfaces of the vehicle 101 due to the second wash stage 105 adjusting its width according to the width of the vehicle 101, as described above. In one embodiment, the distance between the side surface of the vehicle 101 and the tips (e.g., the ends) of the water nozzles 2602 and 2603 is in a range between 10 inches to 15 inches. However, other distances ranges may be used in other examples.

In one embodiment, water nozzles 2602 and water nozzles 2603 are configured to clean different parts of the side surface of the vehicle 101. For example, water nozzles 2603 are configured to wash the side mirror 2604 of the vehicle 101 whereas the water nozzles 2602 are configured to wash remaining side surfaces of the vehicle 101 such as the side of the front bumper, the front fenders, doors, the rear fenders, and the side of the rear bumper.

Given that the side mirror 2604 protrudes farther from the vehicle 101 than the side surfaces of the vehicle, the length of the water nozzles 2603 is different from the length of the water nozzles 2602. In one embodiment, the length of the water nozzles 2603 used for washing the side mirror 2604 is shorter than the length of the water nozzles 2602 to provide clearance between the water nozzles 2603 and the side mirror 2604. Otherwise, the water nozzles 2603 may impact the side mirror 2604 causing damage to the vehicle 101 and the water nozzles 2603.

In one embodiment, water nozzles 2603 are configured to spray water at an angle 2606 with respect to reference line 2605 to increase wash performance of the side mirror 2604. By spraying water at the angle 2606, the water nozzles 2603 are capable of cleaning the inside portion of the side mirror 2604. In one embodiment, the angle 2606 of the water nozzles 2603 used to wash the side mirror 2604 is 45-degrees. However, other angles may be used. In general, as the angle 2606 increases, the water injection distance increases and if the angle 2606 decreases, cleaning performance of the side mirror 2604 decreases.

In one embodiment, water nozzles 2602 and 2603 spray water such that the water temperature at the surface of the vehicle 101 is at a threshold temperature to improve wash performance. For example, the temperature of water sprayed by nozzles 2602 and 2603 is between 110 to 140 degrees Fahrenheit (F). In other embodiments, the temperature of water sprayed by nozzles 2602 and 2603 is at least 140 degrees F. The water temperatures at the surface of the vehicle 101 is based on various factors such as the water temperature prior to being sprayed by the water nozzles 2602 and 2603, the nozzle diameter, and angle in which the water is sprayed (i.e., spray injection angle).

In one embodiment, the support structure 2605 is a structure that supports a water manifold 2601. For example, support structure 2605A supports water manifold 2601A and support structure 2605B supports water manifold 2601B. The support structure 2605 may be mounted to the ground in one embodiment to prevent the support structure 2605 from falling. In one embodiment, the support structure 2605 may be rectangular in shape as shown in FIGS. 26A and 26B and may be made of metal such as aluminum, for example. However, other shapes and materials may be used for the support structure.

The plurality of fasteners 2607 fasten the water manifold 2601 to the support structure 2605. For example, fasteners 2607A fasten water manifold 2601A to support structure 2605A and fasteners 2607B fasten water manifold 2601B to support structure 2605A. As shown in FIG. 26, the water manifold 2601 may be fastened to the support structure 2605 at multiple locations across the length of the water manifold 2601 to ensure that the water manifold 2601 is properly secured.

In one embodiment, each fastener 2607 is a clamp type fastener that wraps around the manifold 2601. The fastener 2607 may have a hole in a center of the fastener 2607 and the water manifold 2601 is disposed within the hole. The fastener 2607 may be then fastened to the support structure 2605 using other types of fasteners such as screws and/or nuts and bolts thereby securing the water manifold 2601 to the support structure 2605.

Collision Prevention Unit 1709

Figure 27A:
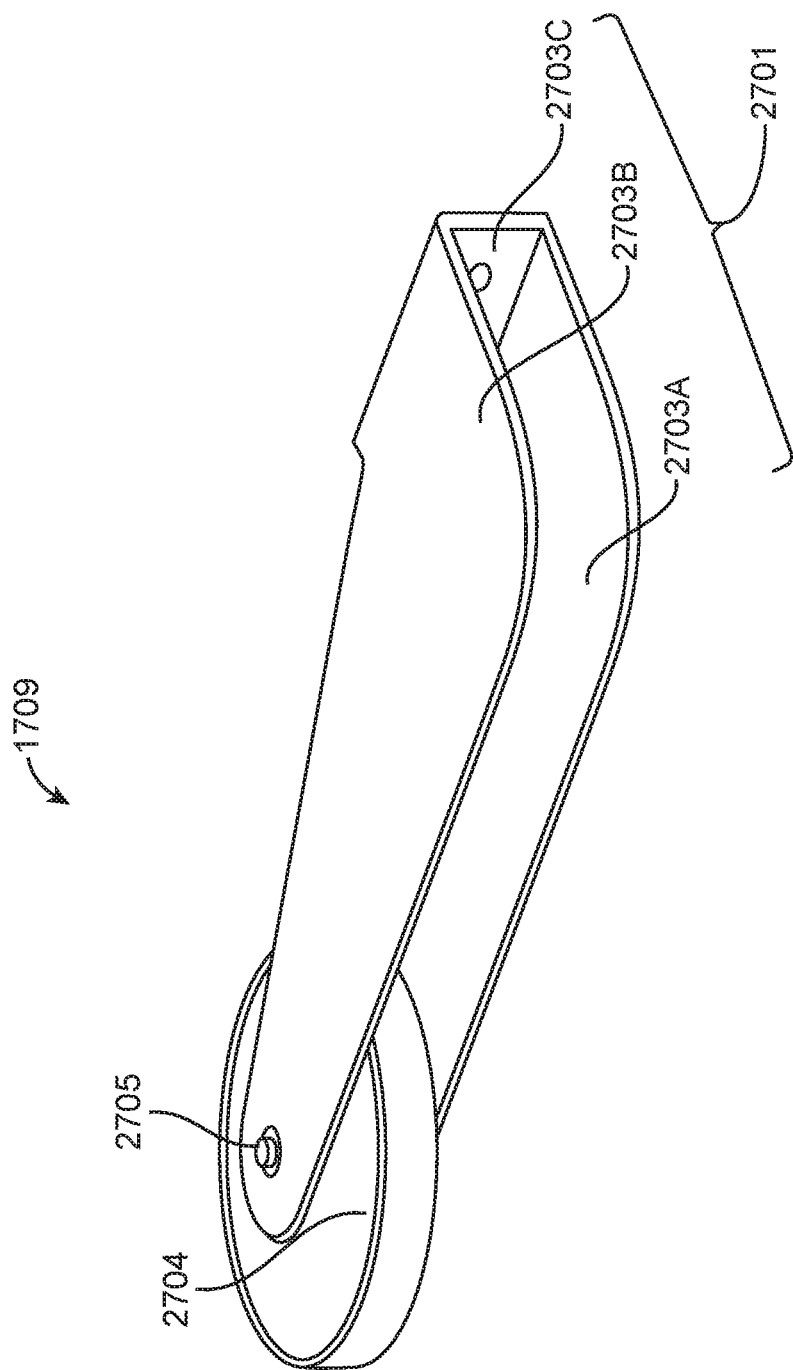
FIG. 27A illustrates a detailed view of a collision prevention unit of the second wash stage according to one embodiment.

FIG. 27A illustrates a detailed view of a collision prevention unit 1709 according to one embodiment. The collision prevention unit 1709 includes a frame 2701 and a contact wheel 2704 in one embodiment. The collision prevention unit 1709 may have different components in other embodiments.

The frame 2701 includes a mounting plate 2703C. The mounting plate 2703C is used to mount the collision prevention unit 1109 to the support structure 2605 of the nozzle assemblies 1707 in one embodiment as shown in FIG. 17.

Referring back to FIG. 27A, the frame 2701 also includes extenders 2703A and 2703B. The extenders 2703 have first ends connected to the mounting plate 2703C. The second ends of the extenders 2703 are separated from each other to form a recess between the second ends of the extenders 2703. As shown in FIG. 27A, the extenders have a "L" shape in one embodiment.

The contact wheel 2704 is configured to contact the side surface of the vehicle 101 to prevent the water nozzles 2602 from being damaged as will be further described below. The contact wheel 2704 is configured to rotate across the surface of the vehicle 101 if the contact wheel 2704 contacts the side surface of the vehicle. To reduce damage to the surface of the vehicle 101 upon contact and as the contact wheel 2704 rolls on the side surface of the vehicle, the contact wheel 2704 is made of an elastic material such as rubber, for example. However, other materials may be used. As further described below, the contact wheel 2704 is constructed so that the water nozzles 2602 are not damaged due to contact with the side surfaces of the vehicle 101.

As shown in FIG. 27A, the contact wheel 2704 is disposed in the recess formed between the second ends of the extenders 2703. The contact wheel 2704 may be secured to the second extenders 2705 using a pin 2705 that is disposed between the second ends of the extenders 2703. The contact wheel 2704 rotates around the pin 2705.

Figure 27C:
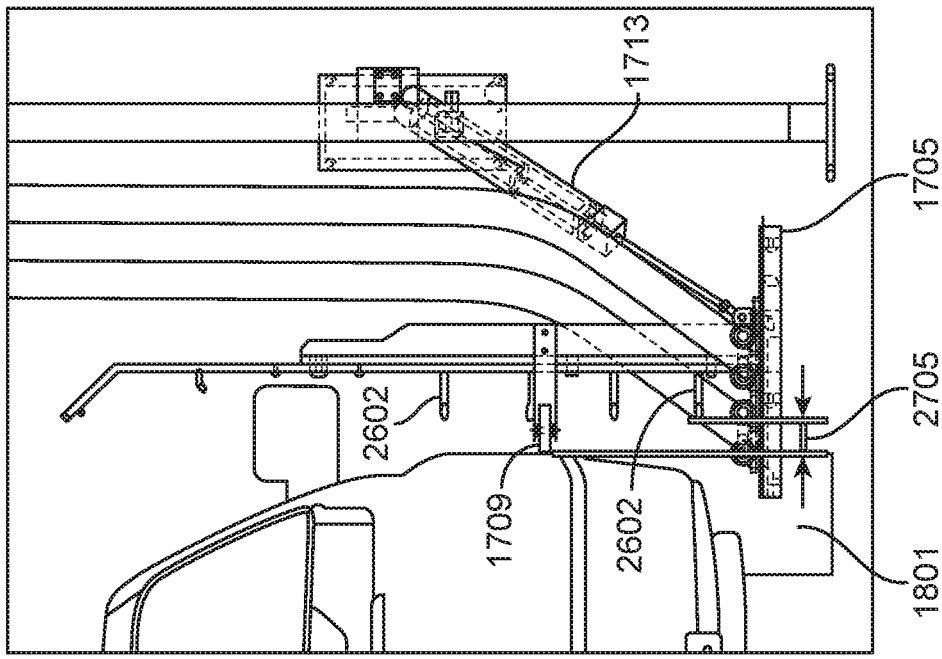
FIGS. 27B to 27C illustrate operation of the collision prevention unit according to one embodiment.
Figure 27B:
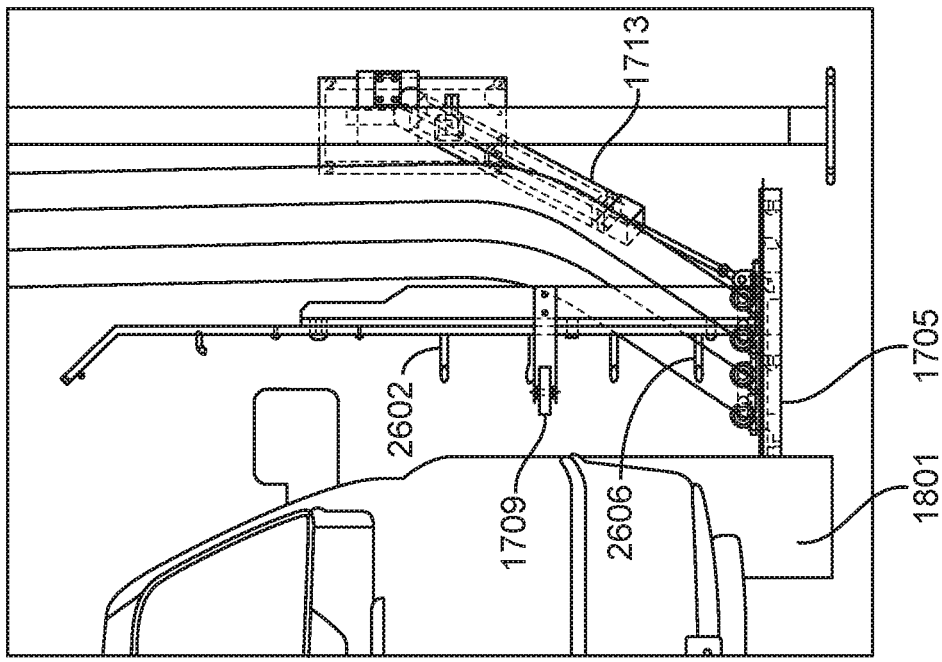

FIGS. 27B and 27C illustrate operation of the collision prevention units 1709 in one embodiment. As mentioned previously, collision prevention units 1709 prevent the water nozzles 2602 from contacting the side surface of the vehicle 101. FIG. 27B illustrates the initial wash operation of the second wash stage 105. As described previously, during the initial wash operation, the base assembly 1705 is in contact with the tire 1801 of the vehicle. Since the base assembly 1705 is in contact with the tire, the base assembly 1705 cannot move underneath the vehicle 101. Accordingly, the water nozzles 2602 cannot contact the side surface of the vehicle 101.

FIG. 27C illustrates the wash operation of the second wash stage 105 where the base assembly 1705 is no longer in contact with the tire 1801. Typically, the cylinder 1713 would lock thereby preventing the base assembly 1705 from moving inward toward the center of the second wash stage 105. However, in the example shown in FIG. 27C, the cylinder 1713 has a malfunction resulting in failure of the lock operation that resulted in the base assembly 1705 going underneath the vehicle 101.

As shown in FIG. 27C, the collision prevention unit 1709 is in contact with the side surface of the vehicle 101 when the base assembly 1705 is underneath the vehicle 101 thereby preventing the base assembly 1705 from further moving inward toward the center of the second wash stage 105. If the base assemblies 1705 were to move further toward the center of the second wash stage 105, the water nozzles 2602 would contact the side surface of the vehicle 101 thereby damaging the vehicle 101 and the water nozzles 2602. However, given that the collision prevention unit 1709 is longer than the water nozzles 2602 and contacts the side surface of the vehicle 101 before the water nozzles 2602, a distance 2705 is maintained between the end of the nozzles 2602 and the side surface of the vehicle 101.

Overview of a Second Embodiment of the Second Wash Stage 105

Figure 28:
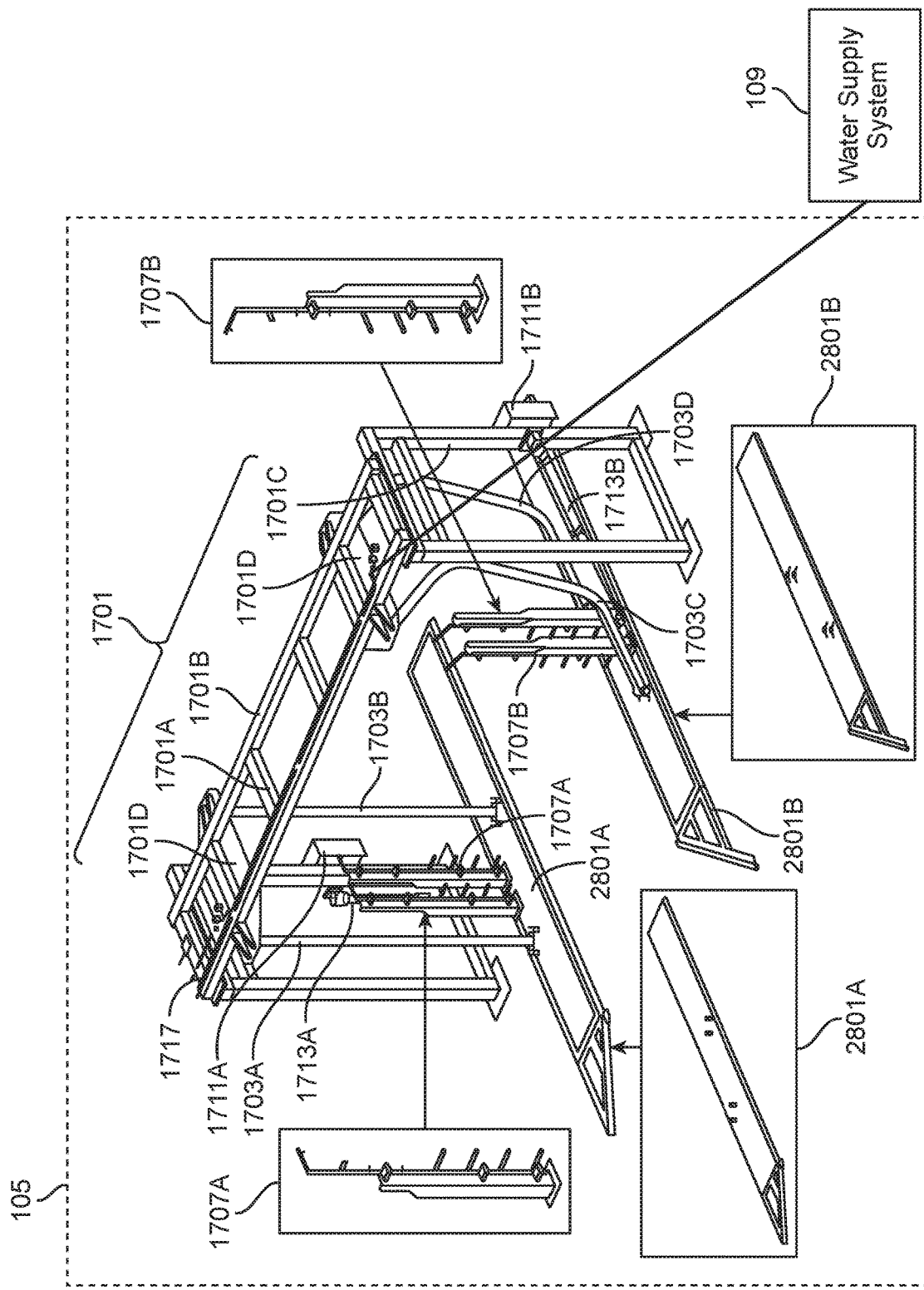
FIG. 28 illustrates a detailed view of the second wash stage of the two-stage brushless car wash system according to a second embodiment.

Referring to FIG. 28, a perspective view of the second wash stage 105 of the car wash system 100 is shown according to a second embodiment. The second embodiment of the second wash stage 105 is similar to the first embodiment of the second wash stage 105 described with respect to FIG. 17. In the second embodiment of the second wash stage 105, the second wash stage 105 includes a frame 1701, a plurality of arms 1703, a plurality of nozzle assemblies 1707, intermediate stop circuit lines 1711, and cylinders 1713 similar to the first embodiment of the second wash stage 105 described above. Thus, the description of the common components between the first embodiment and the second embodiment of the second wash stage 105 are omitted.

The second embodiment of the second wash stage 105 includes base assemblies 2801. Base assemblies 2801 include a driver side base assembly 2801A positioned at the left side of the second wash stage 105 and a passenger side base assembly 2801B positioned at the right side of the second wash stage 105 in one embodiment. Similar to base assemblies 1705 in FIG. 17, base assemblies 2801 in FIG. 27 according to the second embodiment adjust the width of the second wash stage 105. However, the base assemblies 2801 in FIG. 27 have a length that is longer than the base assemblies 1705 of the first embodiment of the second wash stage 105 in FIG. 17. For example, the length of the base assemblies 2801 according to the second embodiment is 163 inches whereas the length of the base assemblies 1705 according to the first embodiment is 79 inches. Thus, the length of the base assemblies 2801 is roughly double the length of the base assemblies 1705.

The longer length of the base assemblies 2801 allows for the base assemblies 2801 to remain in contact with the tires 1801 of the vehicle 101 during the entire duration of the second wash stage 105. Thus, in one embodiment the second embodiment of the second wash stage 105 lacks a collision prevention unit 1709 as the base assemblies 2801 prevent the water nozzles of the water assemblies 2801 from impacting the side surface of the vehicle 101 during the duration of the second wash stage 105. However, the second embodiment of the second wash stage may still include an collision prevention unit 1709 in other embodiments.

Furthermore, although the second embodiment of the second wash stage 105 includes cylinders 1713, the cylinders 1713 may lack a lock functionality. The cylinders 1713 may be used to dampen the vibration of the vehicle 101 upon impact with the base assemblies 2801. However, the cylinders 1713 lack the lock functionality as there is no need to lock the width of the second wash stage 105 because the base assemblies 2801 are in contact with the tires 1801 of the vehicle 101 during the duration of the second wash stage 105 thereby providing such locking function instead.

Operation of the Second Embodiment of the Second Wash Stage 105

Figure 29C:
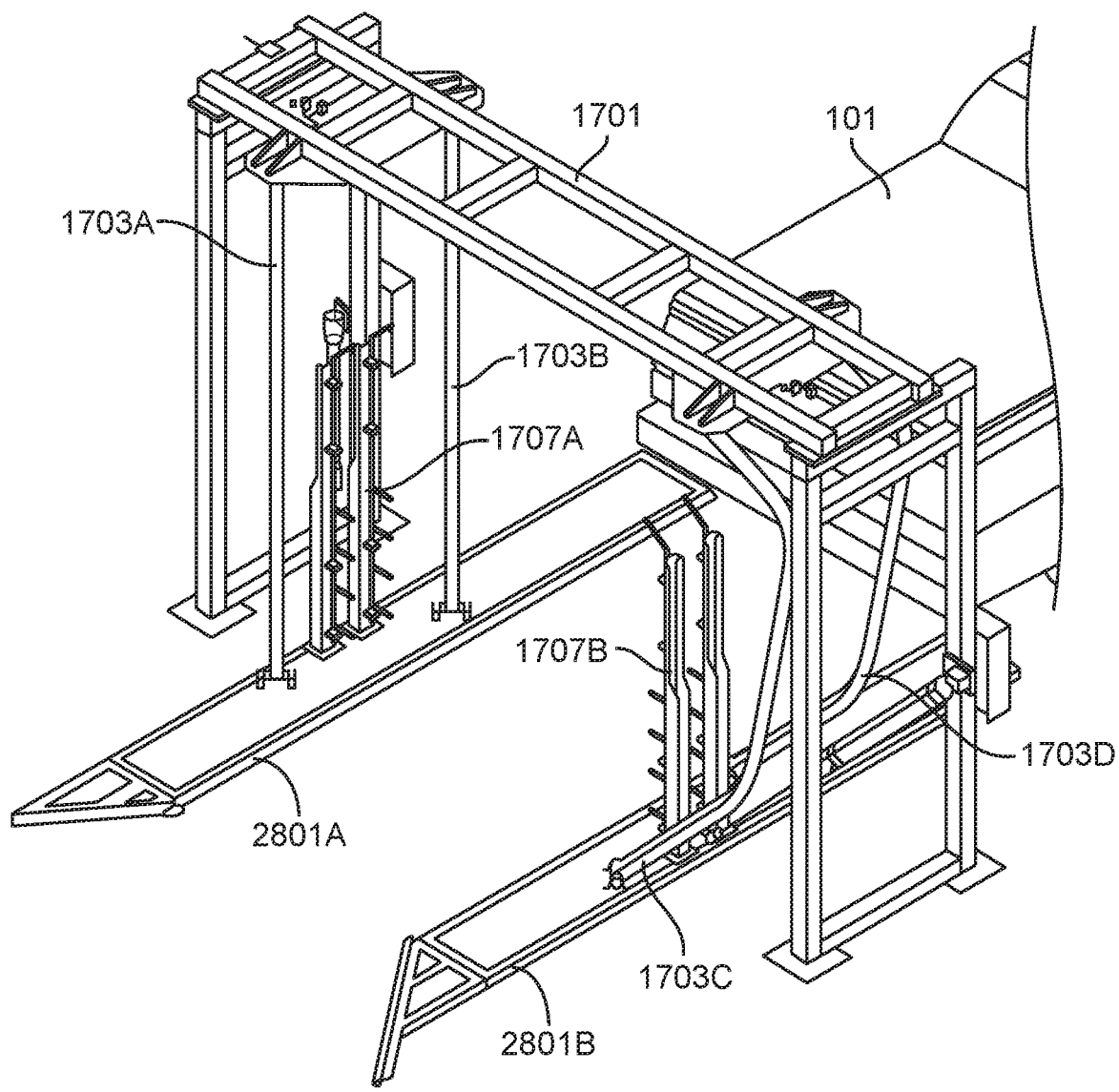

FIGS. 29A to 29C illustrate operation of the second embodiment of the second wash stage 105 to wash side surfaces of the vehicle 101. FIG. 29A illustrates the adjustment operation during the second wash stage 105 operation. During the adjustment operation, the width of the second wash stage 105 is adjusted according to the width of the vehicle 101 in one embodiment. As shown in FIG. 29A, the front tires 1801 of the vehicle 101 contact the plurality of base assemblies 2801 as the vehicle 101 approaches the second wash stage 105. As the vehicle 101 moves forward due the conveyer, the base assemblies 2801 are pushed outward away from the center of the second wash stage 105B by being in contact with the front tires 1801 to set the width of the second wash stage 105 as shown in FIG. 29A.

FIG. 29B illustrates the wash operation of the second wash stage 105 in one embodiment. Once the width of the second wash stage 105 is adjusted according to the width of the vehicle 101, the nozzle assemblies 1707 can begin washing the side surfaces of the vehicle 101. The nozzle assemblies 1707 may wash the front portion (front fenders), center portion (e.g., doors), and rear portion (e.g., rear fenders) of the side surface of the vehicle 101 using water output by the nozzle assemblies 1707 or a combination of water and chemical (e.g., soap) output by the nozzle assemblies 1707. If the nozzle assemblies 1707 output only water, the second wash stage 105 relies upon the chemical output by the chemical arches in the first wash stage 103 to aid in cleaning the vehicle 101.

As shown in FIG. 29B, the base assemblies 2801 are in simultaneous contact with both the front tires 1801A and the rear tires 1801B while washing the center portion of the vehicle 101. During the wash operation of the second embodiment of the second wash stage 105, the base assemblies 2801B are in contact with at least one of the front tires 1801A or rear tires 1801B due to the length of the base assemblies 2801B. Thus, the width of the second wash stage 105 is maintained during the operation of the second wash stage 105. Accordingly, the second embodiment of the second wash stage 105 does not require a lock function of the cylinders 1713 due to the base assemblies 2801 always being in contact with at least one of the front tires 1801A or rear tires 1801B or both, to maintain the adjusted width of the second wash stage 105. In contrast, the first embodiment of the base assemblies 1705 are not in contact with any of the tires 1801 of the vehicle during at least a portion of the second wash operation and thus requires the lock function of the cylinders 1713 to maintain the width of the second wash stage 105. Thus, operation of the cylinders 1713 is similar to the first embodiment of the second wash stage 105 described above except for the lack of needing to lock cylinders 1713.

FIG. 29C illustrates the reset operation of the second embodiment of the second wash stage 105. After the vehicle 101 has exited the second wash stage 105, the width of the second wash stage 105 is reset to its initial position. In one embodiment, the width of the second wash stage 105 is reset using gravity and the weight of the base assemblies 2801 and arms 1703. Gravity causes the base assemblies 2801 to move back to their initial position in one embodiment. After the second wash stage 105 is completed, the vehicle 101 may be dried by one or more fans or blowers (not shown). The fans generate wind that dry the surfaces of the vehicle 101 washed by the first wash stage 101 and the second wash stage 105.

Base Assemblies 2801

Figure 30A:
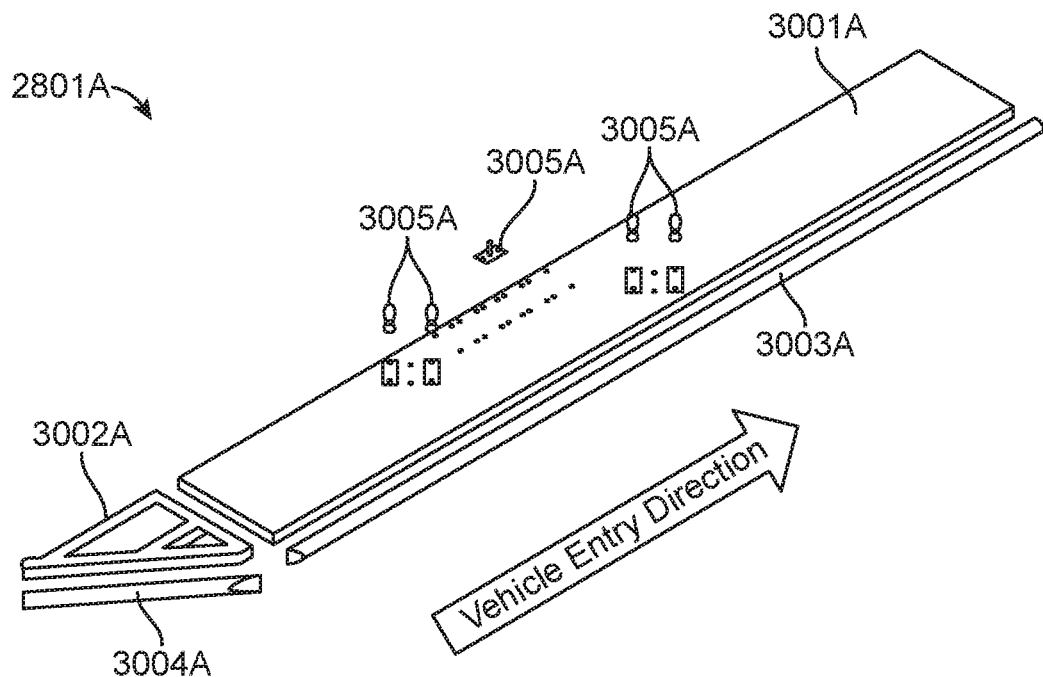
FIGS. 30A and 30B illustrate detailed views of base assemblies of the second wash stage according to the second embodiment.
Figure 30B:
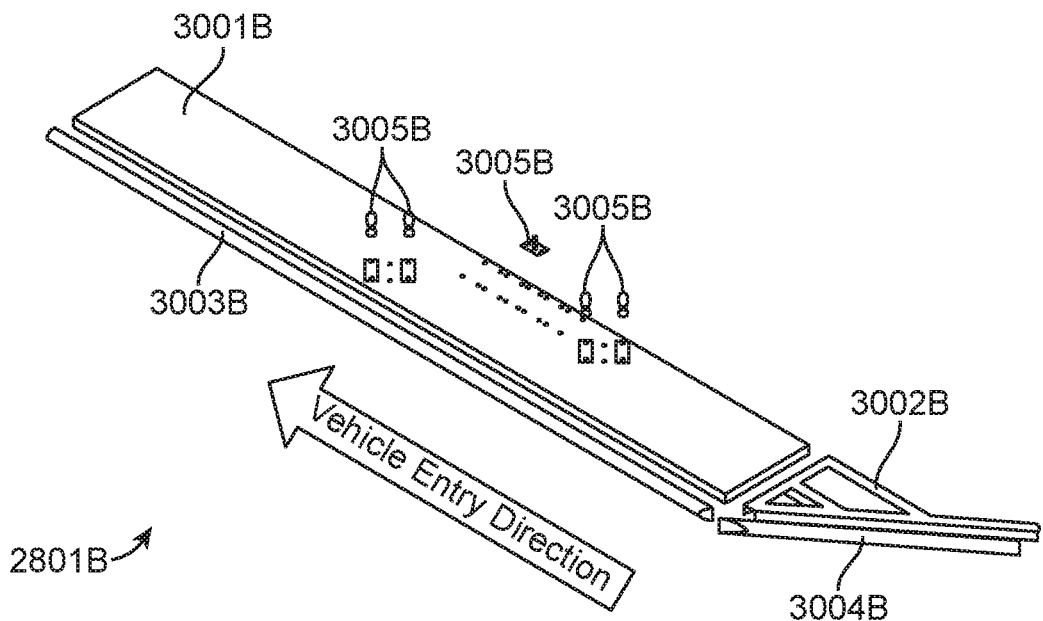

FIGS. 30A and 30B respectively illustrate detailed views of the components of base assemblies 2801A and 2801B according to one embodiment. The base assembly 2801A includes a base structure 30001A, a vehicle entry guide 3002A, impact part 3003A, impact part 3004A, bearings 3005A, and cylinder bracket 3005A in one embodiment. Similarly, base assembly 2801B includes a base structure 3001B, a vehicle entry guide 3002B, impact part 3003B, impact part 3004B, bearings 3005B, and cylinder bracket 3005B in one embodiment.

The functions performed by the base structure 3001, the vehicle entry guide 3002, the impact part 3003, impact part 3004, bearings 3005, and the cylinder bracket 3005 are similar to the functions performed by the base structure 2301, the vehicle entry guide 2302, impact part 2303A, impact part 2304, bearings 2305, and cylinder bracket 2305 as described above. Thus, the detailed description of the components of the base assemblies 2801A and 2801B are omitted as the detailed description of the components of the base assemblies 1705A and 1705B are applicable to the components of the base assemblies 2801A and 2801B.

Due to the increased length of the base assemblies 2801A and 2801B compared to base assemblies 1705A and 1705B, the bearings 3005 are not positioned at the ends of the base structures 3001 as in the first embodiment of the base assemblies 1705. Rather, the bearings 3005 are positioned closer to the center of the base structure 2301 as shown in FIG. 30.

Figures 31A, 31B:
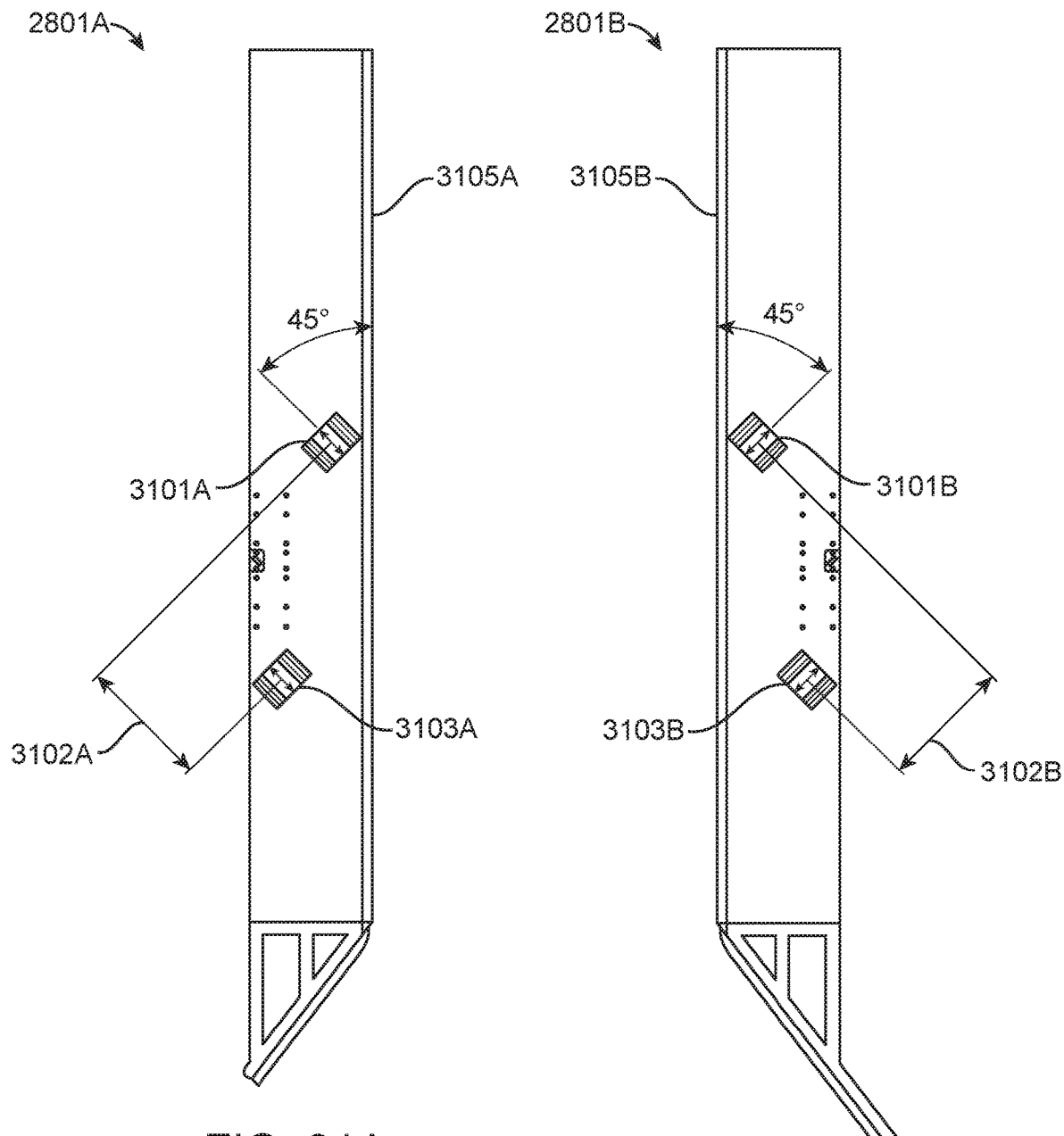
FIGS. 31A and 31B illustrates plan views of the base assemblies of the second wash stage according to the second embodiment.

FIGS. 31A and 31B respectively illustrate plan views of the base assembly 2801A and base assembly 2801B according to one embodiment. Specifically, FIGS. 31A and 31B respectively illustrate hinge points 3101A and 3103A of base assembly 2801A and hinge points 3101B and 3103B of base assembly 2801B. Hinge points 3101 are representative of the upper pair of bearings 3005 and hinge points 3103 are representative of the lower pair of bearings 3005 positioned in one embodiment. Due to the longer length of the base assemblies 2801, each base assembly 2801 includes two or more hinge points 3103 in one embodiment. Having at least two hinge points 3103 prevents the base assemblies 2801 from sagging.

As shown in FIGS. 31A and 31B, the hinge points 3101 and 3103 are misaligned in one embodiment. That is, the hinge points 3101 and 3103 are misaligned in both the horizontal and vertical directions. Due to the misalignment, hinge points 3101 and 3103 are offset from each other in both the horizontal and vertical directions.

In one embodiment, the hinge points 3101 and 3103 are angled with respect to an edge of the base assembly 3105. For example, hinge point 3101A and 3103A are angled with respect to the edge 3105A at an angle of 45 degrees in one embodiment, but other angles may be used. Similarly, hinge point 3101B and 3103B are angled with respect to the edge 3105B at an angle of 45 degrees in one embodiment. Angling the hinge points 3101 and 3103 mitigates the impact of the vehicle 101 upon entry and reduces tilting of the base assembly 2801. In one embodiment, the distance 3102 (e.g., 3102A and 3102B) between center points of hinge point 3101 and 3103 is a threshold distance such as at least 20.9 inches. However, other distances may be used. If the distance between the center points of hinge point 3101 and 3103 is less than the threshold distance, the base assembly 2801 shakes upon impact with the tires 1801 of the vehicle 101. Having the hinge points 3101 and 3103 separated by the threshold distance reduces shaking upon impact between the base assembly 2801 and the tires 1801.

Controller 109

Figure 32:
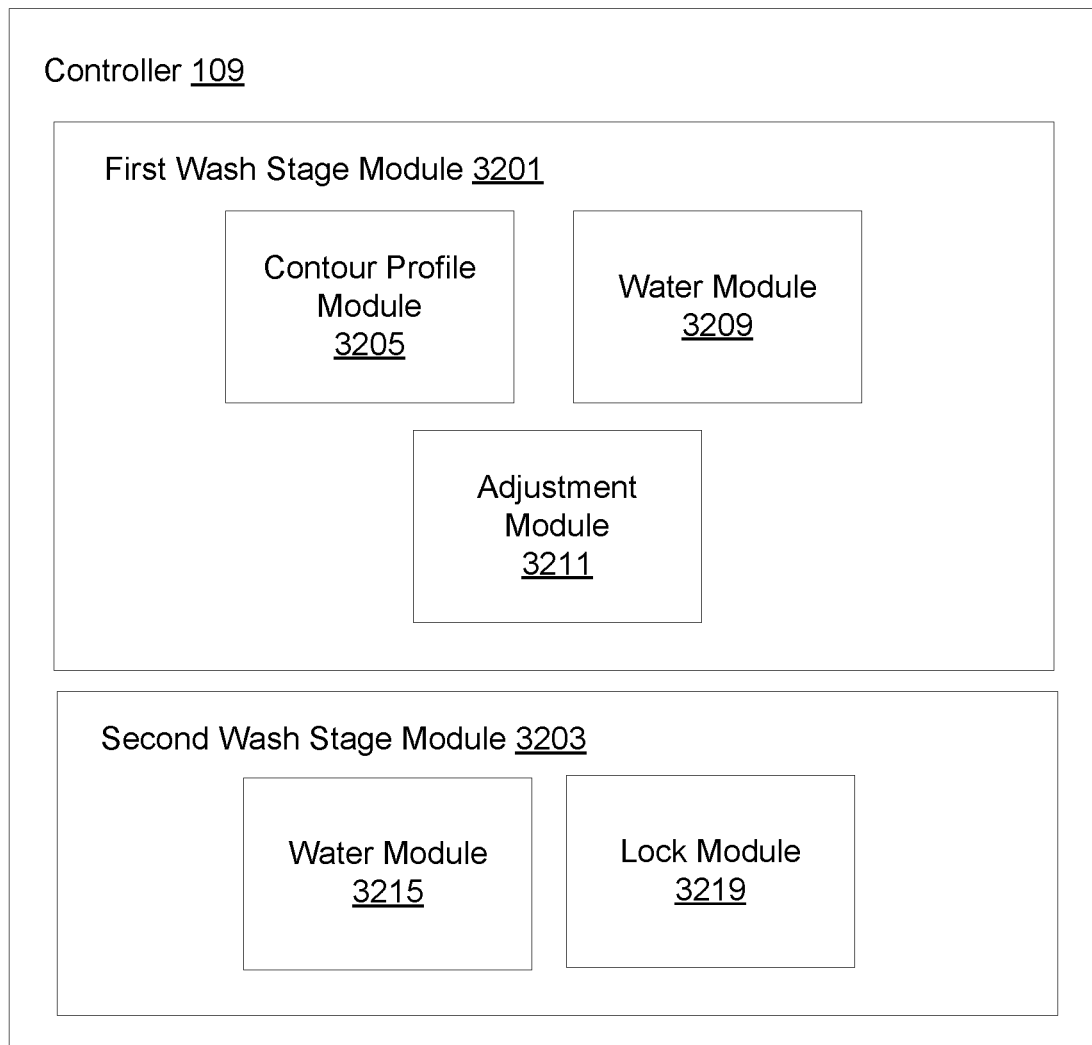
FIG. 32 is a detailed view of the controller of the two-stage brushless car wash system according to one embodiment.

In one embodiment, the controller 109 independently controls the first wash stage 103 and the second wash stage 105 to wash the vehicle 101. FIG. 32 illustrates a detailed view of the controller 109 according to one embodiment.

As shown in FIG. 32, the controller 109 includes a first wash stage module 3201 and a second wash stage module 3203 in one embodiment. Generally, the first wash stage module 3201 controls operation of the first wash stage 103 to wash the front, top, and rear surfaces of the vehicle 101. In contrast, the second wash stage module 3203 controls operation of the second wash stage 105 to wash the side surfaces of the vehicle 101. The control of the first wash stage 101 and the second wash stage 102 by the first wash stage module 3201 and the second wash stage 3203, respectively, are separate and independent from each other. The controller 109 may include other modules than those shown in FIG. 32 in other embodiments.

The first wash stage module 3201 includes a contour profile module 3205, a water module 3209, and an adjustment module 3211 according to one embodiment. However, the first wash stage module 3201 may include other modules in other embodiments.

The contour profile module 3205 determines the contour profile for each vehicle 101 that is washed by the first wash stage 101. As mentioned previously, the contour profile of a vehicle 101 includes a plurality of height points of the vehicle 101 that are measured along the length of the vehicle 101 using the optical sensor 301. The contour profile module 3205 determines the contour of the vehicle 101 based on sensing data received from the optical sensor 301. The sensing data is received from the optical sensor 301 and the contour profile module 3205 determines the height points along the length of the vehicle 101 based on the sensing data to generate the contour profile for the vehicle 101.

Water module 3209 controls the operation of the wash unit 306 in one embodiment. The water module 3209 interdependently controls when to activate (e.g., turn on) or deactivate (e.g., turn off) the nozzles 1305 on the front manifold 306A and when to activate or deactivate the nozzles 1307 on the rear manifold 306B in one embodiment.

For example, the water module 3209 interdependently controls the operation of the nozzles 1305 and 1307 by turning on the nozzles 1305 on the front manifold 306A after a predetermined amount of time from when the vehicle 101 first crosses the optical sensor 301, and determines when to turn off the nozzles 1305 on the front manifold 306A and turn on the nozzles 1307 on the rear manifold 306A according to the contour profile of each vehicle 101 being washed by the front wash stage 103. The water module 3209 can determine the timing of the turn on and turn off operation of the nozzles 1305 and 1307 based on when the rear surface of the vehicle needs to be washed according to the contour profile and accordingly turns off the nozzles 1305 on the front manifold 306A and turns on the nozzles 1307 on the rear manifold 306A.

The adjustment module 3211 adjusts the position of the telescoping unit 304 according to the contour profile of the vehicle 101. For each height point included in the contour profile of a vehicle, the adjustment module 3211 provides a signal to the motor 305 that indicates how much rotation of the motor 305 is required to raise or lower the telescoping unit 304 based on the height. In one embodiment, a lookup table is stored in memory that maps different heights to an amount of vertical movement of the telescoping unit 304 that is needed to achieve the desired height. The amount of vertical movement is translated into a predetermined number of turns of the motor 304 that is required to achieve the desired height.

The second wash stage module 3203 includes a water module 3215 and a lock module 3219 according to one embodiment. However, the second wash stage module 3203 may include different modules than shown in FIG. 32 in other embodiments.

Water module 3215 controls the operation of the nozzle assemblies wash unit 1707 in one embodiment. The water module 3215 controls when to activate (e.g., turn on) or deactivate (e.g., turn off) the nozzles 2602, 2603 included in the wash unit 1707.

The water module 3215 may turn on the nozzles 2602, 2603 responsive to determining the width of the second wash stage 105 changing due to the vehicle 101 impacting the base assembly 1705, 2801 in one example. The water module 3215 may subsequently turn off the nozzles 2602, 2603 after detecting that the width of the second wash stag 105 is reset to its initial position.

In one embodiment, an angle sensor may be mounted on the arms 1703 of the second wash stage 105. The water module 3215 may receive a signal from the angle sensor indicative of the angle of the arms 1703. Based on the signal, the water module 3215 may determine the change of the width of the second wash stage 105 when the angle of the arms 1703 changes. Accordingly, the water module 3215 may turn on the nozzles 2602, 2603 upon detection that the width of the second wash stage 105 is changed from its initial position and may turn off the nozzles 2602, 2603 upon detection that the width of the second wash stage is returned back to its initial position.

The lock module 3219 is configured to lock the length of the cylinders 1713 to hold the width of the second wash stage 105. The lock module 3219 may receive a signal from the angle sensor that is mounted on the arms 1703 of the second wash stage 105. The lock module 3219 monitors the angle of the arms 1703 to determine that the arms 1703 are at a constant angle that is greater than the angle that corresponds to the initial position of arms 1703 for a threshold amount of time (e.g., 2 seconds). The angle of the arms 1703 being constant for the threshold amount of time signifies that the width of the second wash stage 105 is set and thereby locks the cylinders 1713.

In one embodiment, the lock module 3219 is configured to unlock the cylinders 1713 responsive to determining that the vehicle 101 has exited the second wash stage 105. The lock module 3219 may determine when to unlock the cylinders 1713 due to knowing the position of the conveyer 107 and thereby the position of the vehicle 101 at all times.

Although a single controller 109 is shown in FIGS. 1 and 32, the functionality of the controller described herein may be divided among any number of controllers. For example, the car wash 100 may include a controller including the first wash stage module 3201 and a separate, independent controller that includes the second wash stage module 3203. Alternatively, the controller 109 may be a single controller. Thus, the embodiments herein may use a single controller or multiple controllers to control the first wash stage 103 and the second wash stage 105.

Computer Hardware Components

Figure 33:
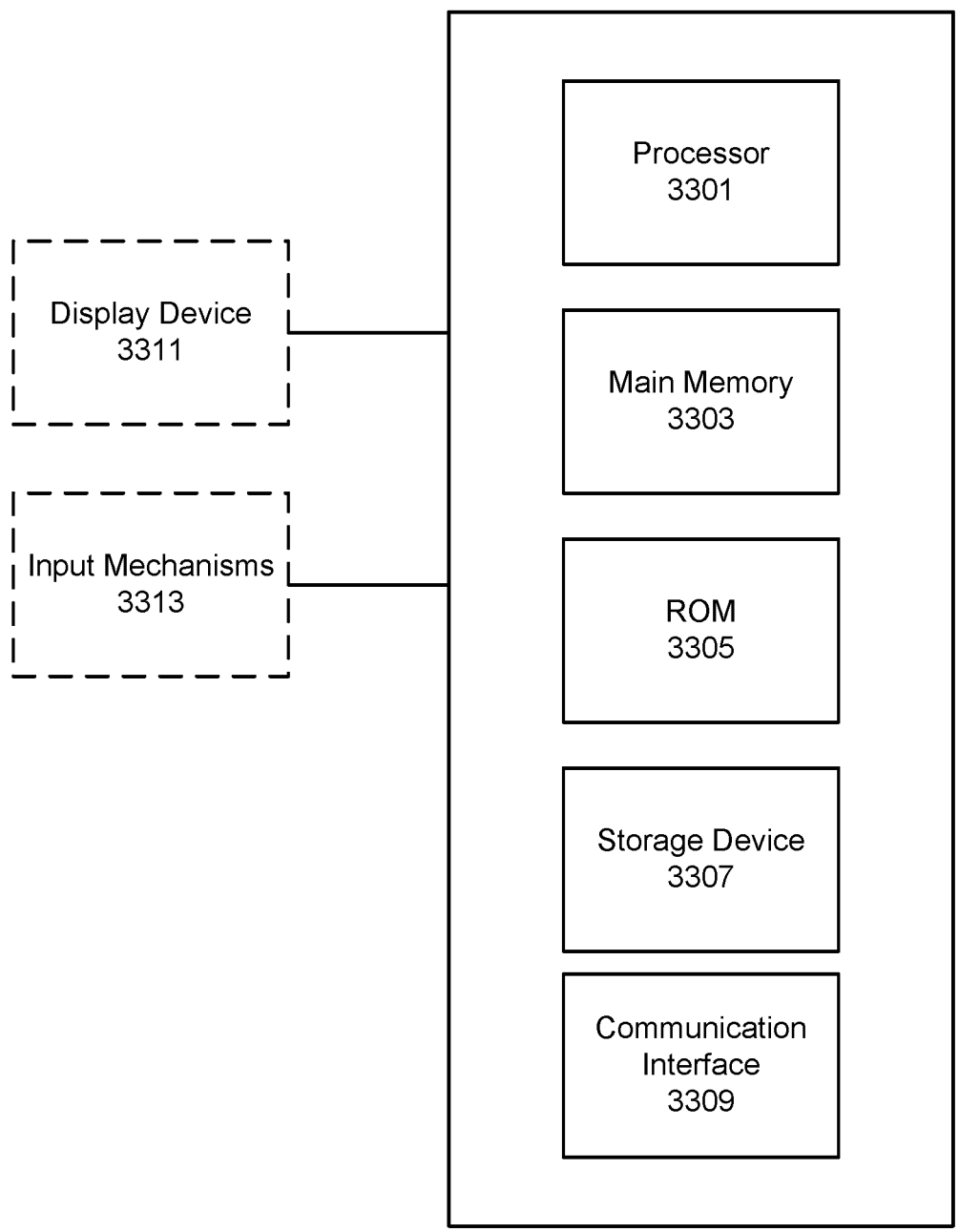
FIG. 33 is system diagram of a controller, according to one embodiment.

FIG. 33 is a diagram illustrating a computer system 3300 upon which embodiments described herein may be implemented within the car wash system 100. For example, in the context of FIG. 1, the controller 109 may be implemented using a computer system such as described by FIG. 33. The controller 109 may also be implemented using a combination of multiple computer systems as described by FIG. 33.

In one implementation, the controller 109 includes processing resources 3301, main memory 3303, read only memory (ROM) 3305, storage device 3307, and a communication interface 3309. The controller 109 includes at least one processor 3301 for processing information and a main memory 303, such as a random-access memory (RAM) or other dynamic storage device, for storing information and instructions to be executed by the processor 3301. Main memory 3303 also may be used for storing temporary variables or other intermediate information during execution of instructions to be executed by processor 3301. Controller 109 may also include ROM 3305 or other static storage device for storing static information and instructions for processor 801. The storage device 3307, such as a magnetic disk or optical disk or solid-state memory device, is provided for storing information and instructions. In one embodiment, the contour profiles of vehicles 101 are stored in one of the main memory 3303, ROM 3305, or the storage device 3307 or a combination thereof.

The communication interface 3309 can enable the controller 109 to communicate with other computer systems through use of a communication link (wireless or wireline). The controller 109 can optionally include a display device 3311, such as a cathode ray tube (CRT), an LCD monitor, an LED monitor, a TFT display or a television set, for example, for displaying graphics and information to a user. An input mechanism 3313, such as a keyboard that includes alphanumeric keys and other keys, can optionally be coupled to the computer system 3300 for communicating information and command selections to processor 3301. Other non-limiting, illustrative examples of input mechanisms 3313 include a mouse, a trackball, touch-sensitive screen, or cursor direction keys for communicating direction information and command selections to processor 3301 and for controlling cursor movement on display device 811.

Examples described herein are related to the use of the controller 109 for implementing the techniques described herein. According to one embodiment, those techniques are performed by the controller 109 in response to processor 3301 executing one or more sequences of one or more instructions contained in main memory 3303. Such instructions may be read into main memory 3303 from another machine-readable medium, such as storage device 3307. Execution of the sequences of instructions contained in main memory 3303 causes processor 3301 to perform the process steps described herein. In alternative implementations, hard-wired circuitry may be used in place of or in combination with software instructions to implement examples described herein. The various modules shown in FIG. 32 may be software modules stored in one of the main memory 3303, ROM 3305, or the storage device 3307 or a combination thereof for execution by the processor 3301, may be hardware modules, or may be a combination of hardware and software. Thus, the examples described are not limited to any specific combination of hardware circuitry and software.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

In the present disclosure terms such as "first," "second," "A," "B"" bay be used herein to describe elements of the present invention. Each of these terms is not used to define essence, order, sequence, or number of elements etc., but is used merely to distinguish the corresponding element from other elements. For example, the telescoping unit 304 includes a plurality of rail stages 801 where the rail stages include rail stage 801A, 801B, 801C, and 801D.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems. Furthermore, it has also proven convenient at times, to refer to arrangements of operations as modules, without loss of generality. The described operations and their associated modules may be embodied in software, firmware, hardware, or any combinations thereof.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A brushless car wash system for washing a vehicle comprising:
   a wash unit configured to spray water on a plurality of upper surfaces of an exterior of the vehicle to wash the vehicle, the wash unit tilted at a first fixed non-zero angle away from a front of the vehicle with respect to a reference that is perpendicular to ground;
   a height adjustment unit coupled to the wash unit at a first end of the height adjustment unit and configured to adjust a height of the wash unit as the plurality of upper surfaces of the exterior of the vehicle is washed, the height adjustment unit tilted at a second fixed non-zero angle away from the front of the vehicle, the second fixed non-zero angle of the height adjustment unit measured with respect to the reference that is perpendicular to ground; and
   a light curtain sensor that is separated from the height adjustment unit and spaced apart from the height adjustment unit, the light curtain sensor comprising a plurality of photoelectric beams that sense intrusions in a plane of detection of the light curtain sensor to sense a plurality of height points of the vehicle along a length of the vehicle as the vehicle passes through the plane of detection of the light curtain sensor,
   wherein the light curtain sensor is tilted at a third fixed angle toward the front of the vehicle,
   wherein the first fixed non-zero angle of the wash unit is maintained as the height adjustment unit adjusts the height of the wash unit from a first height to a second height that is different from the first height.

2. The brushless car wash system of claim 1, wherein the plurality of upper surfaces of the exterior of the vehicle include at least one of a front bumper, a hood, a front windshield, a roof, a rear windshield, a rear decklid, or a rear bumper of the vehicle.

3. The brushless car wash system of claim 1, wherein the second fixed non-zero angle of the height adjustment unit is within a predetermined angle range of 13 to 17 degrees with respect to the reference.

4. The brushless car wash system of claim 1, wherein the height adjustment unit is configured to adjust a height of the wash unit a plurality of times in accordance with the sensed plurality of height points of the plurality of upper surfaces of the vehicle.

5. The brushless car wash system of claim 1, wherein the third fixed non-zero angle of the light curtain sensor is within a predetermined angle range of 13 to 17 degrees with respect to the reference.

6. The brushless car wash system of claim 1, wherein the wash unit includes a plurality of nozzles that spray the water on the plurality of upper surfaces of the vehicle,
   wherein the height adjustment unit adjusts the height of the wash unit such that a distance between ends of the plurality of nozzles and the plurality of upper surfaces of the vehicle is maintained within a predetermined distance range.

7. The brushless car wash system of claim 6, wherein the predetermined distance range from the plurality of upper surfaces of the vehicle is 10 inches to 15 inches.

8. The brushless car wash system of claim 6, wherein a temperature of the water sprayed by the plurality of nozzles when the water contacts the plurality of upper surfaces of the vehicle is within a predetermined temperatures range.

9. The brushless car wash system of claim 8, wherein the predetermined temperature range is 110 to 140 degrees Fahrenheit.

10. The brushless car wash system of claim 1, wherein the height adjustment unit comprises a telescoping rail including a plurality of rail stages, the height of the wash unit adjusted by expanding or retracting the plurality of rail stages.

11. The brushless car wash system of claim 10, wherein at least one of the plurality of rail stages expands out of or retracts into a preceding one of the plurality of rail stages.

12. The brushless car wash system of claim 10, wherein at least one rail stage of the plurality of rail stages includes at least one of a first shock reducing unit at a first end of the at least one rail stage or a second shock reducing unit at a second end of the at least one rail stage, the first shock reducing unit and the second shock reducing unit absorbing shock when at least two of the plurality of rail stages contact each other as the telescoping rail expands or retracts.

13. A brushless car wash system for washing a vehicle comprising:
   a wash unit configured to spray water on a plurality of upper surfaces of an exterior of the vehicle to wash the vehicle; and
   a height adjustment unit coupled to the wash unit at a first end of the height adjustment unit and configured to adjust a height of the wash unit as the plurality of upper surfaces of the exterior of the vehicle is washed, the height adjustment unit tilted at a fixed angle away from a front of the vehicle, the fixed angle measured with respect to a reference that is perpendicular to ground,
   wherein the height adjustment unit comprises a telescoping rail including a plurality of rail stages and the height of the wash unit is adjusted by expanding or retracting the plurality of rail stages, at least one rail stage of the plurality of rail stages includes:
      a plurality of vertical sides;
      a first horizontal side positioned between the plurality of vertical sides;
      a second horizontal side positioned between the plurality of vertical sides and spaced apart from the first horizontal side;
      a first shock reducing unit at a first end of the at least one rail stage, the first shock reducing unit mounted on the first horizontal side, the first shock reducing unit including a first impact reduction block made of a shock absorbent material;
      a second shock reducing unit at a second end of the at least one rail stage, the second shock reducing unit mounted on the second horizontal side, wherein the second shock reducing unit includes:
         a shock absorber mounted on the second horizontal side; and
         a plurality of second impact reduction blocks made of the shock absorbent material and mounted on the second horizontal side, wherein the shock absorber is mounted between the plurality of second impact reduction blocks,
      wherein the first shock reducing unit and the second shock reducing unit absorb shock when at least two of the plurality of rail stages contact each other as the telescoping rail expands or retracts.

14. A brushless car wash system for washing a vehicle comprising:
- a wash unit configured to spray water on a plurality of upper surfaces of an exterior of the vehicle to wash the vehicle;
- a height adjustment unit coupled to the wash unit at a first end of the height adjustment unit and configured to adjust a height of the wash unit as the plurality of upper surfaces of the exterior of the vehicle is washed, the height adjustment unit tilted at a fixed angle away from a front of the vehicle, the fixed angle measured with respect to a reference that is perpendicular to ground, the height adjustment unit comprising a telescoping rail including a plurality of rail stages and the height of the wash unit is adjusted by expanding or retracting the plurality of rail stages;
- a motor connected to a second end of the height adjustment unit;
- a drum coupled to the motor, the drum configured to rotate as the motor rotates; and
- a wire including a first end connected to the drum and a second end connected to the height adjustment unit,
- wherein the wire is configured to wrap around the drum as the telescoping rail retracts towards a fully retracted state and is configured to unwrap from around the drum as the telescoping rail expands toward a fully expanded state.

15. The brushless car wash system of claim 14, wherein the wire comprises ultra-high-molecular-weight polyethylene (UHMWPE).

16. The brushless car wash system of claim 6, wherein the plurality of nozzles includes:
- a plurality of first nozzles controlled to spray water on a first portion of the plurality of upper surfaces of the front and a top of the vehicle; and
- a second plurality of nozzles independently controlled from the plurality of first nozzles to spray water on a second portion of the plurality of upper surfaces of the vehicle including a rear surface of the vehicle.

17. The brushless car wash system of claim 16, wherein the plurality of first nozzles are arranged in a first direction at a first angle with respect to a reference line parallel to a ground surface, and the plurality of second nozzles are arranged in a second direction opposite the first direction at a second angle with respect to the reference line, the second angle greater than the first angle.

18. The brushless car wash system of claim 6, wherein the plurality of nozzles are rotatable and are configured to rotate as the vehicle is moved through the brushless car wash system.

19. The brushless car wash system of claim 1, further comprising:
- a safety device at the one end of the height adjustment unit, the safety device configured to impact the vehicle upon malfunction of the brushless car wash system,
- wherein the safety device comprises a shock absorbent material to reduce damage to the vehicle upon impact between the safety device and the vehicle as the safety device rolls across the vehicle.

20. The brushless car wash system of claim 19, wherein the safety device surrounds a portion of the wash unit.

21. A brushless car wash system for washing a vehicle comprising:
- a wash unit configured to spray water on a plurality of upper surfaces of an exterior of the vehicle to wash the vehicle;
- a height adjustment unit coupled to the wash unit at a first end of the height adjustment unit and configured to adjust a height of the wash unit as the plurality of upper surfaces of the exterior of the vehicle is washed, the height adjustment unit tilted at a fixed angle away from a front of the vehicle while the brushless car wash system is operating without a malfunction, the fixed angle measured with respect to a reference that is perpendicular to ground;
- a safety device at the one end of the height adjustment unit, the safety device configured to impact the vehicle upon malfunction of the brushless car wash system, the safety device comprising a shock absorbent material to reduce damage to the vehicle upon impact between the safety device and the vehicle as the safety device rolls across the vehicle; and
- a rotation apparatus coupled to the height adjustment unit, the height adjustment unit configured to rotate about the rotation apparatus at a same time as an impact between one of the height adjustment unit or the safety device with the vehicle such that the height adjustment unit rotates from the fixed angle to a predetermined angle that is greater than the fixed angle.

22. The brushless car wash system of claim 21, wherein the rotation apparatus is further configured to slow a rotation of the height adjustment unit from the predetermined angle back to the fixed angle after the vehicle has exited the brushless car wash system.

23. A brushless car wash system for washing a vehicle comprising:
- a light curtain sensor configured to sense a plurality of height points of a plurality of upper surfaces of an exterior of the vehicle along a length of the vehicle, the light curtain sensor tilted at a first fixed non-zero angle toward a front of the vehicle, the first fixed non-zero angle of the light curtain sensor measured with respect to a reference that is perpendicular to ground;
- a wash unit configured to spray water on the plurality of upper surfaces of the vehicle to wash the vehicle, the wash unit tilted at a second fixed non-zero angle away from the front of the vehicle with respect to the reference that is perpendicular to ground; and
- a height adjustment unit separated from the light curtain sensor and spaced apart from the light curtain sensor, the height adjustment unit coupled to the wash unit at one end of the height adjustment unit and configured to adjust a height of the wash unit according to the plurality of height points as the vehicle is moved, the height adjustment unit tilted at a third fixed non-zero angle that corresponds to the fixed angle of the light curtain sensor, the third fixed non-zero angle of the height adjustment unit measured with respect to the reference that is perpendicular to ground,
- wherein the second fixed non-zero angle of the wash unit is maintained as the height adjustment unit adjusts the height of the wash unit from a first height to a second height that is different from the first height.

24. A brushless car wash system for washing a vehicle comprising:
- a wash unit configured to spray water on an exterior of the vehicle to wash the vehicle the wash unit tilted at a first fixed non-zero angle away from a front of the vehicle with respect to a reference that is perpendicular to ground; and
- a telescoping rail structure coupled to the wash unit at one end of the telescoping rail structure and configured to adjust a height of the wash unit by expanding or retracting a plurality of rail stages included in the telescoping rail structure as the vehicle is moved, the telescoping rail structure tilted at a second fixed non-zero angle away from a front of the vehicle, the second fixed non-zero angle of the telescoping rail structure measured with respect to the reference that is perpendicular to ground; and a light curtain sensor that is separated from the telescoping rail structure and spaced apart from the telescoping rail structure, the light curtain sensor comprising a plurality of photoelectric beams that sense intrusions in a plane of detection of the light curtain sensor to sense a plurality of height points of the vehicle along a length of the vehicle as the vehicle passes through the plane of detection of the light curtain sensor, wherein the light curtain sensor is tilted at a third fixed non-zero angle toward the front of the vehicle, wherein the first fixed non-zero angle of the wash unit is maintained as the telescoping rail structure adjusts the height of the wash unit from a first height to a second height that is different from the first height.

\* \* \* \* \*